United States Patent
Carvallo Pinto et al.

(10) Patent No.: US 12,460,272 B2
(45) Date of Patent: Nov. 4, 2025

(54) COMPOSITIONS AND METHODS FOR AMPLIFYING OR DETECTING VARICELLA-ZOSTER VIRUS

(71) Applicant: GEN-PROBE INCORPORATED, San Diego, CA (US)

(72) Inventors: Marcela Alejandra Carvallo Pinto, San Diego, CA (US); Amber Jean Hillius, San Diego, CA (US); Ankur Shah, San Diego, CA (US)

(73) Assignee: GEN-PROBE INCORPORATED, San Diego, CA (US)

( * ) Notice: Subject to any disclaimer, the term of this patent is extended or adjusted under 35 U.S.C. 154(b) by 1184 days.

(21) Appl. No.: 17/281,543

(22) PCT Filed: Oct. 1, 2019

(86) PCT No.: PCT/US2019/053943
§ 371 (c)(1),
(2) Date: Mar. 30, 2021

(87) PCT Pub. No.: WO2020/072409
PCT Pub. Date: Apr. 9, 2020

(65) Prior Publication Data
US 2022/0017980 A1    Jan. 20, 2022

Related U.S. Application Data

(60) Provisional application No. 62/739,571, filed on Oct. 1, 2018.

(51) Int. Cl.
*C12Q 1/70* (2006.01)
(52) U.S. Cl.
CPC .................................. *C12Q 1/705* (2013.01)
(58) Field of Classification Search
None
See application file for complete search history.

(56) References Cited

FOREIGN PATENT DOCUMENTS

| CN | 101871013 B | 10/2010 | | |
|---|---|---|---|---|
| CN | 102140543 B | 8/2011 | | |
| CN | 103866046 B | 6/2014 | | |
| CN | 105132584 A | 12/2015 | | |
| WO | WO2002018660 | * | 3/2002 | |
| WO | WO2002018660 A2 | * | 3/2002 | |
| WO | WO-2017040316 A1 | * | 3/2017 | ............. C07H 21/04 |

OTHER PUBLICATIONS

GenBank ID: KX262866.1 (Year: 2016).*
Nolan et al. Good practice guide for the application of quantitative PCR (qPCR) (2013) (Year: 2013).*
Buck et al. , "Design Strategies and Performance of Custom DNA Sequencing Primers," Biotechniques. 1999. 27(3): pp. 528-536 (Year: 1999).*
Lowe et al., Nucleic Acids Research, vol. 18, No. 7, p. 1757-1761, 1990 (Year: 1990).*
Varicella zoster virus—Wikipedia; Archived Jul. 12, 2018 on WaybackMachine (Year: 2018).*
Schoenbrunner et al., Covalent modification of primers improves PCR amplification specificity and yield, Biology Methods and Protocols, vol. 2, Issue 1, Jan. 2017, bpx011 (Year: 2017).*
Biocompare ((Mar. 25, 2013). Primers, by design—tips for optimal DNA Primer Design | Biocompare bench tips. biocompare.com. www.biocompare.com/Bench-Tips/133581-Primers-by-Design-Tips-for-Optimal-DNA-Primer-Design/ (Year: 2013).*
"Primer Designing—Demonstration step by step"; sharebiology.com/primer-designing-demonstration-step-by-step/ (Year: 2025).*
Anonymous: "Modified Bases", Https://eu.idtdna.com/site/Catalog/Modifications/Category/7; Dec. 4, 2019; pp. 1-7.
Bonetta, Laura; "Prime time for real-time PCTR", Nature Methods; vol. 2. No. 4, Apr. 1, 2005, pp. 305-312.
Zhao et al; "Locked Nucleic Acid Probe-Based Real-Time PCR Assay for the Rapid Detection of Rifampin-Resistant Mycobacterium tuberculosis" PLOS One, vol. 10 No. 11; Nov. 24, 2015, p. 0143444.

* cited by examiner

*Primary Examiner* — Aaron A Priest
*Assistant Examiner* — Tian Yu
(74) *Attorney, Agent, or Firm* — Jeffrey E. Landes; Alston & Bird LLP

(57) ABSTRACT

Disclosed are oligonucleotides, oligonucleotide compositions, kits, methods, formulations, and reaction mixtures that provide for sensitive and specific detection of a target nucleic acid sequence, or amplicon generated from a target nucleic acid sequence, of Varicella-Zoster Virus (VZV1 (if present) in a sample. The oligonucleotides, compositions, kits, methods, formulations, and reaction mixtures can be used to detect the presence of VZV in a sample. The oligonucleotides, compositions, kits, methods, formulations, and reaction mixtures can also be used to amplify specific target nucleic acid regions of VZV.

15 Claims, No Drawings
Specification includes a Sequence Listing.

SEQUENCE LISTING

<160> NUMBER OF SEQ ID NOS: 42

<210> SEQ ID NO 1
<211> LENGTH: 20
<212> TYPE: DNA

```
<213> ORGANISM: Artificial Sequence
<220> FEATURE:
<223> OTHER INFORMATION: Synthetic oligonucleotide

<400> SEQUENCE: 1
ttgcttcccc acaccgttta                                               20

<210> SEQ ID NO 2
<211> LENGTH: 23
<212> TYPE: DNA
<213> ORGANISM: Artificial Sequence
<220> FEATURE:
<223> OTHER INFORMATION: Synthetic oligonucleotide

<400> SEQUENCE: 2
gcggtattct gtaaaggatc tcc                                           23

<210> SEQ ID NO 3
<211> LENGTH: 22
<212> TYPE: DNA
<213> ORGANISM: Artificial Sequence
<220> FEATURE:
<223> OTHER INFORMATION: Synthetic oligonucleotide

<400> SEQUENCE: 3
ctacttttat cgcggcttgt tg                                            22

<210> SEQ ID NO 4
<211> LENGTH: 21
<212> TYPE: DNA
<213> ORGANISM: Artificial Sequence
<220> FEATURE:
<223> OTHER INFORMATION: Synthetic oligonucleotide

<400> SEQUENCE: 4
ccaaaactaa caaagccggg a                                             21

<210> SEQ ID NO 5
<211> LENGTH: 21
<212> TYPE: DNA
<213> ORGANISM: Artificial Sequence
<220> FEATURE:
<223> OTHER INFORMATION: Synthetic oligonucleotide

<400> SEQUENCE: 5
cttgcttcgt cgctgaaatc c                                             21

<210> SEQ ID NO 6
<211> LENGTH: 21
<212> TYPE: DNA
<213> ORGANISM: Artificial Sequence
<220> FEATURE:
<223> OTHER INFORMATION: Synthetic oligonucleotide

<400> SEQUENCE: 6
gtaaaacgca catggctgtg t                                             21

<210> SEQ ID NO 7
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 7
gggcctgaat tatacttgga                                               20
```

<210> SEQ ID NO 8
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 8
ggatctccac gtagcaaagc tacac                                      25

<210> SEQ ID NO 9
<211> LENGTH: 26
<212> TYPE: DNA
<213> ORGANISM: Artificial Sequence
<220> FEATURE:
<223> OTHER INFORMATION: Synthetic oligonucleotide

<400> SEQUENCE: 9
gctacacttt ttgcatcagc ctccac                                     26

<210> SEQ ID NO 10
<211> LENGTH: 23
<212> TYPE: DNA
<213> ORGANISM: Artificial Sequence
<220> FEATURE:
<223> OTHER INFORMATION: Synthetic oligonucleotide

<400> SEQUENCE: 10
gcgcgcatac ccggaagttc ttc                                        23

<210> SEQ ID NO 11
<211> LENGTH: 23
<212> TYPE: DNA
<213> ORGANISM: Artificial Sequence
<220> FEATURE:
<223> OTHER INFORMATION: Synthetic oligonucleotide

<400> SEQUENCE: 11
cgagtggtag cgtctacccg acc                                        23

<210> SEQ ID NO 12
<211> LENGTH: 23
<212> TYPE: DNA
<213> ORGANISM: Artificial Sequence
<220> FEATURE:
<223> OTHER INFORMATION: Synthetic oligonucleotide

<400> SEQUENCE: 12
ggtcgggtag acgctaccac tcg                                        23

<210> SEQ ID NO 13
<211> LENGTH: 27
<212> TYPE: DNA
<213> ORGANISM: Artificial Sequence
<220> FEATURE:
<223> OTHER INFORMATION: Synthetic oligonucleotide

<400> SEQUENCE: 13
gccaacatcc catatcttaa acagacc                                    27

<210> SEQ ID NO 14
<211> LENGTH: 26
<212> TYPE: DNA
<213> ORGANISM: Artificial Sequence
<220> FEATURE:

<223> OTHER INFORMATION: Synthetic oligonucleotide

<400> SEQUENCE: 14
catctgtgcg ctcaataacc tcaacg                                           26

<210> SEQ ID NO 15
<211> LENGTH: 24
<212> TYPE: DNA
<213> ORGANISM: Artificial Sequence
<220> FEATURE:
<223> OTHER INFORMATION: Synthetic oligonucleotide

<400> SEQUENCE: 15
tgcaaaatcc aatacgacca ccgg                                             24

<210> SEQ ID NO 16
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 16
cgttcgagaa cgcatccctt                                                  20

<210> SEQ ID NO 17
<211> LENGTH: 22
<212> TYPE: DNA
<213> ORGANISM: Artificial Sequence
<220> FEATURE:
<223> OTHER INFORMATION: Synthetic oligonucleotide

<400> SEQUENCE: 17
cgagaacgca tcccttatgt ta                                               22

<210> SEQ ID NO 18
<211> LENGTH: 19
<212> TYPE: DNA
<213> ORGANISM: Artificial Sequence
<220> FEATURE:
<223> OTHER INFORMATION: Synthetic oligonucleotide

<400> SEQUENCE: 18
ctatgcgcaa ggctattag                                                   19

<210> SEQ ID NO 19
<211> LENGTH: 23
<212> TYPE: DNA
<213> ORGANISM: Artificial Sequence
<220> FEATURE:
<223> OTHER INFORMATION: Synthetic oligonucleotide

<400> SEQUENCE: 19
gtgataactt tcacccggag ttg                                              23

<210> SEQ ID NO 20
<211> LENGTH: 21
<212> TYPE: DNA
<213> ORGANISM: Artificial Sequence
<220> FEATURE:
<223> OTHER INFORMATION: Synthetic oligonucleotide

<400> SEQUENCE: 20
gggcgtttat tatggagaaa c                                                21

```
<210> SEQ ID NO 21
<211> LENGTH: 19
<212> TYPE: DNA
<213> ORGANISM: Artificial Sequence
<220> FEATURE:
<223> OTHER INFORMATION: Synthetic oligonucleotide

<400> SEQUENCE: 21
ggagacaaga acgcttttc                                                      19

<210> SEQ ID NO 22
<211> LENGTH: 21
<212> TYPE: DNA
<213> ORGANISM: Artificial Sequence
<220> FEATURE:
<223> OTHER INFORMATION: Synthetic oligonucleotide

<400> SEQUENCE: 22
ggatataaag gagccagggt t                                                   21

<210> SEQ ID NO 23
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 23
tccaaagcat ggcatactac                                                     20

<210> SEQ ID NO 24
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 24
ggcatactac caatgacacg                                                     20

<210> SEQ ID NO 25
<211> LENGTH: 22
<212> TYPE: DNA
<213> ORGANISM: Artificial Sequence
<220> FEATURE:
<223> OTHER INFORMATION: Synthetic oligonucleotide

<400> SEQUENCE: 25
gaaaacacta atcattcacc ac                                                  22

<210> SEQ ID NO 26
<211> LENGTH: 23
<212> TYPE: DNA
<213> ORGANISM: Artificial Sequence
<220> FEATURE:
<223> OTHER INFORMATION: Synthetic oligonucleotide

<400> SEQUENCE: 26
caatagttag tttaaatggg tcc                                                 23

<210> SEQ ID NO 27
<211> LENGTH: 23
<212> TYPE: DNA
<213> ORGANISM: Artificial Sequence
<220> FEATURE:
<223> OTHER INFORMATION: Synthetic oligonucleotide
```

```
<400> SEQUENCE: 27
ctagactaca gtgaaattca acg                                           23

<210> SEQ ID NO 28
<211> LENGTH: 23
<212> TYPE: DNA
<213> ORGANISM: Artificial Sequence
<220> FEATURE:
<223> OTHER INFORMATION: Synthetic oligonucleotide

<400> SEQUENCE: 28
atgatgcaat tcaccgacgt gcc                                           23

<210> SEQ ID NO 29
<211> LENGTH: 22
<212> TYPE: DNA
<213> ORGANISM: Artificial Sequence
<220> FEATURE:
<223> OTHER INFORMATION: Synthetic oligonucleotide

<400> SEQUENCE: 29
agatcccgac gaagcgtgcc ag                                            22

<210> SEQ ID NO 30
<211> LENGTH: 22
<212> TYPE: DNA
<213> ORGANISM: Artificial Sequence
<220> FEATURE:
<223> OTHER INFORMATION: Synthetic oligonucleotide

<400> SEQUENCE: 30
ctggcacgct tcgtcgggat ct                                            22

<210> SEQ ID NO 31
<211> LENGTH: 24
<212> TYPE: DNA
<213> ORGANISM: Artificial Sequence
<220> FEATURE:
<223> OTHER INFORMATION: Synthetic oligonucleotide

<400> SEQUENCE: 31
ccatgcgtgg ctaatcacaa gcga                                          24

<210> SEQ ID NO 32
<211> LENGTH: 27
<212> TYPE: DNA
<213> ORGANISM: Artificial Sequence
<220> FEATURE:
<223> OTHER INFORMATION: Synthetic oligonucleotide

<400> SEQUENCE: 32
ggttgtgcaa tatgatagcg gaacggc                                       27

<210> SEQ ID NO 33
<211> LENGTH: 27
<212> TYPE: DNA
<213> ORGANISM: Artificial Sequence
<220> FEATURE:
<223> OTHER INFORMATION: Synthetic oligonucleotide

<400> SEQUENCE: 33
gccgttccgc tatcatattg cacaacc                                       27

<210> SEQ ID NO 34
<211> LENGTH: 20
```

<212> TYPE: DNA
<213> ORGANISM: Artificial Sequence
<220> FEATURE:
<223> OTHER INFORMATION: Synthetic oligonucleotide

<400> SEQUENCE: 34
gatctggctt caacttcctc 20

<210> SEQ ID NO 35
<211> LENGTH: 21
<212> TYPE: DNA
<213> ORGANISM: Artificial Sequence
<220> FEATURE:
<223> OTHER INFORMATION: Synthetic oligonucleotide

<400> SEQUENCE: 35
tgttctattg gcacgcaact c 21

<210> SEQ ID NO 36
<211> LENGTH: 22
<212> TYPE: DNA
<213> ORGANISM: Artificial Sequence
<220> FEATURE:
<223> OTHER INFORMATION: Synthetic oligonucleotide

<400> SEQUENCE: 36
cataatatac gtagtgatgc cc 22

<210> SEQ ID NO 37
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 37
gtccctggaa aaactgagcc 20

<210> SEQ ID NO 38
<211> LENGTH: 3610
<212> TYPE: DNA
<213> ORGANISM: Artificial Sequence
<220> FEATURE:
<223> OTHER INFORMATION: Varicella-Zoster Virus partial sequence

<400> SEQUENCE: 38
tttactgtaa aatgtgtgac cttaactttg atggagaatt gcttttggaa tacaaaagac 60
tctacgcatt atttgatgac tttgttcctc ctcggtgatt tcagcttcag tgttcatttt 120
attatcccag cacggggcgt gtatacaaac aaagcctgcc gcctgcaagc ggtttagcat 180
tttaacgtta acaactcgtg tctctggaat aaaacgtttt aaaagccgtt ctgtgagttt 240
agtgtcgttt ccaaataacg ccttaaaagt tacactcgcc gtcccaatga gatgagaaaa 300
ataatagtca atgtttaaag acagcccgtg tgatgttacg tgaatgggat cttccgctaa 360
gtcagatatt attaacttac gctttgcttc cccacaccgt ttacctgcgg tattctgtaa 420
aggatctcca cgtagcaaag ctacactttt tgcatcagcc tccacttcgt ctgtgggggc 480
cacaataaca taagggatgc gttctcgaac gtttgggatt tgaccctgtc tcattactaa 540
tttataatat actgttaagt gagccaagcg acggtttatg taggcggatg gtggacgact 600
aagctcggcc gtcataacaa acttattaat atccaatttg ggtgatgtaa tctggcgatg 660
tgcatctgca attatgcgtc caaacccggc catcccagac ggcatggccc gtctattcca 720

```
ttcagcaatg gaaacacacg acgcctccgc cgcagcacgc gagacggtgt cgtcatataa        780
caacagttct acaagtttgc gggcataatc gttaataaat tgacagttgt ttttctaac         840
caagtcgact cccttcatta aaacctttcc gccgtaaatt accccaatgt acttttcctt        900
tgttataagc aaaagtttta taaagttttt ttcacactcc aactttatag gaggacaaaa        960
cagagccgtt gaaattatat gtgccatttt ctcgccgatt ttagctatcc cctcaacact       1020
aacacccttg aatcggataa acacagaatc cgtatctcca tatataacct ttacctcgta       1080
cgcttttttgg gagagaacgc tactttcaat gtctggaaac gctgtaataa aacgttcaaa      1140
tgcggcccag ttattatgaa tataatctct ggtacttaat aacatttgac ggccaattgt       1200
agtgacagtg gccgctacgt ataaacatgg cagaaatccc tgcgcaactc cagtaaaacc       1260
gtacacggaa ttacaaacta cttttatcgc ggcttgttgt ttgtctaata acactgcttc       1320
atctgaagaa cttccgggta tgcgcgctct aatagccttg cgcatagcca accagtcttt       1380
taaaagaaca cccagcagac tttctcgaac gttagagcgc acaaaaaaaa gacgttttcc       1440
tccaactgta aaggtggcat aatcggatgg attcaaacgt ttaaccgtct caaaatttaa       1500
cgttagcgtg gtaaaacata agttatgggc ctgaattata cttggatata aacttgcaaa       1560
atccaatacg accaccggat cgatataaaa tcccgtatca gggtcaaaaa ccctggctcc       1620
tttatatcct acatttcgcc cacttgacgt accagtggga gaaacgctct cgtcttcatc       1680
catctcttcc tcaacatccc cgacatcggg aataacatcc ttatattcaa aagtagctgg       1740
gtatccccca tcgggtaaaa taaatcctcg agacgaagcc agtcctaata acaggtgta        1800
aatcctaacc tgctgtccgt cgtaaatagc cttggtaaaa gtaattctag ctagccttgc       1860
aaccgcggat aactcaaggt gtggtaaata tttaaaaaac agtttcccca caagagccga       1920
gtcttgtata caatattcac caataattcc tcgtgtattc ggtccactag cgtaatatcc       1980
cggaatgtct ttgtagggca aatctctctt ggactcattt agagcttcac gtgcaaccga       2040
atctaattta taactcgaga gttttaattt ttcagttgca attgcataca tatccagaga       2100
tatgagaccg ttgatcttta ccttgcttcg tcgctgaaat ccggatttgc caacatccca       2160
tatcttaaac agaccccccac ggtttatact gccataacca tcaagcttga gactgtatat      2220
agaattaagt ttctccataa taaacgccca atcaaaatta acaatgttat aacctgtggc       2280
aaactcggga gcgtactgtt ttacgagggt cataaatgca attaatagct cgaattcact       2340
atcaaactcc agcacagtcg gctccggtaa ccccgcgtcc ttcatttctt gtacatacct       2400
ttgtggtaag tcacaagagc caagggaaaa cagtaaaatg tgttctaaag actgtcgagg       2460
gattgaatat aatagacaag aaatttggat tacaagatcc tccagatgtg ttgcatcggg       2520
aaacgccagc tcattagatc ctcctgattt acattcaata tcgaaacata acaacttgta       2580
gtcaggccat gagtcatcgt ttggtatagc ctgcagatta tccgacatgc agtcaatttc       2640
aacgtcgctt aacgttaatt ggcgacttgc cggtcgaact cgaacacgtt ccccatcaac       2700
tccaggtttt agttgatacc aaccaaaact aacaaagccg ggattatcca ttagaaaacg       2760
agtggtagcg tctacccgac cttcatactt tttcaactcc gggtgaaagt tatcacaaag       2820
ataatttgta aatttagatg agggagaata caccctgtaa aacgcacatg gctgtgtatc       2880
gtagtaataa acatctgtgc gctcaataac ctcaacgcga aagctttctg gagatgcgct       2940
tttaaacgag gtaccatgaa aagcgttctt gtctccattt aacgttgcat cattttgtgt       3000
tatcatgaaa ctgcgtaaac actcggcaag taatacagat aactcgctac cggaacgtat       3060
gccacaagcg gtatccacct cggctttgtt tatataaaaa tattgacaga tgccgtatac       3120
```

```
atgaactgcc accctttttc cacatcggga catgccaagt aaagtaataa cggtaccaag   3180
cggtcgtgtt gcagttgcaa accgggatac atctccatta gacgcggctt ctgttgtttc   3240
gacaatatca tatacatgga atgtgttaaa gcgggggtca aacttatccc cacgaaagtc   3300
gatttccccc caaatattca cgcgtctagg ccaggggctg gaacaacgaa aatccagaat   3360
cggaacttct tttccattac agtaaacttt aggcggtcga ctaagtgtac cgacgtgaac   3420 ccccttttcgt tcttccatgg gcacatcttc atctaaacat ttaggggcca aaaattgaaa   3480
cgatgacatg gtagttttgt aactatgaag aaattctctg ttactaccgc gcccggttct   3540
tgggttatat ttaatccctg atgcttgggt taaaaaggga ttacaaaacc ccgttctgat   3600
cgccatttta                                                          3610
```

<210> SEQ ID NO 39
<211> LENGTH: 2830
<212> TYPE: DNA
<213> ORGANISM: Artificial Sequence
<220> FEATURE:
<223> OTHER INFORMATION: Varicella-Zoster Virus partial sequence

<400> SEQUENCE: 39

```
atgtcccctt gtggctatta ttcaaagtgg agaaacaggg atcgaccaga ataccgtcgt     60
aatctacgat tcagacgttt tttctcttct atacacccta atgcagcggc tggctccgga    120
ttcaacggac ccggcgtttt cataacctcc gttacggggg tgtggttatg ctttttatgc    180
atattttcta tgtttgttac ggcggttgtg tcggtctctc caagctcgtt ttatgagagt    240
ttacaagtag agcccacaca atcagaagat ataacccggt ctgctcatct gggcgatggt    300
gatgaaatca gagaagctat acacaagtcc caggacgccg aaacaaaacc cacgttttac    360
gtctgcccac cgccaacagg ctccacaatc gtacgattag aaccaactcg gacatgtccg    420
gattatcacc ttggtaaaaa ctttacagag ggtattgctg ttgtttataa agaaaacatt    480
gcagcgtaca agtttaaggc gacggtatat tacaaagatg ttatcgttag cacggcgtgg    540
gccggaagtt cttatacgca aattactaat agatatgcgg atagggtacc aattcccgtt    600
tcagagatca cggacaccat tgataagttt ggcaagtgtt cttctaaagc aacgtacgta    660
cgaaataacc acaaagttga agcctttaat gaggataaaa atccacagga tatgcctcta    720
atcgcatcaa aatataattc tgtgggatcc aaagcatggc atactaccaa tgacacgtac    780
atggttgccg gaaccccccgg aacatatagg acgggcacgt cggtgaattg catcattgag    840
gaagttgaag ccagatcaat attcccttat gatagttttg gactttccac gggagatata    900
atatacatgt ccccgttttt tggcctacgg gatggtgcat acagagaaca ttccaattat    960
gcaatggatc gttttcacca gtttgagggt tatagacaaa gggatcttga cactagagca   1020
ttactggaac ctgcagcgcg gaacttttta gtcacgcctc atttaacggt tggttggaac   1080
tggaagccaa aacgaacgga agtttgttcg cttgtcaagt ggcgtgaggt tgaagacgta   1140
gttcgcgatg agtatgcaca caattttcgc tttacaatga aaacactttc taccacgttt   1200
ataagtgaaa caaacgagtt taatcttaac caaatccatc tcagtcaatg tgtaaaggag   1260
gaagcccggg ctattattaa ccggatctat acaaccagat acaactcatc tcatgttaga   1320
accggggata tccagaccta ccttgccaga gggggggtttg ttgtggtgtt tcaacccctg   1380
ctgagcaatt ccctcgcccg tctctatctc caagaattgg tccgtgaaaa cactaatcat   1440
tcaccacaaa aacacccgac tcgaaatacc agatcccgac gaagcgtgcc agttgagttg   1500
```

| | |
|---|---|
| cgtgccaata gaacaataac aaccacctca tcggtggaat ttgctatgct ccagtttaca | 1560 |
| tatgaccaca ttcaagagca tgttaatgaa atgttggcac gtatctcctc gtcgtggtgc | 1620 |
| cagctacaaa atcgcgaacg cgcccctttgg agcggactat ttccaattaa cccaagtgct | 1680 |
| ttagcgagca ccatttttgga tcaacgtgtt aaagctcgta ttctcggcga cgttatctcc | 1740 |
| gtttctaatt gtccagaact gggatcagat acacgcatta tacttcaaaa ctctatgagg | 1800 |
| gtatctggta gtactacgcg ttgttatagc cgtcctttaa tttcaatagt tagtttaaat | 1860 |
| gggtccggga cggtggaggg ccagcttgga acagataacg agttaattat gtccagagat | 1920 |
| ctgttagaac catgcgtggc taatcacaag cgatattttc tatttgggca tcactacgta | 1980 |
| tattatgagg attatcgtta cgtccgtgaa atcgcagtcc atgatgtggg aatgattagc | 2040 |
| acttacgtag atttaaactt aacacttctt aaagatagag agtttatgcc gctgcaagta | 2100 |
| tatacaagag acgagctgcg ggatacagga ttactagact acagtgaaat tcaacgccga | 2160 |
| aatcaaatgc attcgctgcg tttttatgac atagacaagg ttgtgcaata tgatagcgga | 2220 |
| acggccatta tgcagggcat ggctcagttt tccagggac ttgggaccgc gggccaggcc | 2280 |
| gttggacatg tggttcttgg ggccacggga gcgctgcttt ccaccgtaca cggatttacc | 2340 |
| acgtttttat ctaacccatt tggggcattg ccgtgggat tattggtttt ggcgggactg | 2400 |
| gtagcggcct tttttgcgta ccggtacgtg cttaaactta aaacaagccc gatgaaggca | 2460 |
| ttatatccac tcacaaccaa ggggttaaaa cagttaccgg aaggaatgga tccctttgcc | 2520 |
| gagaaaccca acgctactga tacccccaata gaagaaattg gcgactcaca aaacactgaa | 2580 |
| ccgtcggtaa atagcgggtt tgatcccgat aaatttcgag aagcccagga aatgattaaa | 2640 |
| tatatgacgt tagtatctgc ggctgagcgc caagaatcta aagcccgcaa aaaaaataag | 2700 |
| actagcgccc ttttaacttc acgtcttacc ggccttgctt tacgaaatcg ccagaggatac | 2760 |
| tcccgtgttc gcaccgagaa tgtaacgggg gtgtaaatag ccaggggggtt tgttttaatt | 2820 |
| tattaataaa | 2830 |

<210> SEQ ID NO 40
<211> LENGTH: 20
<212> TYPE: DNA
<213> ORGANISM: Artificial Sequence
<220> FEATURE:
<223> OTHER INFORMATION: synthetic oligonucleotide

<400> SEQUENCE: 40

| | |
|---|---|
| atggtcaatt agagacaaag | 20 |

<210> SEQ ID NO 41
<211> LENGTH: 20
<212> TYPE: DNA
<213> ORGANISM: Artificial Sequence
<220> FEATURE:
<223> OTHER INFORMATION: synthetic oligonucleotide

<400> SEQUENCE: 41

| | |
|---|---|
| cgttcactat tggtctctgc | 20 |

<210> SEQ ID NO 42
<211> LENGTH: 26
<212> TYPE: DNA

```
<213> ORGANISM: Artificial Sequence
<220> FEATURE:
<223> OTHER INFORMATION: synthetic oligonucleotide

<400> SEQUENCE: 42
cggaatcaca agtcaatcat cgcgca                                          26
```

COMPOSITIONS AND METHODS FOR AMPLIFYING OR DETECTING VARICELLA-ZOSTER VIRUS

CROSS-REFERENCE TO RELATED APPLICATIONS

This application is a U.S. National Stage entry of International Application No. PCT/US2019/053943, filed Oct. 1, 2019, which claims the benefit of priority to U.S. Provisional Application Ser. No. 62/739,571, filed Oct. 1, 2018, which are incorporated herein by reference in their entireties for all purposes.

SEQUENCE LISTING

The Sequence Listing written in filed 536442_SeqListing_ST25.txt is 17 kilobytes in size, was created Sep. 30, 2019, and is hereby incorporated by reference.

FIELD

The embodiments herein are directed to the field of detecting infectious agents. Specifically, the claimed compositions, kits, methods, formulations, and reaction mixtures are designed to detect viruses, such as Varicella-Zoster Virus.

BACKGROUND

Varicella-Zoster Virus (VZV) is a highly infectious human virus belonging to the α-herpesvirus family. The VZV genome is a linear, double-stranded DNA molecule 124,884 nucleotides long. Primary infection, via direct exposure with skin lesions or airborne transmission, causes Chickenpox. Post infection, the virus remains dormant in the nervous system of the infected person. Subsequently, VZV may reactivate later in life, triggering secondary infections such as Shingles. In some cases, VZV infection may also initiate further complications such as hepatitis, pancreatitis, pneumonitis, encephalitis, bronchitis, and bacterial superinfections. Presently, there exists a need for a sensitive, specific, and rapid detection of VZV.

SUMMARY

Provided herein are amplification oligonucleotides, oligonucleotide compositions, kits, reaction mixtures, formulations, and methods for sensitive and specific amplification and/or detection of VZV or VZV target nucleic acid sequences. The amplification oligonucleotides include amplification primers for amplification of a target nucleic acid sequence and detection probes for detection of a target or amplified sequence. The described amplification oligonucleotides, oligonucleotide compositions, kits, reaction mixtures, and formulations are suitable for use in nucleic acid-based detection techniques, including, but not limited to amplification-based techniques such as polymerase chain reaction (PCR), and real-time PCR techniques. The described amplification oligonucleotides, oligonucleotide compositions, kits, reaction mixtures, formulations and methods provide for the rapid detection and/or quantification of VZV. This disclosure aims to meet these needs, provide other benefits, or at least provide the public with a useful choice.

Definitions

To aid in understanding aspects of the disclosure, some terms used herein are defined in greater detail. All other scientific and/or technical terms used herein have the same meaning as commonly understood by those skilled in the relevant art, or as provided in the Dictionary of Microbiology and Molecular Biology, 2nd ed. (Singleton et al., 1994, John Wiley & Sons, New York, NY), and The Harper Collins Dictionary of Biology (Hale & Marham, 1991, Harper Perennial, New York, NY). Unless mentioned otherwise, the techniques employed or contemplated herein are standard methods well-known to a person of ordinary skill in the art of molecular biology.

Before describing the present teachings in detail, it is to be understood that the disclosure is not limited to specific compositions or process steps, and as such, may vary. It should be noted that, as used in this specification and the appended claims, the singular form "a," "an," and "the" include plural references, unless the context clearly dictates otherwise. For example, "a nucleic acid" as used herein is understood to represent one or more nucleic acids. As such, the terms "a" (or "an"), "one or more," and "at least one," can be used interchangeably herein. Therefore, reference to "an oligomer" may include a plurality of oligomers. The conjunction "or" is to be interpreted in the inclusive sense, (e.g., as equivalent to "and/or"), unless the inclusive sense would be unreasonable in the context.

It will be appreciated that there is an implied "about" as it pertains to temperatures, concentrations, times, etc. discussed in the present disclosure, such that slight and insubstantial deviations are within the scope of the present teachings herein. In general, the term "about" indicates insubstantial variation in a quantity of a component of a composition not having any significant effect on the activity or stability of the composition. All ranges are to be interpreted as encompassing the endpoints, in the absence of express exclusions, such as "not including the endpoints." For example, "within 10-15" includes the values 10 and 15. Furthermore, to the extent practical, a range includes all whole and partial numbers between the endpoints. To the extent that any material incorporated by reference is inconsistent with the express content of this disclosure, the express content controls.

Unless specifically noted, embodiments in the specification that recite "comprising" various components are also contemplated as "consisting of" or "consisting essentially of" the recited components; embodiments in the specification that recite "consisting of" various components are also contemplated as "comprising" or "consisting essentially of" the recited components; and embodiments in the specification that recite "consisting essentially of" various components are also contemplated as "consisting of" or "comprising" the recited components (this interchangeability does not apply to the use of these terms in the claims). "Consisting essentially of" means that additional component(s), composition(s) or method step(s) that do not materially change the basic and novel characteristics of the compositions and methods described herein may be included in those compositions or methods. Such characteristics include the ability to detect a target nucleic acid sequence, situated within a target nucleic acid region, from a VZV nucleic acid sequence in a sample; thereby signifying the presence of VZV, as opposed to other known viruses, in the sample.

A "sample" includes any specimen containing or suspected of containing VZV, or components thereof, such as nucleic acids, fragments of nucleic acids, or nucleic acids derived from VZV. Samples may be from any source, such as, but not limited to, biological specimens, clinical specimens, and environmental sources. Biological samples, include any tissue or material derived from a living or dead mammal or organism that may contain VZV or a target nucleic acid sequence derived therefrom, including, e.g., respiratory tissue or exudates such as bronchoscopy, bronchoalveolar lavage (BAL) or lung biopsy, sputum, saliva, peripheral blood, plasma, serum, lymph node, gastrointestinal tissue, feces, urine, semen or other body fluids or materials or lesion swab. In some aspects, to test for VZV, labs may test plasma/serum or lesion swabs. Testing, such as plasma/serum testing, may be performed before and/or after a medical or surgical procedure, such as, but not limited to, transplant. In some aspects, lesion swabs may be used to assess VZV presence, such as in Chicken pox. Biological samples may be treated physically, chemically, or mechanically to disrupt tissue or cell structure, thus releasing intracellular components into a solution. The solution may further contain enzymes, buffers, salts, detergents and the like, which are used to prepare, using standard methods, a biological sample for analysis. In some aspects, samples may include processed samples, such as those obtained from passing samples over or through a filtering device, or following centrifugation, or by adherence to a medium, matrix, or support.

The term "analog" is used to define two or more structures with shared commonalities. The term "structural analog" refers to an object, such as a chemical compound, that shares a similar structural architecture with another compound. Despite exhibiting shared structural similarities, each analog may have different biochemical properties. Alternatively, "functional analogs" refer to two or more objects, such as chemical compounds, that share the same mechanism of action (or biochemical properties), although each analog may be structurally dissimilar.

The term "moiety" is used to indicate a group, or functional group, within the molecule, that is responsible for one or more distinguishing biochemical properties of the molecule.

"Nucleic acid" or "polynucleotide," herein used interchangeably, refer to a multimeric compound composed of nucleotides (or nucleotide analogs). Conventional examples of polynucleotides include ribonucleic acid (RNA), deoxyribonucleic acid (DNA), mixed RNA-DNA, and polymers (substances that have a molecular structure consisting of repeating nucleotide subunits). A polynucleotide "backbone" may be made up of a variety of linkages, including one or more of sugar-phosphodiester linkages, peptide-nucleic acid bonds, peptide nucleic acids (PCT No. WO 95/32305), phosphorothioate linkages, methylphosphonate linkages, or combinations thereof. It is understood that when referring to ranges for the length of a polynucleotide, or other oligonucleotides, that the range is inclusive of all whole numbers (e.g., 19 to 25 contiguous nucleotides in length includes: 19, 20, 21, 22, 23, 24, and 25)

A "nucleotide" is a compound comprising a single 5-carbon (pentose) sugar moiety, a nitrogenous heterocyclic base, and one to three phosphate groups. As building blocks, nucleotides are linked together with covalent bonds to form nucleic acids. The sugar moieties of each nucleotide can be ribose (RNA), 2'-deoxyribose (DNA), or analogs thereof, including similar compounds with substitutions (e.g., 2'-methoxy or 2'-halide substitutions). In addition to the pentose sugar moieties, each nucleotide contains a nitrogenous heterocyclic base attached to the pentose ring via glycosidic bond. Traditional examples of nitrogenous heterocyclic bases include: purines (e.g., adenine (A); and guanine (G)); and pyrimidines (e.g., cytosine (C), thymine (T), and uracil (U)). Purine bases are composed of a six-atom ring and a five-atom ring joined by two shared atoms. Pyrimidine bases are composed of a six-atom ring. Generally, deoxyribonucleotide triphosphate (dNTP) is used as a generic term when discussing the four deoxyribonucleotides: dATP, dCTP, dGTP and dTTP. Nitrogenous heterocyclic bases may also be nonconventional analogs thereof (e.g., inosine (I) or others; see The Biochemistry of the Nucleic Acids 5-36, Adams et al., ed., 11th ed., 1992); or analog derivatives of purines or pyrimidines. Furthermore, polynucleotides may include one or more "abasic" residues, where the backbone includes no nitrogenous base for position(s) of the polymer (U.S. Pat. No. 5,585,481). In addition to conventional polynucleotide formation, polynucleotides may form "locked nucleic acids" (LNA); or analogs containing one or more LNA nucleotide monomers with a bicyclic furanose unit locked in an RNA mimicking sugar conformation that enhances hybridization affinity toward complementary RNA and DNA sequences (Vester and Wengel, 2004, Biochemistry 43(42):13233-41). Embodiments of oligomers that may influence the stability of a hybridization complex include peptide nucleic acids oligomers; oligomers that include 2'-methoxy or 2'-fluoro substituted RNA; oligomers that affect the overall charge; charge density; steric associations of a hybridization complex (including oligomers that contain charged linkages such as phosphorothioates); or neutral groups (e.g., methylphosphonates). 5-methylcytosines may be used in conjunction with any of the foregoing backbones/sugars/linkages including RNA or DNA backbones (or mixtures thereof) unless otherwise indicated.

An "oligomer", "oligonucleotide", or "oligo" is a polymer made up of two or more nucleoside subunits or nucleobase subunits coupled together. The oligonucleotide may be DNA and/or RNA and analogs thereof. In some embodiments, the oligomers are in a size range having a 5 to 21 nucleobase lower limit and an 18 to 500 nucleobase upper limit. In some embodiments, the oligomers are in a size range of 10-100 nucleobases, 10-90 nucleobases, 10-80 nucleobases, 10-70 nucleobases, or 10-60 nucleobases. In some embodiments, oligomers are in a size range with a lower limit of about 15, 16, 17, 18, 19, 20, or 21 nucleobases and an upper limit of about 18 to 50 or 18-100 nucleobases. In some embodiments, oligomers are in a size range with a lower limit of about 10 to 21 nucleobases and an upper limit of about 18 to 100 nucleobases. An oligomer does not consist of wild-type chromosomal DNA or the in vivo transcription products thereof. Oligomers can made synthetically by using any well-known in vitro chemical or enzymatic method, and may be purified after synthesis by using standard methods, e.g., high-performance liquid chromatography (HPLC). Oligomers may be referred to by a functional name (e.g., detection probe or amplification primer). The term oligonucleotide does not denote any particular function to the reagent, as it is used generically to cover all such reagents described herein.

The term "annealing" or "anneal" describes the process when two complementary strands of nucleic acids join together by way of base pair (bp) hybridization. Generally, a person of ordinary skill in the art of molecular biology will appreciate annealing (as it pertains to PCR) may be possible at 5° C. below the calculated melting temperature ($T_m$) during the exponential phase of the amplification reaction.

The term "hybridization" or "hybridize" describes the formation of hydrogen bonds between the nucleotide subunits of two complementary strands of nucleic acids.

The term "nucleic acid hybrid" or "hybrid" or "duplex" refers to a nucleic acid structure consisting of a double-stranded region held together via hydrogen bonds (base pairing), wherein each strand is sufficiently complementary to the other. Examples of hybrids include RNA:RNA, RNA:DNA, or DNA:DNA duplex molecules.

The term "complementary" or "sufficiently complementary" denotes the particular nucleotide base pairing relationship between two single-stranded polynucleotides (e.g., amplification oligonucleotide and target nucleic acid sequence), or two different regions of the same single-stranded polynucleotide (e.g., molecular beacon), that allows for hybridization (e.g., the formation of stable, double-stranded hybrid). Complementary sequences need not be completely complementary (100% complementary) to form a stable duplex. In some embodiments, partially complementary (less than 100% complementary, due to mismatches to standard nucleic acid base pairing) sequence remain sufficiently complementary provided they allow for the polynucleotide sequences to anneal. A percent complementarity indicates the percentage of bases, in a contiguous strand, in a first nucleic acid sequence which can form hydrogen bonds (e.g., Watson-Crick base pair) with a second nucleic acid sequence (e.g., 5, 6, 7, 8, 9, 10 out of 10 being 50%, 60%, 70%, 80%, 90%, and 100% complementary). Percent complementarity is calculated in a similar manner to percent identify. Purine bases bond to pyrimidine bases pursuant to base pairing rules that state adenine pairs with thymine or uracil (A and T or U) and guanine pairs only with cytosine (C and G). Notably, base pairing can also form between bases which are not members of these traditional (e.g., "canonical") pairs. Non-canonical base pairing is well-known to a person of ordinary skill in the art of molecular biology (See, e.g., R. L. P. Adams et al., The Biochemistry of the Nucleic Acids (11th ed. 1992)). Appropriate hybridization conditions are well-known to a person of ordinary skill in the art of molecular biology, and can be predicted based on sequence composition, or can be determined empirically by using routine testing (e.g., Sambrook et al., Molecular Cloning, A Laboratory Manual, 2nd ed. at §§ 1.90-1.91, 7.37-7.57, 9.47-9.51 and 11.47-11.57, particularly §§ 9.50-9.51, 11.12-11.13, 11.45-11.47 and 11.55-11.57).

Sequence identity can be determined by aligning sequences using algorithms, such as BESTFIT, FASTA, and TFASTA in the Wisconsin Genetics Software Package Release 7.0, Genetics Computer Group, 575 Science Dr., Madison, Wis.), using default gap parameters, or by inspection, and the best alignment (i.e., resulting in the highest percentage of sequence similarity over a comparison window). Percentage of sequence identity is calculated by comparing two optimally aligned sequences over a window of comparison, determining the number of positions at which the identical residues occurs in both sequences to yield the number of matched positions, dividing the number of matched positions by the total number of matched and mismatched positions not counting gaps in the window of comparison (i.e., the window size), and multiplying the result by 100 to yield the percentage of sequence identity. Unless otherwise indicated the window of comparison between two sequences is defined by the entire length of the shorter of the two sequences.

"Self-complementarity" refers an oligonucleotide containing internal complementary sequences that can hybridize to each other, creating a double-strand structure or region within the oligonucleotide. Depending on the location of the complementary sequences within the oligonucleotide, hybridization of the sequences can lead to formation of hairpin loops, junctions, bulges or internal loops. In some embodiments, the self-complementary sequences can each be 4-6 nucleobases in length. In some embodiments, the self-complementary sequences are located at the 5' and 3' ends of the oligonucleotide. In some embodiments, a self-complementary sequence can be added to the 5' or 3' end of an oligonucleotide, such as a detection probe.

The term "configured to specifically hybridize to" denotes the specific intent and purposeful use of particular use of certain oligonucleotides is expressly elected based on the desire to amplify or detect a target nucleic acid sequence of VZV. For example, amplification primers, configured to generate a specific amplicon from a particular target nucleic acid sequence, will utilize specific forward and reverse amplification oligos that provide for precise hybridization to target oligo hybridizing sequence situated within a target nucleic acid region of VZV, if present in a sample, to generate the intended PCR product (e.g., amplicon). Configured to specifically hybridize does not mean exclusively hybridize, as a person of ordinary skill in the art of molecular biology will appreciate some small level of hybridization to non-target nucleic acids may occur.

"Preferentially hybridize" or "preferential hybridization" indicates that under stringent hybridization conditions, an amplification oligonucleotide can hybridize to its target nucleic acid to form stable oligonucleotide:target hybrid, but not form a sufficient number of stable oligonucleotide:non-target hybrids. Amplification oligonucleotide that preferentially hybridize to a target nucleic acid are useful to amplify and detect target nucleic acids, but not non-targeted nucleic acids, especially in phylogenetically closely-related organisms. Thus, the amplification oligonucleotide hybridizes to target nucleic acid to a sufficiently greater extent than to non-target nucleic acid to enable one having ordinary skill in the art to accurately amplify and/or detect the presence (or absence) of nucleic acid derived from the specified VZV as appropriate. In general, reducing the degree of complementarity between an oligonucleotide sequence and its target sequence will decrease the specificity or rate of hybridization of the oligonucleotide to its target region. However, the inclusion of one or more non-complementary nucleosides or nucleobases may facilitate the ability of an oligonucleotide to discriminate against non-target organisms.

Preferential hybridization can be measured using techniques known in the art and described herein, such as in the examples provided below. In some embodiments, there is at least a 10-fold difference between target and non-target hybridization signals in a test sample, at least a 20-fold difference, at least a 50-fold difference, at least a 100-fold difference, at least a 200-fold difference, at least a 500-fold difference, or at least a 1,000-fold difference. In some embodiments, non-target hybridization signals in a test sample are no more than the background signal level.

The term "stringent hybridization conditions," denotes conditions permitting an oligomer to preferentially hybridize to a target nucleic acid sequence, but not to nucleic acids derived from a closely related, non-target nucleic acid. The reaction environment that can be used for stringent hybridization may vary depending upon factors including the GC content and length of the oligomer, the degree of similarity between the oligomer sequence and sequences of non-target nucleic acids that may be present in the test sample, and the target sequence. Hybridization conditions include the temperature and the composition of the hybridization reagents or solutions. Specific hybridization assay conditions are set forth infra in the Examples section. Other acceptable stringent hybridization conditions can be readily ascertained by those having ordinary skill in the art.

As used herein, the term "substantially corresponding to" denotes a situation wherein an oligomer is capable of annealing to a complementary oligo hybridizing sequence in a target nucleic acid, permitting accurate hybridization to or detection of the target nucleic acid sequence in a sample (in the presence of other nucleic acids found in testing samples). In certain embodiments, an oligonucleotide "substantially corresponds to" an oligo hybridizing sequence where complementarity base paring ranges from 100% to about 80%, from 100% to about 85%, or from 100% to about 90%, or from 100% to about 95%. The degree of complementarity may also be described in terms of the number of nucleotide substitutions or nucleotide mismatches within a sequence.

"Homologs" are contiguous nucleotide sequences that are similar to the contiguous nucleotide sequence of the target nucleic acid sequence, but ultimately not the intended target of the amplification primer or detection probes. Accordingly, when designing amplification oligonucleotides for real-time PCR, selecting unique oligo hybridizing sequences on the target nucleic acid sequence reduces the possibility that the amplification oligonucleotides will anneal and amplify homologous sequences.

The term "non-target-specific sequence" or "non-target-hybridizing sequence" refers to a region of an oligomer wherein the region does not anneal to a complementary oligo hybridizing sequence in the target nucleic acid under standard hybridization conditions. Such non-target-specific sequence can be complementary to a portion of a target-specific sequence in the oligonucleotide. Examples of oligomers with non-target-specific sequences include, but are not limited to, molecular beacons.

"Sense" and "antisense" are used to describe the two complementary polynucleotide strands (arranged 5' to 3') that run in opposite directions. As an example, double-stranded DNA is composed of anti-parallel strands sense and antisense strands. The antisense strand serves as the template for the transcription, and contains complementary nucleotide sequence to the transcribed mRNA.

Generally, a person of ordinary skill in the art of molecular biology will appreciate the phrase "or its complement," or "an RNA equivalent," or "DNA/RNA chimeric thereof," with reference to a DNA sequence, includes (in addition to the referenced DNA sequence) the complement of the DNA sequence, an RNA equivalent of the referenced DNA sequence, an RNA equivalent of the complement of the referenced DNA sequence, a DNA/RNA chimeric of the referenced DNA sequence, and a DNA/RNA chimeric of the complement of the referenced DNA sequence. Similarly, the phrase "or its complement," or "an RNA equivalent," or "DNA/RNA chimeric thereof," with reference to an RNA sequence, includes (in addition to the referenced RNA sequence) the complement of the RNA sequence, a DNA equivalent of the referenced RNA sequence, a DNA equivalent of the complement of the referenced RNA sequence, a DNA/RNA chimeric of the referenced RNA sequence, and a DNA/RNA chimeric of the complement of the referenced RNA sequence.

The acronym VZV refers to Varicella-Zoster Virus; a human virus belonging to the α-herpesvirus family. According to the National Center for Biotechnology Information (NCBI), the laboratory strain of VZV is 124,884 nucleotides long. VZV causes primary infections (e.g., chickenpox), and may cause secondary infections (e.g., Shingles).

The term "VZV nucleic acid sequence" as used herein refers to the entire Varicella-Zoster Virus. Specifically, VZV nucleic acid sequence is used herein to describe the entire laboratory strain of VZV (124,884 nucleotides in length), as defined by NCBI.

The term "target nucleic acid region" as used herein, refers to a particular gene or region within the VZV nucleic acid sequence.

A "target nucleic acid" or "target" is a nucleic acid containing a target nucleic acid sequence. A "target nucleic acid sequence," "target sequence" or "target region" is contiguous nucleotide sequence (within the larger contiguous target nucleic acid region), where the amplification oligonucleotides anneal and comprises a nucleotide sequence of a target organism, such as VZV, to be amplified. A target sequence, or a complement thereof, contains sequences that hybridize to amplification primers, and/or detection probes used to amplify and/or detect the target nucleic acid. The target nucleic acid may include other sequences besides the target sequence which may not be amplified. Target nucleic acids may be DNA or RNA and may be either single-stranded or double-stranded. A target nucleic acid can be, but is not limited to, a genomic nucleic acid, a transcribed nucleic acid, such as an rRNA, or a nucleic acid derived from a genomic or transcribed nucleic acid. The contiguous nucleotide sequence between the forward and reverse amplification primers defines the polynucleotide to be amplified.

The term "oligo hybridizing sequence" or "oligo hybridization sequence" refers to the location (e.g., contiguous nucleotide sequence) within the broader target nucleic acid sequence, wherein the amplification primer or detection probe binds (i.e., anneals or hybridizes). In some instances, reference to an oligo hybridizing sequence includes both sense and antisense sequences.

The term "region" refers to a subset of contiguous nucleotides contained within the broader VZV nucleic acid sequence, wherein the contiguous subset contains fewer nucleotide base pairs than the larger polynucleotide. As a non-limiting example, where the polynucleotide is the target nucleic acid sequence, the term region may be used to denote the smaller oligo hybridizing sequences.

"Amplification" refers to any known procedure for obtaining multiple copies of a target nucleic acid sequence or its complement or fragments thereof. Known amplification methods include thermal amplification methods and isothermal amplification methods. Polymerase chain reaction (PCR), ligase chain reaction (LCR), strand-displacement amplification (SDA), Transcription Mediated Amplification (TMA, e.g., as described in Kacian and Fultz, U.S. Pat. No. 5,888,779; and International Patent Application Pub. Nos. WO 2007/146154 A1 & WO 2006/026388 A2), and Nucleic Acid Sequence Based Amplification (NASBA) are non-limiting examples of polynucleotide amplification methods. Replicase-mediated amplification uses self-replicating RNA molecules, and a replicase such as QB-replicase (e.g., U.S. Pat. No. 4,786,600). PCR amplification uses a DNA polymerase, pairs of primers, and thermal cycling to synthesize multiple copies of double stranded DNA from template or target double stranded DNA (dsDNA) or complementary DNA (cDNA) (e.g., U.S. Pat. Nos. 4,683,195, 4,683,202, and 4,800,159). LCR amplification uses four or more different oligonucleotides to amplify a target and its complementary strand by using multiple cycles of hybridization, ligation, and denaturation (e.g., U.S. Pat. Nos.

5,427,930 and 5,516,663). SDA uses a primer that contains a recognition site for a restriction endonuclease and an endonuclease that nicks one strand of a hemimodified DNA duplex that includes the target sequence, whereby amplification occurs in a series of primer extension and strand displacement steps (e.g., U.S. Pat. Nos. 5,422,252; 5,547,861; and 5,648,211). An "amplicon" or "amplification product" is a nucleic acid molecule(s) generated in a nucleic acid amplification reaction and which is derived from a target nucleic acid. An amplicon or amplification product contains a target nucleic acid sequence that may be of the same and/or opposite sense as a target nucleic acid.

"Polymerase chain reaction" (PCR) refers to cyclic amplification method by which a specific sequence of target DNA or cDNA, is copied and replicated. Using amplification oligonucleotides, heat-stable DNA polymerase, and thermal cycling, PCR reactions generate many copies of the specific target nucleic acid sequences (e.g., amplicons) of polynucleotides. As PCR amplifies exponentially (doubling the number of target nucleic acid sequences with each amplification cycle), a PCR consisting of 40 cycles may yields millions of copies of the target nucleic acid. PCR comprises three steps: (1) denaturation, wherein high temperature is used to "melt" dsDNA into single strands (generally accomplished around 95° C., although the temperature may be increased if template GC content is high); (2) annealing, wherein amplification primers can anneal to the target nucleic acid sequence (generally accomplished around 5° C. below the calculated melting temperature ($T_m$) of the amplification primers); and (3) extension, wherein a heat-stable polymerase is used to generate amplicons (e.g., 70-72° C.). Amplicons are generally less than 1000 bases in length. In some embodiments, an amplicon is 60-200 bases in length. In some embodiments, detection and quantification of the amplicon is performed after the PCR reaction is completed, and involves the use agarose gel and image analysis.

"Real-time amplification," "real-time detection," or "real-time PCR" refers to detection of the amplicon in real-time, during amplification. Real-time PCR uses specific amplification oligonucleotides that have been configured to target nucleic acid sequence. Real-time PCR allows for the quantification of the amplicon product in real-time (at the end of each amplification cycle). Accordingly, real-time PCR further incorporates detection probes for real-time quantification of amplicons present in the sample. In some embodiments, the detection probe contains a fluorophore. The level of fluorescence is a direct measure of the amount of amplified product present in the reaction. The fluorescence can be measured continuously during the amplification reaction or at the end of each cycle. By plotting relative fluorescence vs. cycle number, an amplification plot may be generated to show the amount of amplified product generated over time. Any of the known real-time detection methods, systems, and/or instruments known in the art may be used with the described amplification oligonucleotides.

An "amplification primer" or "primer" (e.g., first amplification primer, second amplification primer, forward amplification primer, second amplification primer, forward primer, and reverse primer) refers to an amplification oligonucleotide that hybridizes to a target nucleic acid, or its complement, and participates in a nucleic acid amplification reaction. An amplification primer hybridizes to a template nucleic acid and has a 3'-OH (3'-hydroxyl) group that can be extended by polymerization. In some embodiments, an amplification primer is single stranded. In some embodiments, an amplification primer is predominantly single stranded, having 5 or fewer base pairs. In some embodiments, an amplification primer is 19-50, 19-40, or 19-30 nucleobases in length. In some embodiments, an amplification primer is 19, 20, 21, 22, 23, 24, 25, 26, 27, 28, 29, or 30 nucleobases in length. An amplification primer comprises a target hybridizing sequence that anneals to a target nucleic acid sequence. The target hybridizing sequences of the forward and reverse amplification primers hybridize to complementary nucleotide sequences on the target nucleic acid sequence. The forward and reverse amplification primers hybridize to specific oligo hybridizing sequences in the target nucleic acid sequence and flank the target nucleic acid sequence to be amplified. The target hybridizing sequence of an amplification primer may be at least about 80%, at least about 90%, at least about 95% or completely (100%) complementary to its oligo hybridizing sequence in the target nucleic acid sequence. Amplification primers may further comprise non-target-hybridizing sequences. Such non-target-hybridizing sequences include tags, adaptors, barcodes, promoters, self-complementary regions, and other nucleic acid components, as is understood in the art.

In cyclic amplification methods that detect amplicons in real-time (e.g., real-time PCR), the term "baseline" refers to the measurable signal level detected during the initial amplification cycles. This low-level signal is often called "background" or "noise" and will vary depending on experimental conditions. Throughout the early cycles (generally amplification cycles: 1-15), there is little fluctuation in the fluorescent signal. However, as the reaction progresses (generally cycles 15+), the measure of fluorescence begins to increase exponentially with each cycle. Calculation of the baseline typically excludes cycles where the measured amplification signal begins to rise above background.

The term "threshold" correlates to the point at which the measured fluorescent signal is deemed statistically greater than the baseline (e.g., background) signal; thereby differentiating measurable amplification signals from the noise. In some embodiments, the threshold is set at 10× the standard deviation of the fluorescence value of the baseline.

The term "threshold cycle" ($C_t$) is the particular cycle number where the fluorescent signal of the reaction crosses the threshold. Notably, $C_t$ can be used to calculate the initial DNA copy number, as the $C_t$ value is inversely proportional to the starting amount of target. Give the same amount of input, one amp/detect system can have lower CT than another amp/detection system. The cause of this CT difference is the sensitivity of the primers. Similarly, reaction components (non-nucleic acid) can alter Ct.

In real-time PCR reactions, the "standard curve" refers to the mathematical formula by which the actual effectiveness (measured efficiency) of the amplification is compared to the theoretical effectiveness. While there are various methods used to calculate a standard curve, commonly, a standard curve is generated by creating a dilution series of the target nucleic acid sequence and performing real-time PCR (operating under the theory that amplification primers should generate a proportional dose-response curve). In some aspects, the dilution range for the standard curve spans the concentration range anticipated for the experimental samples. The results, when plotted on a graph (with $C_t$ values on the y-axis) generates the slope used to compare reaction efficiency. As the theoretical efficiency of PCR should be 100% (indicating the template doubles after each cycle during exponential amplification) efficiency data provides valuable information about the reaction. Importantly, experimental factors such as the length of the primers, primer composition (and presence of secondary structures), and GC content of the amplicon can lower efficiency.

The term "normalization" is used herein to describe the process by which relative $C_t$ values (indicative of biological differences between samples), is not falsely influenced by non-biological factors (e.g., variances in sample preparation or salt concentrations in the solution). Thus, normalization mitigates the effects of experimental variability and may be used as an internal control. Generally, a person of ordinary skill in the art of molecular biology will appreciate the various methods for normalization, which include normalizing to a sample quantity, normalizing to RNA or DNA quantity, or normalizing to a reference gene. Typically, normalizing to a reference gene such as a housekeeping gene (endogenous control) is used for addressing variability in real-time PCR as endogenous controls yield consistent expression between samples. Commonly employed endogenous normalizers include, but not limited to, the genes encoding cytoskeletal components such as β-actin, ribosomal subunits such as 18S rRNA, serine-threonine phosphatase inhibitors such as Cyclophilin A, and glycolysis pathway proteins such as Glyceraldehyde 3-phosphate dehydrogenase (GAPDH). Common housekeeping genes can be found in *BioTechniques* 29:332 (2000) and *J Mol Endocrinol* 25:169 (2000).

The "internal control" (IC) is a nucleic acid sequence that is amplified in parallel to the sample, and which may indicate whether the assay steps and/or assay conditions were properly performed, and/or the reagents and devices were functional. An IC can be either exogenous or endogenous. Exogenous cellular sources may include cells that, when added into the sample, are exposed to the same sample processing procedures as the sample and amplified and optionally detected using the same amplification primers and detection probes. Detection of a signal from the amplified IC (without detecting a signal from the intended target nucleic acid sequence) indicates that the assay was properly performed and that the sample tested negative for VZV. Endogenous IC are a cellular source typically associated/found with the sample specimen (e.g., housekeeping gene such as β-actin). Endogenous cellular sources are likewise processed and amplified and optionally detected using the same amplification primers and/or detection probes. Similarly, detection of a signal from the amplified IC, in the absence of signal from the intended target nucleic acid sequence, indicates proper experimental design and that the samples were negative for VZV (See e.g., Poljak et al., J. Clin. Virol, 25: S89-97, 2002; U.S. Pat. No. 6,410,321; and U.S. Patent Application Publication No. 2004-0023288; each incorporated by reference herein). Additionally, the IC may also be used as an internal calibrator for the assay when a quantitative result is desired. IC for primers and probes may be configured using any variety of well-known methods provided that the primers and probe function for amplification of the IC target sequence and that detection of the amplified IC sequence is be possible under similar assay conditions used to amplify and detect an amplicon from a target nucleic acid sequence from VZV.

"Relative fluorescence unit" (RFU) is a unit of measurement of fluorescence intensity. RFU varies with the characteristics of the detection means used. RFU can be used to comparatively quantify PCR product between samples and/or controls. Samples that contain higher quantities of amplified product will have higher corresponding RFU values.

"Specificity," refers to the degree of hybridization between the specific arrangement of contiguous nucleotides comprising the oligonucleotide, such as a primer and/or detection probe, to the specific arrangement of contiguous nucleotides comprising the oligo hybridizing sequence on the target nucleic acid sequence (e.g., specificity is the ability to distinguish between target and non-target sequences). In terms of nucleic acid amplification, specificity generally refers to the ratio of the number of specific amplicons produced compared to the number of side-products or non-target amplicons (e.g., the signal-to-noise ratio). With regards to detection, specificity generally refers to signal pertaining to the detection probe's binding affinity to the intended target nucleic acid sequence, as compared to the signal produced from non-target nucleic acids.

A "melting curve analysis" measures the change in fluorescence when dsDNA disassociates into single-stranded DNA (ssDNA), and may be used to measure primer specificity. Fluorescence is detectable when the melting temperature ($T_m$) provides for decoupling of dsDNA into single-stranded DNA, and the subsequent processes involved in amplification successfully cleaves the detection probe. The resulting fluorescence can be measured and plotted against temperature ($-\Delta F/\Delta T$). Analogous PCR products are often compared using melting characteristics.

The term "sensitivity" is used herein to define the precision with which amplification product can be detected and/or quantitated. The sensitivity of an amplification reaction is generally a measure of the smallest copy number of the target nucleic acid sequence that can be reliably detected. Generally, two to ten copies are considered the lowest number of target nucleic acid sequences that can be consistently quantified.

A "detection probe" (also termed "detection oligomer" or "probe") refers to an oligonucleotide comprising a target hybridizing sequence that anneals to a specific oligo hybridizing sequence, under conditions that promote hybridization. Specifically, a detection probe is used to identify the existence of the target nucleic acid sequence or amplicon. Detection may be direct (e.g., the contiguous nucleotide sequence comprising the detection probe will hybridize directly to the complementary contiguous nucleotide sequence comprising the oligo hybridizing sequence on the target nucleic acid) or indirect (e.g., a probe hybridizes to an intermediate structure that links the probe to the target nucleic acid sequence such as a hairpin structure (e.g., U.S. Pat. Nos. 5,118,801, 5,312,728, 6,835,542, and 6,849,412)). Detection probes are designed to anneal to the target nucleic acid sequence between the forward and reverse amplification primers. Detection probes may further comprise non-target-hybridizing sequences. Such non-target-hybridizing sequences include self-complementary regions, tags, and other nucleic acid components, as is understood in the art. Generally, a person of ordinary skill in the art of molecular biology will appreciate that probes may be produced by various techniques such as chemical synthesis, or by in vitro or in vivo expression from recombinant nucleic acid molecules. Detection probes may be DNA or RNA oligomers, or oligomers that contain a combination of DNA and RNA nucleotides, or oligomers synthesized with a modified backbone (e.g., oligomers with one or more 2'-methoxy substituted ribonucleotides). Commonly, a detectable label is attached to a detection probe. In some embodiments, a detection probe is 20-50, 20-45, 20-40, 20-35, or 20-30 nucleobases in length. In some embodiments, an amplification primer is 20, 21, 22, 23, 24, 25, 26, 27, 28, 29, 30, 31, 32, 33, 34, or 35 nucleobases in length A "label" or "detectable label" refers to a moiety or compound joined directly (or indirectly) to a probe that is detectable or generates a detectable signal. Labels may be attached to a probe by various means including covalent linkages, chelation, and ionic interactions. For example, TaqMan™ probes utilize covalent bonds to attach a reporter dye and a common quencher dye on the 5' and 3' end. Indirect attachment of a label may use a bridging moiety or linker (e.g., antibody or additional oligonucleotide(s)) to amplify a detectable signal. Detectable labels include, but are not limited to, radionuclides, ligands (e.g., biotin or avidin), enzymes, enzyme substrates, reactive groups, chromophores (e.g., dyes, or particles such as latex or metal bead), luminescent compounds (e.g., bioluminescent, phosphorescent, or chemiluminescent compounds), and fluorescent compounds (e.g., fluorophore). Detectable labels include compounds that emit a detectable light signal (e.g., fluorophores) or luminesce (e.g., chemiluminescent compounds) that can be detected in a homogeneous mixture. More than one label, or more than one type of label, may be present on a particular probe. Detection may rely on using a mixture of probes in which each probe is labeled with a compound that produces a detectable signal (see, e.g., U.S. Pat. Nos. 6,180,340 and 6,350,579, each incorporated by reference herein). Although many real-time fluorescent PCR chemistries exist, fluorescent detection probes, which generally utilize 5' nuclease activities in combination with a quencher molecule that absorbs light when in close proximity to the fluorophore, are the most widely used. In addition to TaqMan™ probes, examples of other commonly utilized labels include molecular torches, and molecular beacons. In some embodiments, a TaqMan™ probe, molecular torch, or molecular beacon contains a non-fluorescent acceptor (quencher) that does not fluorescence from direct quencher excitation.

"Fluorescence resonance energy transfer" (FRET) describes the interaction between a first fluorescent dye (e.g., "reporter dye") on the 5' domain, and a second fluorescent dye (e.g., "quencher") on the 3' domain, of the detection probe. With the detection probe intact, the quencher (comprising a longer wavelength) absorbs the higher energy emitted from reporter dye's shorter wavelength. However, during PCR, the DNA polymerase's 5' nuclease activity (and subsequent enzymatic degradation of the detection probe) consequently separates the 5' reporter from the 3' quenching dyes, thus eliminating the quencher's ability to absorb the fluorescent signal emitted from the reporter dye. Accordingly, with the quencher no longer in close proximity, the signal emitted from the higher energy reporter can be measured. Detection probes comprising both a fluorescent label and a quencher like TaqMan™ detection probes are particularly useful, as the liberation of the fluorescent label (e.g., reporter dye) on the 5' domain and subsequent increased fluorescence can be used to quantify the relative amount of amplicon product in a quantitative real-time PCR reaction. Specific variations of such detection probes include, e.g., a TaqMan™ detection probe (Catalog Number: 401846, Thermo Fisher Scientific; developed by Roche Molecular Diagnostics, Pleasanton, CA; U.S. Pat. Nos. 5,723,591, 5,801,155, and 6,084,102). It is well-known to a person of ordinary skill in the art of molecular biology that mismatched fluorophores and quencher pairings can lead to increased background fluorescence. Synthetic techniques and methods of bonding labels to nucleic acids and detecting labels are well known in the art (e.g., see Sambrook et al., Molecular Cloning. A Laboratory Manual. 2nd ed. (Cold Spring Harbor Laboratory Press, Cold Spring Harbor, NY, 1989), Chapter 10; Nelson et al., U.S. Pat. No. 5,658,737; Woodhead et al., U.S. Pat. No. 5,656,207; Hogan et al., U.S. Pat. No. 5,547,842; Arnold et al., U.S. Pat. No. 5,283,174; Kourilsky et al., U.S. Pat. No. 4,581,333), and Becker et al., European Patent App. No. 0747706.

"Molecular beacons" are single-stranded, bi-labeled, fluorescent probes that exhibit self-complementarity, and form a hairpin-loop conformation. Label moieties for molecular beacons include a first moiety comprising a fluorophore and a second moiety comprising a quencher. The stem of the hairpin-loop is held together by self-complementarity base pairing of the 5' and 3' ends of the probe that contain the reporter and quencher molecules. In some embodiments, a molecular beacon contains a 4-6 nucleotide sequence at the 5' end that is complementary to and can hybridize with a 4-6 nucleotide sequence at the 3' end. In some embodiments, the either the 5' or 3' complementary sequence is a non-target-hybridizing sequence (also termed a target closing domain). In some embodiments, the 4-6 nucleotide sequence at the 3' end that is complementary to and can hybridize with 4-6 nucleotide at the 5' end is linked to the molecular beacons via a linker. In some embodiments, the linker is a C1-C16 linker. In some embodiments, the linker is a C9 linker. Molecular beacons are designed so that the target binding domain favors hybridization to the target sequence over the target closing domain. In some embodiments, a molecular beacon contains a fluorescent molecule attached to the 5' end and a quencher attached to the 3' end. Alternatively, a fluorescent molecule can be attached to the 3' end of the torch and a quencher attached to the 5' end of the detection oligomer. Upon hybridization, the hairpin-loop structure opens, thus separating the reporter from the quencher (disabling the effectiveness of the quencher). With the quencher no longer in proximity to the reporter, fluorescence can be measured. The fluorescence emitted is directly proportional to the amount of target DNA. Molecular Beacons are fully described in U.S. Pat. No. 5,925,517.

"Molecular torches" can be used to indicate whether an amplicon is present in the sample. Molecular torches include distinct regions of self-complementarity. When exposed to the target, the two self-complementary regions (fully or partially complementary) of the molecular torch melt, thus allowing for the individual nucleotides (comprising the target binding domain) to hybridize to the complementary contiguous nucleotides on the target nucleic acid sequence. Importantly, molecular torches are designed so that the target binding domain favors hybridization to the target nucleic acid sequence over the target closing domain. The target binding domain and the target closing domain of a molecular torch include interacting labels (e.g., fluorescent dye and quencher), so that a different signal is produced when the molecular torch is self-hybridized, as opposed to when the molecular torch is hybridized to a target nucleic acid sequence (thereby permitting detection of probe:target duplexes in a test sample in the presence of unhybridized probe). Methods of synthesizing labels, attaching labels to nucleic acid, and detecting signals from labels are well known in the art (e.g., Sambrook et al., Molecular Cloning, A Laboratory Manual, 2nd ed. (Cold Spring Harbor Laboratory Press, Cold Spring Harbor, NY, 1989) at Chapter 10, and U.S. Pat. Nos. 5,658,737, 5,656,207, 5,547,842, 5,283, 174, and 4,581,333, and EP Pat. App. 0747706).

"Delta G" or "ΔG" represents the amount of energy required to melt or dissociate a hybrid. The greater the ΔG (larger negative value), the greater the amount of energy needed to dissociate two hybridized sequences. A low ΔG number (negative value closer to zero) indicates less energy is needed to melt or dissociate a hybrid. Importantly, energy is proportional to temperature (higher ΔG requires higher temperatures).

References to "SEQ ID NO:_" refers to a contiguous nucleotide sequence of the corresponding sequence listing entry, and does not require identity of the backbone (e.g., RNA, 2'-O-Me RNA, or DNA) or base modifications (e.g., methylation of cytosine residues) unless otherwise indicated.

The term "isolated," is used herein in reference to a nucleic acid is taken from its natural milieu, but the term does not connote any degree of purification.

"Sample preparation" refers to any steps or methods required to prepare a sample for amplification and/or detection. Sample preparation may include any known method of concentrating components, such as polynucleotides, from a larger sample volume, such as by filtration of airborne or waterborne particles from a larger volume sample or by isolation of microbes from a sample by using standard microbiology methods. Sample preparation may also include physical disruption and/or mechanical disruption and/or chemical lysis of cellular components to release intracellular components into a substantially aqueous or organic phase and removal of debris. Sample preparation may also include use of a polynucleotide to selectively or non-specifically capture a target nucleic acid and separate it from other sample components (e.g., as described in U.S. Pat. No. 6,110,678 and International Patent Application Pub. No. WO 2008/016988, each incorporated by reference herein).

The term "separating," or "purifying," refers to removal of one or more components of a mixture, such as a sample, from one or more other components in the mixture. Sample components may include nucleic acids, cellular fragments, proteins, carbohydrates, lipids, and other compounds. Separating or purifying does not connote any particular degree of purification. In some embodiments, at least 70%, at least 75%, at least 80%, at least 85%, at least 90%, or at least 95%, of the target nucleic acid or amplified product is separated or removed from other components in the mixture A "degenerate" base refers to a nucleotide that can for a base pair with, or hybridize to, more than one nucleobase. A "wobble base pair" is a pairing between two nucleotides in RNA molecules that does not follow Watson-Crick base pair rules (e.g., binding between pyrimidines (C and T) or purines (A and G)). The presence of degenerate bases doesn't necessarily prevent the formation of a stable hybrid, as imperfect hybrids may form reasonably stably duplexes. 5-nitroindole is one examples of a degenerate base, which can pair with all four naturally-occurring bases.

Any of the described amplification oligonucleotides can contain at least one modified nucleotide. The modified nucleotide can be, but is not limited to, 2'-O-methyl modified nucleotide, 2'-fluoro modified nucleotide, or a 5-methyl cytosine. In some embodiments, the 2'-O-methyl modified nucleotide is a 2'-OMe ribonucleotide. In some embodiments, an amplification oligonucleotide comprises two or more modified nucleotides. In some embodiments, all of the nucleotides in an amplification oligonucleotide are modified. The two or more modified nucleotides may be the same or different. In some embodiments, any of the described amplification oligonucleotides can contain one or more 5-methyl cytosine. An amplification oligonucleotide can have 1, 2, 3, 4, 5, 6, 7, or more 5-methyl cytosines. In some embodiments, all cytosine nucleotides in an amplification oligonucleotide are 5-methyl cytosine modified nucleotides. An amplification oligonucleotide can have 1, 2, 3, 4, 5, 6, 7, or more 2'-OMe ribonucleotides. In some embodiments, all nucleotides in an amplification oligonucleotide are 2'-OMe ribonucleotides. In some embodiments, thymidine nucleotides can be substituted for uridine nucleotides. In some embodiments, all thymidine nucleotides can be substituted for uridine nucleotides. In some amplification oligonucleotides, 5-methyl-2'-deoxycytosine bases can be used to increase the stability of the duplex by raising the Tm by about 0.5°-1.3° C. for each 5-methyl-2'-deoxycytosine (5-Me-dC) incorporated in an oligonucleotide (relative to the corresponding unmethylated amplification oligonucleotides).

The term "assay conditions" is used to indicate conditions allowing for the stable hybridization of an oligonucleotide to a specific oligo hybridizing sequence. Assay conditions do not require preferential hybridization of the oligonucleotide to the target nucleic acid.

The term "stable" or "stable for detection" indicates a temperature of a reaction mixture below the temperature at which a nucleic acid duplex denatures.

DETAILED DESCRIPTION

The present disclosure provides for amplification oligonucleotides, oligonucleotide compositions, kits, methods, formulations, and reaction mixtures for the detection of VZV in a sample. Furthermore, the oligonucleotide compositions, kits, methods, formulations, and reaction mixtures are additionally useful for generating an amplicon from a target nucleic acid sequence of VZV, if present, in a sample. Amplification and detection of VZV can be used in diagnoses. Diagnosis can be used to facilitate effective treatment to limit spread of the virus. As such, the amplification oligonucleotides, oligonucleotide compositions, kits, methods, formulations, and reaction mixtures are useful for screening individuals who may have VZV infections (with or without exhibiting symptoms), or for those individuals who pose a higher risk of serious complications from VZV infections (e.g., the young, elderly, or immunocompromised). As such, the oligonucleotide compositions, kits, methods, formulations, and reaction mixtures disclosed respond to the need for rapid, sensitive, and specific testing of clinical samples from patients that may have been infected with or exposed to VZV.

In certain aspects, the oligonucleotide compositions, kits, and methods disclosed herein include amplification primers for the amplification of target nucleic acid sequences within the VZV nucleic acid sequence. In some aspects, the oligonucleotide compositions, kits, and methods disclose detection probes for the detection of VZV. In some embodiments, the amplification primers and detection probes are two separate products. In some embodiments, the amplification primers and detection probes are provided in a kit. In certain aspects, the disclosure is directed to oligonucleotide compositions, kits and methods for contacting a sample with at least one amplification primer pair and performing an in vitro nucleic acid amplification reaction; wherein any target nucleic acid sequences present in the sample can be used as a template for generating an amplification product. In some aspects, the disclosure is directed to oligonucleotide compositions, kits and methods for contacting a sample with at least one detection probe; wherein any target nucleic acid sequences present in the sample or amplification products thereof, can hybridize to the detection probe to facilitate detection.

In certain aspects, the oligonucleotide compositions, kits, and methods disclosed herein provide guidance for utilizing at least one amplification primer pair for generating an amplicon from a target nucleic acid sequence within a particular target nucleic acid region of the VZV nucleic acid sequence. In certain aspects, the oligonucleotide compositions, kits, and methods disclosed herein provide guidance for utilizing at least one detection probe to detect VZV in a sample. Any application of specific combinations of amplification primers or detection probes is likewise to be understood as disclosing methods for the amplification or detection of a target nucleic acid sequence of VZV.

In certain aspects, the VZV amplification oligonucleotides disclosed herein are configured to specifically hybridize to complementary nucleotide subunits within the target nucleic acid sequence, thus minimizing cross-reactivity to other, non-VZV nucleic acids (if present) in a sample.

In certain aspects, the oligonucleotide compositions, kits, and methods disclosed herein comprise at least one amplification primer. In certain aspects, the oligonucleotide compositions, kits, and methods comprise one or more sets or pairs of amplification primers. In some embodiments, a set of amplification primers comprises a first amplification primer and second amplification primer. In some embodiments, a set of amplification primers comprises a forward amplification primer and reverse amplification primer. In certain aspects, the oligonucleotide compositions, kits, and methods comprise a single set of forward and reverse amplification primers that produce a single amplicon of the target nucleic acid sequence from a target nucleic acid region. In certain aspects, the oligonucleotide compositions, kits, and methods comprise two or more sets of amplification primers that produce two or more amplicons. The two or more amplicons can be from two or more regions within a single target nucleic acid, from two or more target nucleic acids, or a combination thereof. The two or more target nucleic acids from be from the same organism or from different organisms.

In certain aspects of the oligonucleotide compositions, kits, and methods, the amplification oligonucleotides are configured to specifically anneal to oligo hybridizing sequences within target nucleic acid regions of SEQ ID NO:38 and SEQ ID NO:39 of a VZV nucleic acid sequence (if present) in a sample.

In certain aspects of the oligonucleotide compositions, kits, and methods, wherein the target nucleic acid region is SEQ ID NO:38, the forward and the reverse amplification primers are each independently from about 19 to about 23 nucleotides in length and configured to generate an amplicon about 89 to about 127 nucleotides in length from the target nucleic acid region of SEQ ID NO:38.

In certain aspects of the oligonucleotide compositions, kits, and methods, wherein the target nucleic acid region is SEQ ID NO:38, the forward amplification primer is selected from the group consisting of SEQ ID NOs: 1, 2, 3, 4, 5, 6 and 7, the reverse amplification primer is from about 19 to about 23 nucleotides in length, and the forward and reverse amplification primers are configured to generate an amplicon from a target nucleic acid sequence within SEQ ID NO:38 that is from about 89 to about 127 nucleotides in length. In certain aspects, wherein the target nucleic acid region is SEQ ID NO:38, the forward amplification primer comprises the sequence of SEQ ID NO:1. In certain aspects, wherein the target nucleic acid region is SEQ ID NO:38, the forward oligomer comprises the sequence of SEQ ID NO:2. In certain aspects, wherein the target nucleic acid region is SEQ ID NO:38, the forward oligomer comprises the sequence of SEQ ID NO:3. In certain aspects, wherein the target nucleic acid region is SEQ ID NO:38, the forward oligomer comprises the sequence of SEQ ID NO:4. In certain aspects, wherein the target nucleic acid region is SEQ ID NO:38, the forward oligomer comprises the sequence of SEQ ID NO:5. In certain aspects, wherein the target nucleic acid region is SEQ ID NO:38, the forward oligomer comprises the sequence of SEQ ID NO:6. In certain aspects, wherein the target nucleic acid region is SEQ ID NO:38, the forward oligomer comprises the sequence of SEQ ID NO:7.

In certain aspects of the oligonucleotide compositions, kits, and methods, wherein the target nucleic acid region is SEQ ID NO:38, the forward amplification primer is selected from the group consisting of SEQ ID NOs: 1, 2, 3, 4, 5, 6 and 7, and the reverse amplification primer is from about 19 to about 23 nucleotides in length and selected from the group consisting of SEQ ID NOs: 16, 17, 18, 19, 20, 21 and 22. In certain aspects, wherein the target nucleic acid region is SEQ ID NO:38, the reverse oligomer comprises the sequence of SEQ ID NO:16. In certain aspects, wherein the target nucleic acid region is SEQ ID NO:38, the reverse oligomer comprises the sequence of SEQ ID NO:17. In certain aspects, wherein the target nucleic acid region is SEQ ID NO:38, the reverse oligomer comprises the sequence of SEQ ID NO:18. In certain aspects, wherein the target nucleic acid region is SEQ ID NO:38, the reverse oligomer comprises the sequence of SEQ ID NO:19. In certain aspects, wherein the target nucleic acid region is SEQ ID NO:38, the reverse oligomer comprises the sequence of SEQ ID NO:20. In certain aspects, wherein the target nucleic acid region is SEQ ID NO:38, the reverse oligomer comprises the sequence of SEQ ID NO:21. In certain aspects, wherein the target nucleic acid region is SEQ ID NO:38, the reverse oligomer comprises the sequence of SEQ ID NO:22.

In certain aspects of the oligonucleotide compositions, kits, and methods, wherein the target nucleic acid region is SEQ ID NO:38, the reverse amplification primer is selected from the group consisting of SEQ ID NOs: 16, 17, 18, 19, 20, 21 and 22 and the forward amplification primer is from about 20 to about 23 nucleotides in length and configured to generate an amplicon from a target nucleic acid sequence within SEQ ID NO:38 that is from about 89 to about 127 nucleotides in length.

In certain aspects of the oligonucleotide compositions, kits, and methods, wherein the target nucleic acid region is SEQ ID NO:38, and wherein the forward amplification primer is selected from the group consisting of SEQ ID NOs: 1, 2, 3, 4, 5, 6 and 7, and the reverse amplification primer is selected from the group consisting of SEQ ID NOs: 16, 17, 18, 19, 20, 21 and 22, the forward and reverse amplification primers are configured to generate an amplicon from a target nucleic acid sequence within SEQ ID NO:38 that is selected from the group consisting of 89, 93, 100, 102, 119, 123 and 127 nucleotides in length. In certain aspects, wherein the target nucleic acid region is SEQ ID NO:38, the amplicon is 89 nucleotides in length. In certain aspects, wherein the target nucleic acid region is SEQ ID NO:38, the amplicon is 93 nucleotides in length. In certain aspects, wherein the target nucleic acid region is SEQ ID NO:38, the amplicon is 100 nucleotides in length. In certain aspects, wherein the target nucleic acid region is SEQ ID NO:38, the amplicon is 102 nucleotides in length. In certain aspects, wherein the target nucleic acid region is SEQ ID NO:38, the amplicon is 119 nucleotides in length. In certain aspects, wherein the target nucleic acid region is SEQ ID NO:38, the amplicon is 123 nucleotides in length. In certain aspects, wherein the target nucleic acid region is SEQ ID NO:38, the amplicon is 127 nucleotides in length.

In certain aspects of the oligonucleotide compositions, kits, and methods, wherein the target nucleic acid region is SEQ ID NO:38, and wherein the forward amplification primer is selected from the group consisting of SEQ ID NOs:

1, 2, 3, 4, 5, 6 and 7, and the reverse amplification primer is selected from the group consisting of SEQ ID NOs: 16, 17, 18, 19, 20, 21 and 22, the forward and reverse amplification primers respectfully comprise target nucleic acid sequences corresponding to the oligo hybridization sequences of: (a) SEQ ID NO:1 and SEQ ID NO:16; (b) SEQ ID NO:1 and SEQ ID NO:17; (c) SEQ ID NO:2 and SEQ ID NO:17; (d) SEQ ID NO:3 and SEQ ID NO:18; (e) SEQ ID NO:4 and SEQ ID NO:19; (f) SEQ ID NO:5 and SEQ ID NO:20; (g) SEQ ID NO:6 and SEQ ID NO:21; (h) SEQ ID NO:7 and SEQ ID NO:22.

In certain aspects of the oligonucleotide compositions, kits, and methods, wherein the target nucleic acid region is SEQ ID NO:38: (a) the forward amplification primer and reverse amplification primer are configured to generate an amplicon from a target nucleic acid sequence that is at least about 89 nucleotides in length and flanked between SEQ ID NO:3 and SEQ ID NO:18 within the target nucleic acid region; (b) the forward amplification primer and reverse amplification primer are configured to generate an amplicon from a target nucleic acid sequence that is at least about 93 nucleotides in length and flanked between SEQ ID NO:4 and SEQ ID NO:19 within the target nucleic acid region; (c) the forward amplification primer and reverse amplification primer are configured to generate an amplicon from a target nucleic acid sequence that is at least about 100 nucleotides in length and flanked between SEQ ID NO:2 and SEQ ID NO:17 within the target nucleic acid region; (d) the forward amplification primer and reverse amplification primer are configured to generate an amplicon from a target nucleic acid sequence that is at least about 102 nucleotides in length and flanked between SEQ ID NO:7 and SEQ ID NO:22 within the target nucleic acid region; (e) the forward amplification primer and reverse amplification primer are configured to generate an amplicon from a target nucleic acid sequence that is at least about 119 nucleotides in length and flanked between SEQ ID NO:6 and SEQ ID NO:21 within the target nucleic acid region; (f) the forward amplification primer and reverse amplification primer are configured to generate an amplicon from a target nucleic acid sequence that is at least about 123 nucleotides in length and flanked between SEQ ID NO:1 and SEQ ID NO:17 within the target nucleic acid region; (g) the forward amplification primer and reverse amplification primer are configured to generate an amplicon from a target nucleic acid sequence that is at least about 127 nucleotides in length and flanked between SEQ ID NO:1 and SEQ ID NO:16 or SEQ ID NO:5 and SEQ ID NO:20 within the target nucleic acid region.

In certain aspects of the oligonucleotide compositions, kits, and methods, wherein the target nucleic acid region is SEQ ID NO:39, and the forward amplification primer and the reverse amplification primer are from about 20 to about 23 nucleotides in length and the forward and reverse amplification primers are configured to generate an amplicon from a target nucleic acid sequence within SEQ ID NO:39 that is from about 89 to about 143 nucleotides in length.

In certain aspects of the oligonucleotide compositions, kits, and methods, wherein the target nucleic acid region is SEQ ID NO:39, the forward amplification primer is selected from the group consisting of SEQ ID NOs: 23, 24, 25, 26 and 27, the reverse amplification primer is from about 20 to about 22 nucleotides in length, and the forward and reverse amplification primer are configured to generate an amplicon from a target nucleic acid sequence within SEQ ID NO:39 that is from about 89 to about 143 nucleotides in length. In certain aspects, wherein the target nucleic acid region is SEQ ID NO:39, the forward oligomer comprises the sequence of SEQ ID NO:23. In certain aspects, wherein the target nucleic acid region is SEQ ID NO:39, the forward oligomer comprises the sequence of SEQ ID NO:24. In certain aspects, wherein the target nucleic acid region is SEQ ID NO:39, the forward oligomer comprises the sequence of SEQ ID NO:25. In certain aspects, wherein the target nucleic acid region is SEQ ID NO:39, the forward oligomer comprises the sequence of SEQ ID NO:26. In certain aspects, wherein the target nucleic acid region is SEQ ID NO:39, the forward oligomer comprises the sequence of SEQ ID NO:27.

In certain aspects of the oligonucleotide compositions, kits, and methods, wherein the target nucleic acid region is SEQ ID NO:39, the forward amplification primer is selected from the group consisting of SEQ ID NOs: 23, 24, 25, 26 and 27 and the reverse amplification primer is from about 20 to about 22 nucleotides in length and selected from the group consisting of SEQ ID NOs: 34, 35, 36 and 37. In certain aspects, wherein the target nucleic acid region is SEQ ID NO:39, the reverse oligomer comprises the sequence of SEQ ID NO:34. In certain aspects, wherein the target nucleic acid region is SEQ ID NO:39, the reverse oligomer comprises the sequence of SEQ ID NO:35. In certain aspects, wherein the target nucleic acid region is SEQ ID NO:39, the reverse oligomer comprises the sequence of SEQ ID NO:36. In certain aspects, wherein the target nucleic acid region is SEQ ID NO:39, the reverse oligomer comprises the sequence of SEQ ID NO:37.

In certain aspects of the oligonucleotide compositions, kits, and methods, wherein the target nucleic acid region is SEQ ID NO:39, the reverse amplification primer is selected from the group consisting of SEQ ID NOs: 34, 35, 36 and 37, the forward amplification primer is from about 20 to about 23 nucleotides in length, and the forward and reverse amplification primers are configured to generate an amplicon from a target nucleic acid sequence within SEQ ID NO:39 that is from about 89 to about 143 nucleotides in length.

In certain aspects of the oligonucleotide compositions, kits, and methods, wherein the target nucleic acid region is SEQ ID NO:39, and wherein the forward amplification primer is selected from the group consisting of SEQ ID NOs: 23, 24, 25, 26 and 27, and the reverse amplification primer is selected from the group consisting of SEQ ID NOs: 34, 35, 36 and 37, the forward and reverse amplification primers are configured to generate an amplicon from a target nucleic acid sequence within SEQ ID NO:39 that is selected from the group consisting of consisting of 89, 99, 109, 126 and 143 nucleotides in length. In certain aspects, wherein the target nucleic acid region is SEQ ID NO:39, the amplicon is 89 nucleotides in length. In certain aspects, wherein the target nucleic acid region is SEQ ID NO:39, the amplicon is 99 nucleotides in length. In certain aspects, wherein the target nucleic acid region is SEQ ID NO:39, the amplicon is 109 nucleotides in length. In certain aspects, wherein the target nucleic acid region is SEQ ID NO:39, the amplicon is 126 nucleotides in length. In certain aspects, wherein the target nucleic acid region is SEQ ID NO:39, the amplicon is 143 nucleotides in length.

In certain aspects of the oligonucleotide compositions, kits, and methods, wherein the target nucleic acid region is SEQ ID NO:39, and wherein the forward amplification primer is selected from the group consisting of SEQ ID NOs: 23, 24, 25, 26 and 27, and the reverse amplification primer is selected from the group consisting of SEQ ID NOs: 34, 35, 36 and 37, the forward and reverse amplification primers respectfully comprise target nucleic acid sequences corresponding to the oligo hybridization sequences of: (a) SEQ ID NO:23 and SEQ ID NO:34; (b) SEQ ID NO:24 and SEQ ID NO:34; (c) SEQ ID NO:25 and SEQ ID NO:35; (d) SEQ ID NO:26 and SEQ ID NO:36; (e) SEQ ID NO:27 and SEQ ID NO:37.

In certain aspects of the oligonucleotide compositions, kits, and methods, wherein the target nucleic acid region is SEQ ID NO:39: (a) the forward amplification primer and the reverse amplification primer are configured to generate an amplicon from a target nucleic acid sequence that is at least about 89 nucleotides in length and flanked between SEQ ID NO:25 and SEQ ID NO:35 within the target nucleic acid region; (b) the forward amplification primer and the reverse amplification primer are configured to generate an amplicon from a target nucleic acid sequence that is at least about 99 nucleotides in length and flanked between SEQ ID NO:24 and SEQ ID NO:34 within the target nucleic acid region; (c) the forward amplification primer and the reverse amplification primer are configured to generate an amplicon from a target nucleic acid sequence that is at least about 109 nucleotides in length and flanked between SEQ ID NO:23 and SEQ ID NO:34 within the target nucleic acid region; (d) the forward amplification primer and the reverse amplification primer are configured to generate an amplicon from a target nucleic acid sequence that is at least about 126 nucleotides in length and flanked between SEQ ID NO:27 and SEQ ID NO:37 within the target nucleic acid region; (e) the forward amplification primer and the reverse amplification primer are configured to generate an amplicon from a target nucleic acid sequence that is at least about 143 nucleotides in length and flanked between SEQ ID NO:26 and SEQ ID NO:36 within the target nucleic acid region.

In certain aspects of the oligonucleotide compositions, kits, and methods, at least one amplification primer is configured to anneal to the target nucleic acid sequence in the forward orientation and at least one amplification primer is configured to anneal to the target nucleic acid sequence in the reverse orientation, and wherein the forward and reverse amplification primers specifically hybridize to the contiguous nucleotide sequence comprising the oligo hybridizing sequences on the target nucleic acid sequence to be amplified within the target nucleic acid regions of SEQ ID NO:38 or SEQ ID NO:39 of the VZV nucleic acid sequence (if present) in a sample.

In some embodiments of the oligonucleotide compositions, kits, and methods, a composition for determining the presence (or absence) of a target nucleic acid sequence of VZV in a sample includes (1) at least one forward amplification primer configured to specifically hybridize to an oligo hybridizing sequence within the target nucleic acid region of SEQ ID NO:38 or SEQ ID NO:39, and (2) at least one reverse amplification primer configured to specifically hybridize to an oligo hybridizing sequence within the target nucleic acid region of SEQ ID NO:38 or SEQ ID NO:39.

In certain aspects of the oligonucleotide compositions, kits, and methods, the forward amplification primer comprises at least one modified nucleobase. In certain aspects, the modified nucleobase is selected from the group consisting of: (a) a 2'-O-methyl; (b) a 5-methylcytosine; (c) a 2'-fluorine; and (d) a combination of two or more of (a), (b) and (c).

In certain aspects of the oligonucleotide compositions, kits, and methods, the forward amplification primer comprises from two to six modified nucleobases. The two to six modified nucleobases can be the same or different. In certain aspects, the forward amplification primer comprises from two to six 5-methylcytosine residues. In certain embodiments, the forward amplification primer comprises two 5-methylcytosine residues. In some embodiments, the forward amplification primer comprises three 5-methylcytosine residues. In certain embodiments, the forward amplification primer comprises four 5-methylcytosine residues. In certain embodiments, the forward amplification primer comprises five 5-methylcytosine residues. In certain embodiments, the forward amplification primer comprises six 5-methylcytosine residues. In certain aspects, the forward amplification primer comprises from two to six 2'-O-methyl residues. In certain embodiments, the forward amplification primer comprises two 2'-O-methyl residues. In some embodiments, the forward amplification primer comprises three 2'-O-methyl residues. In certain embodiments, the forward amplification primer comprises four 2'-O-methyl residues. In certain embodiments, the forward amplification primer comprises five 2'-O-methyl residues. In certain embodiments, the forward amplification primer comprises six 2'-O-methyl residues.

In certain aspects of the oligonucleotide compositions, kits, and methods, the reverse amplification primer further comprises at least one modified nucleobase. In certain aspects, the modified nucleobase is selected from the group consisting of: (a) a 2'-O-methyl; (b) a 5-methylcytosine; (c) a 2'-fluorine; and (d) a combination of two or more of (a), (b) and (c).

In certain aspects of the oligonucleotide compositions, kits, and methods, the reverse amplification primer comprises from two to six modified nucleobases. The two to six modified nucleobases can be the same or different. In certain aspects, the reverse amplification primer comprises from two to six 5-methylcytosine residues. In certain embodiments, the reverse amplification primer comprises two 5-methylcytosine residues. In some embodiments, the reverse amplification primer comprises three 5-methylcytosine residues. In some embodiments, the reverse amplification primer comprises four 5-methylcytosine residues. In some embodiments, the reverse amplification primer comprises five 5-methylcytosine residues. In some embodiments, the reverse amplification primer comprises six 5-methylcytosine residues. In certain aspects, the reverse amplification primer comprises from two to six 2'-O-methyl residues. In certain embodiments, the reverse amplification primer comprises two 2'-O-methyl residue. In some embodiments, the reverse amplification primer comprises three 2'-O-methyl residues. In some embodiments, the reverse amplification primer comprises four 2'-O-methyl residues. In some embodiments, the reverse amplification primer comprises five 2'-O-methyl residues. In some embodiments, the reverse amplification primer comprises six 2'-O-methyl residues.

In certain aspects of the oligonucleotide compositions, kits, and methods, a third oligomer is configured to specifically anneal to the target nucleic acid sequence to be amplified within the target nucleic acid region of SEQ ID NO:38 and SEQ ID NO:39 of the VZV nucleic acid sequence (if present) in a sample. In certain aspects, the third oligomer hybridizes to an oligo hybridization sequence within SEQ ID NO:38. In some embodiments, a third oligomer hybridizes to an oligo hybridization sequence within SEQ ID NO:39. In certain aspects of the oligonucleotide compositions, kits, and methods, the third oligomer is a detection probe.

In certain aspects of the oligonucleotide compositions, kits, and methods, wherein the target nucleic acid region is SEQ ID NO:38, the detection probe is from about 23 to about 27 nucleotides in length.

In certain aspects of the oligonucleotide compositions, kits, and methods, wherein the target nucleic acid region is SEQ ID NO:38, the detection probe is selected from the group consisting of SEQ ID NOs: 8, 9, 10, 11, 12, 13, 14 and 15. In certain aspects, wherein the target nucleic acid region is SEQ ID NO:38, the detection probe comprises the sequence of SEQ ID NO:8. In certain aspects, wherein the target nucleic acid region is SEQ ID NO:38, the detection probe comprises the sequence of SEQ ID NO:9. In certain aspects, wherein the target nucleic acid region is SEQ ID NO:38, the detection probe comprises the sequence of SEQ ID NO:10. In certain aspects, wherein the target nucleic acid region is SEQ ID NO:38, the detection probe comprises the sequence of SEQ ID NO:11. In certain aspects, wherein the target nucleic acid region is SEQ ID NO:38, the detection probe comprises the sequence of SEQ ID NO:12. In certain aspects, wherein the target nucleic acid region is SEQ ID NO:38, the detection probe comprises the sequence of SEQ ID NO:13. In certain aspects, wherein the target nucleic acid region is SEQ ID NO:38, the detection probe comprises the sequence of SEQ ID NO:14. In certain aspects, wherein the target nucleic acid region is SEQ ID NO:38, the detection probe comprises the sequence of SEQ ID NO:15.

In certain aspects of the oligonucleotide compositions, kits, and methods, wherein the target nucleic acid region is SEQ ID NO:38, the detection probe comprises a target nucleic acid sequence substantially corresponding to the oligo hybridization sequence of: SEQ ID NO:8 if the forward and reverse amplification primers are (I) SEQ ID NO:1 and SEQ ID NO:16 or (II) SEQ ID NO:1 and SEQ ID NO:17; SEQ ID NO:9 if the forward and reverse amplification primers are (I) SEQ ID NO:1 and SEQ ID NO:16 or (II) SEQ ID NO:1 and SEQ ID NO:17 or (III) SEQ ID NO:2 and SEQ ID NO:17; SEQ ID NO:10 if the forward and reverse amplification primers are SEQ ID NO:3 and SEQ ID NO:18; SEQ ID NO:11 if the forward and reverse amplification primers are SEQ ID NO:4 and SEQ ID NO:19; SEQ ID NO:12 if the forward and reverse amplification primers are SEQ ID NO:4 and SEQ ID NO:19; SEQ ID NO:13 if the forward and reverse amplification primers are SEQ ID NO:5 and SEQ ID NO:20; SEQ ID NO:14 if the forward and reverse amplification primers are SEQ ID NO:6 and SEQ ID NO:21; SEQ ID NO:15 if the forward and reverse amplification primers are SEQ ID NO:7 and SEQ ID NO:22.

In certain aspects of the oligonucleotide compositions, kits, and methods, wherein the target nucleic acid region is SEQ ID NO:38: (a) the detection probe comprises the sequence of SEQ ID NO:10 when the forward amplification primer and reverse amplification primer are configured to generate an amplicon of the target nucleic acid sequence that is at least about 89 nucleotides in length from SEQ ID NO:3 and SEQ ID NO:18 on the target nucleic acid region; (b) the detection probe comprises the sequence of SEQ ID NO:11 or SEQ ID NO:12 when the forward amplification primer and reverse amplification primer are configured to generate an amplicon of the target nucleic acid sequence that is at least about 93 nucleotides in length from SEQ ID NO:4 and SEQ ID NO:19 on the target nucleic acid region; (c) the detection probe comprises the sequence of SEQ ID NO:9 when the forward amplification primer and reverse amplification primer are configured to generate an amplicon of the target nucleic acid sequence that is at least about 100 nucleotides in length from SEQ ID NO:2 and SEQ ID NO:17 on the target nucleic acid region; (d) the detection probe comprises the sequence of SEQ ID NO:15 when the forward amplification primer and reverse amplification primer are configured to generate an amplicon of the target nucleic acid sequence that is at least about 102 nucleotides in length from SEQ ID NO:7 and SEQ ID NO:22 on the target nucleic acid region; (e) the detection probe comprises the sequence of SEQ ID NO:14 when the forward amplification primer and reverse amplification primer are configured to generate an amplicon of the target nucleic acid sequence that is at least about 119 nucleotides in length from SEQ ID NO:6 and SEQ ID NO:21 on the target nucleic acid region; (f) the detection probe comprises the sequence of SEQ ID NO:8 or SEQ ID NO:9 when the forward amplification primer and reverse amplification primer are configured to generate an amplicon of the target nucleic acid sequence that is at least about 123 nucleotides in length from SEQ ID NO:1 and SEQ ID NO:17 on the target nucleic acid region; (g) the detection probe comprises the sequence of SEQ ID NO:8 or SEQ ID NO:9 when the forward amplification primer and reverse amplification primer are configured to generate an amplicon of the target nucleic acid sequence that is at least about 127 nucleotides in length from SEQ ID NO:1 and SEQ ID NO:16 or the detection probe comprises the sequence of SEQ ID NO:13 when the forward amplification primer and reverse amplification primer are configured to generate an amplicon of the target nucleic acid sequence that is at least about 127 nucleotides in length from SEQ ID NO:5 and SEQ ID NO:20 on the target nucleic acid region.

In certain aspects of the oligonucleotide compositions, kits, and methods, wherein the target nucleic acid region is SEQ ID NO:39, the detection probe is from about 22 to about 27 nucleotides in length.

In certain aspects of the oligonucleotide compositions, kits, and methods, wherein the target nucleic acid region is SEQ ID NO:39, the detection probe is selected from the group consisting of SEQ ID NOs: 28, 29, 30, 31, 32 and 33. In certain aspects, wherein the target nucleic acid region is SEQ ID NO:39, the detection probe comprises the sequence of SEQ ID NO:28. In certain aspects, wherein the target nucleic acid region is SEQ ID NO:39, the detection probe comprises the sequence of SEQ ID NO:29. In certain aspects, wherein the target nucleic acid region is SEQ ID NO:39, the detection probe comprises the sequence of SEQ ID NO:30. In certain aspects, wherein the target nucleic acid region is SEQ ID NO:39, the detection probe comprises the sequence of SEQ ID NO:31. In certain aspects, wherein the target nucleic acid region is SEQ ID NO:39, the detection probe comprises the sequence of SEQ ID NO:32. In certain aspects, wherein the target nucleic acid region is SEQ ID NO:39, the detection probe comprises the sequence of SEQ ID NO:33.

In certain aspects of the oligonucleotide compositions, kits, and methods, wherein the target nucleic acid region is SEQ ID NO:39, the detection probe comprises a target nucleic acid sequence substantially corresponding to the oligo hybridization sequence of: SEQ ID NO:28 if the forward and reverse amplification primers are (I) SEQ ID NO:23 and SEQ ID NO:34 or (II) SEQ ID NO:24 and SEQ ID NO:34; SEQ ID NO:29 if the forward and reverse amplification primers are SEQ ID NO:25 and SEQ ID NO:35; SEQ ID NO:30 if the forward and reverse amplification primers are SEQ ID NO:25 and SEQ ID NO:35; SEQ ID NO:31 if the forward and reverse amplification primers are SEQ ID NO:26 and SEQ ID NO:36; SEQ ID NO:32 if the forward and reverse amplification primers are SEQ ID NO:27 and SEQ ID NO:37; SEQ ID NO:33 if the forward and reverse amplification primers are SEQ ID NO:27 and SEQ ID NO:37.

In certain aspects of the oligonucleotide compositions, kits, and methods, wherein the target nucleic acid region is SEQ ID NO:39: (a) the third oligomer comprises the sequence of SEQ ID NO:29 or SEQ ID NO:30 when the forward amplification primer and reverse amplification primer are configured to generate an amplicon of the target nucleic acid sequence that is at least about 89 nucleotides in length from SEQ ID NO:25 and SEQ ID NO:35 on the target nucleic acid region; (b) the third oligomer comprises the sequence of SEQ ID NO:28 when the forward amplification primer and reverse amplification primer are configured to generate an amplicon of the target nucleic acid sequence that is at least about 99 nucleotides in length from SEQ ID NO:24 and SEQ ID NO:34 on the target nucleic acid region; (c) the third oligomer comprises the sequence of SEQ ID NO:28 when the forward amplification primer and reverse amplification primer are configured to generate an amplicon of the target nucleic acid sequence that is at least about 109 nucleotides in length from SEQ ID NO:23 and SEQ ID NO:34 on the target nucleic acid region; (d) the third oligomer comprises the sequence of SEQ ID NO:32 or SEQ ID NO:33 when the forward amplification primer and reverse amplification primer are configured to generate an amplicon of the target nucleic acid sequence that is at least about 126 nucleotides in length from SEQ ID NO:27 and SEQ ID NO:37 on the target nucleic acid region; (e) the third oligomer comprises the sequence of SEQ ID NO:31 when the forward amplification primer and reverse amplification primer are configured to generate an amplicon of the target nucleic acid sequence that is at least about 143 nucleotides in length from SEQ ID NO:26 and SEQ ID NO:36 on the target nucleic acid region.

In certain aspects, the oligonucleotide compositions, kits, and methods for determining the presence (or absence) of VZV in a sample as described herein comprise at least one detection probe configured to specifically anneal to the target nucleic acid region of SEQ ID NO:38 or SEQ ID NO:39, and wherein the detection probe is flanked between the forward and reverse amplification primers.

In certain aspects of the oligonucleotide compositions, kits, and methods, the detection probe comprises at least one detectable label. In certain aspects, the detection probe further includes a second label that interacts with the first label such as a quencher.

In certain aspects of the oligonucleotide compositions, kits, and methods, the label is selected from the group consisting of: (a) a chemiluminescent label; (b) a fluorescent label; (c) a quencher; and (d) a combination of two or more of (a), (b) and (c). In certain aspects, the oligonucleotide compositions, kits, and methods comprise a fluorescent label. In certain aspects, the oligonucleotide compositions, kits, and methods comprise a quencher. In certain aspects, the oligonucleotide compositions, kits, and methods comprise both a fluorescent label and quencher.

In certain aspects of the oligonucleotide compositions, kits, and methods, the detection probe is linear, and does not exhibit any degree of self-complementarity held by intramolecular bonds. In such embodiments, the linear detection probe includes a fluorophore as the label. In some embodiments, the linear detection probe comprises both a fluorophore, and a quenching moiety (e.g., a TaqMan™ probe).

In certain aspects of the oligonucleotide compositions, kits, and methods, the detection probe exhibits at least some degree of self-complementarity, and is used to facilitate detection of probe:target duplexes in a sample, without first requiring the removal of unhybridized probe prior to detection.

In certain aspects of the oligonucleotide compositions, kits, and methods, a hairpin detection probe exhibiting at least some degree of self-complementarity is a molecular beacon or a molecular torch.

In certain aspects of the oligonucleotide compositions, kits, and methods, the labeled detection probe is non-extendable. For example, the labeled detection probe can be rendered non-extendable by 3'-phosphorylation; having a 3'-terminal 3'-deoxynucleotide (e.g., a terminal 2', 3'-dideoxynucleotide); having a 3'-terminal inverted nucleotide (e.g., in which the last nucleotide is inverted such that it is joined to the penultimate nucleotide by a 3' to 3' phosphodiester linkage or analog thereof, such as a phosphorothioate); or having an attached fluorophore, quencher, or other label that interferes with extension (possibly but not necessarily attached via the 3' position of the terminal nucleotide). In certain aspects, the 3'-terminal nucleotide is not methylated.

In certain aspects of the oligonucleotide compositions, kits, and methods, the detection probe further comprises at least one modified nucleobase. In certain aspects, the modified nucleobase is selected from the group consisting of: (a) a 2'-O-methyl; (b) a 5-methylcytosine; (c) a 2'-fluorine; and (d) a combination of two or more of (a), (b) and (c).

In certain aspects, the oligonucleotide compositions, kits, and methods may further include additional reagents suitable for performing in vitro amplification such as, e.g., buffers, salt, various dNTPs, and/or enzymes.

In certain aspects, the oligonucleotide compositions, kits, and methods may be packaged in a variety of different embodiments, and those skilled in the art will appreciate that the disclosure embraces many different kit configurations.

In certain aspects, the oligonucleotide compositions may be aqueous, frozen, or lyophilized.

The present disclosure provides formulations for the detection or amplification of VZV in a sample. In certain aspects, the formulations disclosed herein include amplification primers for the amplification of target nucleic acid sequences within the VZV nucleic acid sequence. In certain aspects, the formulations disclose detection probes for the detection of VZV. In some embodiments, the amplification primer formulation and detection probe are provided as two separate products or in separate vials.

In certain aspects, the oligonucleotide formulations are configured to specifically hybridize to the complementary nucleotide subunits within the target nucleic acid sequence, thus minimizing cross-reactivity to other, non-VZV nucleic acids (if present) in a sample.

In certain aspects, the formulations disclosed herein comprise at least one amplification primer. In certain aspects, the formulations comprise a set of amplification primers. In some aspects, where formulations comprise a set of amplification primers, a first amplification primer comprises a forward amplification primer and a second amplification primer comprises a reverse amplification primer. In certain aspects, the formulations comprise a single set of forward and reverse amplification primers that produce a single amplicon of the target nucleic acid sequence from a target nucleic acid region. In certain aspects, the formulations comprise multiple sets of amplification primers that produce multiple amplicons from various target nucleic acid sequences within various target nucleic acid regions. In certain aspects, the formulations comprise multiple sets of amplification primers that produce multiple amplicons from various target nucleic acid sequences within a single target nucleic acid region.

In certain aspects of the formulations, the amplification primers are configured to specifically anneal to oligo hybridizing sequences within target nucleic acid regions of SEQ ID NO:38 or SEQ ID NO:39 of a VZV nucleic acid sequence (if present) in a sample.

In certain aspects of the formulations, wherein the target nucleic acid region is SEQ ID NO:38, the forward and the reverse amplification primers are each independently from about 19 to about 23 nucleotides in length, and wherein the forward and reverse amplification primers are configured to generate an amplicon about 89 to about 127 nucleotides in length from the target nucleic acid region of SEQ ID NO:38.

In certain aspects of the formulations, wherein the target nucleic acid region is SEQ ID NO:38, the forward amplification primer is selected from the group consisting of SEQ ID NOs: 1, 2, 3, 4, 5, 6 and 7 and the reverse amplification primer is from about 19 to about 23 nucleotides in length and the forward and reverse amplification primers are configured to generate an amplicon from a target nucleic acid sequence within SEQ ID NO:38 that is from about 89 to about 127 nucleotides in length. In certain aspects, wherein the target nucleic acid region is SEQ ID NO:38, the forward amplification primer comprises the sequence of SEQ ID NO:1. In certain aspects, wherein the target nucleic acid region is SEQ ID NO:38, the forward oligomer comprises the sequence of SEQ ID NO:2. In certain aspects, wherein the target nucleic acid region is SEQ ID NO:38, the forward oligomer comprises the sequence of SEQ ID NO:3. In certain aspects, wherein the target nucleic acid region is SEQ ID NO:38, the forward oligomer comprises the sequence of SEQ ID NO:4. In certain aspects, wherein the target nucleic acid region is SEQ ID NO:38, the forward oligomer comprises the sequence of SEQ ID NO:5. In certain aspects, wherein the target nucleic acid region is SEQ ID NO:38, the forward oligomer comprises the sequence of SEQ ID NO:6. In certain aspects, wherein the target nucleic acid region is SEQ ID NO:38, the forward oligomer comprises the sequence of SEQ ID NO:7.

In certain aspects of the formulations, wherein the target nucleic acid region is SEQ ID NO:38, the forward amplification primer is selected from the group consisting of SEQ ID NOs: 1, 2, 3, 4, 5, 6 and 7 and the reverse amplification primer is from about 19 to about 23 nucleotides in length and comprises the nucleobase sequence of SEQ ID NOs: 16, 17, 18, 19, 20, 21, or 22. In certain aspects, wherein the target nucleic acid region is SEQ ID NO:38, the reverse oligomer comprises the sequence of SEQ ID NO:16. In certain aspects, wherein the target nucleic acid region is SEQ ID NO:38, the reverse oligomer comprises the sequence of SEQ ID NO:17. In certain aspects, wherein the target nucleic acid region is SEQ ID NO:38, the reverse oligomer comprises the sequence of SEQ ID NO:18. In certain aspects, wherein the target nucleic acid region is SEQ ID NO:38, the reverse oligomer comprises the sequence of SEQ ID NO:19. In certain aspects, wherein the target nucleic acid region is SEQ ID NO:38, the reverse oligomer comprises the sequence of SEQ ID NO:20. In certain aspects, wherein the target nucleic acid region is SEQ ID NO:38, the reverse oligomer comprises the sequence of SEQ ID NO:21. In certain aspects, wherein the target nucleic acid region is SEQ ID NO:38, the reverse oligomer comprises the sequence of SEQ ID NO:22.

In certain aspects of the formulations, wherein the target nucleic acid region is SEQ ID NO:38, the reverse amplification primer is selected from the group consisting of SEQ ID NOs: 16, 17, 18, 19, 20, 21 and 22 and the forward amplification primer is from about 20 to about 23 nucleotides in length and configured to generate an amplicon from a target nucleic acid sequence within SEQ ID NO:38 that is from about 89 to about 127 nucleotides in length.

In certain aspects of the formulations, wherein the target nucleic acid region is SEQ ID NO:38, and wherein the forward amplification primer is selected from the group consisting of SEQ ID NOs: 1, 2, 3, 4, 5, 6 and 7, and the reverse amplification primer is selected from the group consisting of SEQ ID NOs: 16, 17, 18, 19, 20, 21 and 22, the forward and reverse amplification primers are configured to generate an amplicon from a target nucleic acid sequence within SEQ ID NO:38 that is selected from the group consisting of 89, 93, 100, 102, 119, 123 and 127 nucleotides in length. In certain aspects, wherein the target nucleic acid region is SEQ ID NO:38, the amplicon is 89 nucleotides in length. In certain aspects, wherein the target nucleic acid region is SEQ ID NO:38, the amplicon is 93 nucleotides in length. In certain aspects, wherein the target nucleic acid region is SEQ ID NO:38, the amplicon is 100 nucleotides in length. In certain aspects, wherein the target nucleic acid region is SEQ ID NO:38, the amplicon is 102 nucleotides in length. In certain aspects, wherein the target nucleic acid region is SEQ ID NO:38, the amplicon is 119 nucleotides in length. In certain aspects, wherein the target nucleic acid region is SEQ ID NO:38, the amplicon is 123 nucleotides in length. In certain aspects, wherein the target nucleic acid region is SEQ ID NO:38, the amplicon is 127 nucleotides in length.

In certain aspects of the formulations, wherein the target nucleic acid region is SEQ ID NO:38, and wherein the forward amplification primer is selected from the group consisting of SEQ ID NOs: 1, 2, 3, 4, 5, 6 and 7, and the reverse amplification primer is selected from the group consisting of SEQ ID NOs: 16, 17, 18, 19, 20, 21 and 22, the forward and reverse amplification primers respectfully comprise target nucleic acid sequences corresponding to the oligo hybridization sequences of: (a) SEQ ID NO:1 and SEQ ID NO:16; (b) SEQ ID NO:1 and SEQ ID NO:17; (c) SEQ ID NO:2 and SEQ ID NO:17; (d) SEQ ID NO:3 and SEQ ID NO:18; (e) SEQ ID NO:4 and SEQ ID NO:19; (f) SEQ ID NO:5 and SEQ ID NO:20; (g) SEQ ID NO:6 and SEQ ID NO:21; (h) SEQ ID NO:7 and SEQ ID NO:22.

In certain aspects of the formulations, wherein the target nucleic acid region is SEQ ID NO:38: (a) the forward amplification primer and reverse amplification primer are configured to generate an amplicon from a target nucleic acid sequence that is at least about 89 nucleotides in length and flanked between SEQ ID NO:3 and SEQ ID NO:18 within the target nucleic acid region; (b) the forward amplification primer and reverse amplification primer are configured to generate an amplicon from a target nucleic acid sequence that is at least about 93 nucleotides in length and flanked between SEQ ID NO:4 and SEQ ID NO:19 within the target nucleic acid region; (c) the forward amplification primer and reverse amplification primer are configured to generate an amplicon from a target nucleic acid sequence that is at least about 100 nucleotides in length and flanked between SEQ ID NO:2 and SEQ ID NO:17 within the target nucleic acid region; (d) the forward amplification primer and reverse amplification primer are configured to generate an amplicon from a target nucleic acid sequence that is at least about 102 nucleotides in length and flanked between SEQ ID NO:7 and SEQ ID NO:22 within the target nucleic acid region; (e) the forward amplification primer and reverse amplification primer are configured to generate an amplicon from a target nucleic acid sequence that is at least about 119 nucleotides in length and flanked between SEQ ID NO:6 and SEQ ID NO:21 within the target nucleic acid region; (f) the forward amplification primer and reverse amplification primer are configured to generate an amplicon from a target nucleic acid sequence that is at least about 123 nucleotides in length and flanked between SEQ ID NO:1 and SEQ ID NO:17 within the target nucleic acid region; (g) the forward amplification primer and reverse amplification primer are configured to generate an amplicon from a target nucleic acid sequence that is at least about 127 nucleotides in length and flanked between SEQ ID NO:1 and SEQ ID NO:16 or SEQ ID NO:5 and SEQ ID NO:20 within the target nucleic acid region.

In certain aspects of the formulations, wherein the target nucleic acid region is SEQ ID NO:39, and the forward amplification primer and the reverse amplification primer are from about 20 to about 23 nucleotides in length and the forward and reverse amplification primers are configured to generate an amplicon from a target nucleic acid sequence within SEQ ID NO:39 that is from about 89 to about 143 nucleotides in length.

In certain aspects of the formulations, wherein the target nucleic acid region is SEQ ID NO:39, the forward amplification primer is selected from the group consisting of SEQ ID NOs: 23, 24, 25, 26 and 27, and the reverse amplification primer is from about 20 to about 22 nucleotides in length, and the forward and reverse amplification primer are configured to generate an amplicon from a target nucleic acid sequence within SEQ ID NO:39 that is from about 89 to about 143 nucleotides in length. In certain aspects, wherein the target nucleic acid region is SEQ ID NO:39, the forward oligomer comprises the sequence of SEQ ID NO:23. In certain aspects, wherein the target nucleic acid region is SEQ ID NO:39, the forward oligomer comprises the sequence of SEQ ID NO:24. In certain aspects, wherein the target nucleic acid region is SEQ ID NO:39, the forward oligomer comprises the sequence of SEQ ID NO:25. In certain aspects, wherein the target nucleic acid region is SEQ ID NO:39, the forward oligomer comprises the sequence of SEQ ID NO:26. In certain aspects, wherein the target nucleic acid region is SEQ ID NO:39, the forward oligomer comprises the sequence of SEQ ID NO:27.

In certain aspects of the formulations, wherein the target nucleic acid region is SEQ ID NO:39, the forward amplification primer is selected from the group consisting of SEQ ID NOs:23, 24, 25, 26 and 27, the reverse amplification primer is from about 20 to about 22 nucleotides in length and comprises the nucleobase sequence of SEQ ID NO:34, 35, 36, or 37. In certain aspects, wherein the target nucleic acid region is SEQ ID NO:39, the reverse oligomer comprises the sequence of SEQ ID NO:34. In certain aspects, wherein the target nucleic acid region is SEQ ID NO:39, the reverse oligomer comprises the sequence of SEQ ID NO:35. In certain aspects, wherein the target nucleic acid region is SEQ ID NO:39, the reverse oligomer comprises the sequence of SEQ ID NO:36. In certain aspects, wherein the target nucleic acid region is SEQ ID NO:39, the reverse oligomer comprises the sequence of SEQ ID NO:37.

In certain aspects of the formulations, wherein the target nucleic acid region is SEQ ID NO:39, the reverse amplification primer is selected from the group consisting of SEQ ID NOs: 34, 35, 36 and 37, and the forward amplification primer is from about 20 to about 23 nucleotides in length, and the forward and reverse amplification primers are configured to generate an amplicon from a target nucleic acid sequence within SEQ ID NO:39 that is from about 89 to about 143 nucleotides in length.

In certain aspects of the formulations, wherein the target nucleic acid region is SEQ ID NO:39, and wherein the forward amplification primer is selected from the group consisting of SEQ ID NOs: 23, 24, 25, 26 and 27, and the reverse amplification primer is selected from the group consisting of SEQ ID NOs: 34, 35, 36 and 37, the forward and reverse amplification primers are configured to generate an amplicon from a target nucleic acid sequence within SEQ ID NO:39 that is selected from the group consisting of consisting of 89, 99, 109, 126 and 143 nucleotides in length. In certain aspects, wherein the target nucleic acid region is SEQ ID NO:39, the amplicon is 89 nucleotides in length. In certain aspects, wherein the target nucleic acid region is SEQ ID NO:39, the amplicon is 99 nucleotides in length. In certain aspects, wherein the target nucleic acid region is SEQ ID NO:39, the amplicon is 109 nucleotides in length. In certain aspects, wherein the target nucleic acid region is SEQ ID NO:39, the amplicon is 126 nucleotides in length. In certain aspects, wherein the target nucleic acid region is SEQ ID NO:39, the amplicon is 143 nucleotides in length.

In certain aspects of the formulations, wherein the target nucleic acid region is SEQ ID NO:39, and wherein the forward amplification primer is selected from the group consisting of SEQ ID NOs: 23, 24, 25, 26 and 27, and the reverse amplification primer is selected from the group consisting of SEQ ID NOs: 34, 35, 36 and 37, the forward and reverse amplification primers respectfully comprise target nucleic acid sequences corresponding to the oligo hybridization sequences of: (a) SEQ ID NO:23 and SEQ ID NO:34; (b) SEQ ID NO:24 and SEQ ID NO:34; (c) SEQ ID NO:25 and SEQ ID NO:35; (d) SEQ ID NO:26 and SEQ ID NO:36; (e) SEQ ID NO:27 and SEQ ID NO:37.

In certain aspects of the formulations, wherein the target nucleic acid region is SEQ ID NO:39: (a) the forward amplification primer and the reverse amplification primer are configured to generate an amplicon from a target nucleic acid sequence that is at least about 89 nucleotides in length and flanked between SEQ ID NO:25 and SEQ ID NO:35 within the target nucleic acid region; (b) the forward amplification primer and the reverse amplification primer are configured to generate an amplicon from a target nucleic acid sequence that is at least about 99 nucleotides in length and flanked between SEQ ID NO:24 and SEQ ID NO:34 within the target nucleic acid region; (c) the forward amplification primer and the reverse amplification primer are configured to generate an amplicon from a target nucleic acid sequence that is at least about 109 nucleotides in length and flanked between SEQ ID NO:23 and SEQ ID NO:34 within the target nucleic acid region; (d) the forward amplification primer and the reverse amplification primer are configured to generate an amplicon from a target nucleic acid sequence that is at least about 126 nucleotides in length and flanked between SEQ ID NO:27 and SEQ ID NO:37 within the target nucleic acid region; (e) the forward amplification primer and the reverse amplification primer are configured to generate an amplicon from a target nucleic acid sequence that is at least about 143 nucleotides in length and flanked between SEQ ID NO:26 and SEQ ID NO:36 within the target nucleic acid region.

In certain aspects of the formulations, at least one amplification primer is configured to anneal to the target nucleic acid sequence in the forward orientation and at least one amplification primer is configured to anneal to the target nucleic acid sequence in the reverse orientation. In certain aspects of the formulations, the forward and reverse amplification primers specifically hybridize to a contiguous nucleotide sequence comprising the oligo hybridizing sequences on the target nucleic acid sequence to be amplified within the target nucleic acid regions of SEQ ID NO:38 or SEQ ID NO:39 of the VZV nucleic acid sequence (if present) in a sample.

In certain aspects of the formulations, a composition for determining the presence (or absence) of a target nucleic acid sequence of VZV in a sample includes (a) at least one forward amplification primer configured to specifically hybridize to an oligo hybridizing sequence within the target nucleic acid region of SEQ ID NO:38 or SEQ ID NO:39, and (b) at least one reverse amplification primer configured to specifically hybridize to an oligo hybridizing sequence within the target nucleic acid region of SEQ ID NO:38 or SEQ ID NO:39.

In certain aspects of the formulations, the forward amplification primer comprises at least one modified nucleobase. In certain aspects, the modified nucleobase is selected from the group consisting of: (a) a 2'-O-methyl; (b) a 5-methylcytosine; (c) a 2'-fluorine; and (d) a combination of two or more of (a), (b) and (c).

In certain aspects of the formulations, the forward amplification primer comprises from two to six modified nucleobases. The two to six modified nucleobases can be the same or different. In certain aspects, the forward amplification primer comprises from two to six 5-methylcytosine residues. In some embodiments, the forward amplification primer comprises two 5-methylcytosine residues. In some embodiments, the forward amplification primer comprises three 5-methylcytosine residues. In certain embodiments, the forward amplification primer comprises four 5-methylcytosine residues. In certain embodiments, the forward amplification primer comprises five 5-methylcytosine residues. In certain embodiments, the forward amplification primer comprises six 5-methylcytosine residues. In certain aspects, the forward amplification primer comprises from two to six 2'-O-methyl residues. In some embodiments, the forward amplification primer comprises two 2'-O-methyl residues. In some embodiments, the forward amplification primer comprises three 2'-O-methyl residues. In certain embodiments, the forward amplification primer comprises four 2'-O-methyl residues. In certain embodiments, the forward amplification primer comprises five 2'-O-methyl residues. In certain embodiments, the forward amplification primer comprises six 2'-O-methyl residues.

In certain aspects of the formulations, the reverse amplification primer comprises at least one modified nucleobase. In certain aspects, the modified nucleobase is selected from the group consisting of: (a) a 2'-O-methyl; (b) a 5-methylcytosine; (c) a 2'-fluorine; and (d) a combination of two or more of (a), (b) and (c).

In certain aspects of the formulations, the reverse amplification primer comprises from two to six modified nucleobases. The two to six modified nucleobases can be the same or different. In certain aspects, the reverse amplification primer comprises from two to six 5-methylcytosine residues. In certain embodiments, the reverse amplification primer comprises two 5-methylcytosine residues. In some embodiments, the reverse amplification primer comprises three 5-methylcytosine residues. In some embodiments, the reverse amplification primer comprises four 5-methyl-cytosine residues. In some embodiments, the reverse amplification primer comprises five 5-methyl-cytosine residues. In some embodiments, the reverse amplification primer comprises six 5-methylcytosine residues. In certain aspects, the reverse amplification primer comprises from two to six 2'-O-methyl residues. In certain embodiments, the reverse amplification primer comprises two 2'-O-methyl residue. In some embodiments, the reverse amplification primer comprises three 2'-O-methyl residues. In some embodiments, the reverse amplification primer comprises four 2'-O-methyl residues. In some embodiments, the reverse amplification primer comprises five 2'-O-methyl residues. In some embodiments, the reverse amplification primer comprises six 2'-O-methyl residues.

In certain aspects of the formulations, a third oligomer is configured to specifically anneal to the target nucleic acid sequence to be amplified within the target nucleic acid region of SEQ ID NO:38 and SEQ ID NO:39 of the VZV nucleic acid sequence (if present) in a sample. In certain aspects, the third oligomer hybridizes to an oligo hybridization sequence within SEQ ID NO:38. In some embodiments, a third oligomer hybridizes to an oligo hybridization sequence within SEQ ID NO:39. In certain aspects of the formulations, the third oligomer is a detection probe.

In certain aspects of the formulations, wherein the target nucleic acid region is SEQ ID NO:38, the detection probe is from about 23 to about 27 nucleotides in length.

In certain aspects of the formulations, wherein the target nucleic acid region is SEQ ID NO:38, the detection probe is selected from the group consisting of SEQ ID NOs: 8, 9, 10, 11, 12, 13, 14 and 15. In certain aspects, wherein the target nucleic acid region is SEQ ID NO:38, the detection probe comprises the sequence of SEQ ID NO:8. In certain aspects, wherein the target nucleic acid region is SEQ ID NO:38, the detection probe comprises the sequence of SEQ ID NO:9. In certain aspects, wherein the target nucleic acid region is SEQ ID NO:38, the detection probe comprises the sequence of SEQ ID NO:10. In certain aspects, wherein the target nucleic acid region is SEQ ID NO:38, the detection probe comprises the sequence of SEQ ID NO:11. In certain aspects, wherein the target nucleic acid region is SEQ ID NO:38, the detection probe comprises the sequence of SEQ ID NO:12. In certain aspects, wherein the target nucleic acid region is SEQ ID NO:38, the detection probe comprises the sequence of SEQ ID NO:13. In certain aspects, wherein the target nucleic acid region is SEQ ID NO:38, the detection probe comprises the sequence of SEQ ID NO:14. In certain aspects, wherein the target nucleic acid region is SEQ ID NO:38, the detection probe comprises the sequence of SEQ ID NO:15.

In certain aspects of the formulations, wherein the target nucleic acid region is SEQ ID NO:38, the detection probe comprises a target nucleic acid sequence substantially corresponding to the oligo hybridization sequence of: SEQ ID NO:8 if the forward and reverse amplification primers are (I) SEQ ID NO:1 and SEQ ID NO:16 or (II) SEQ ID NO:1 and SEQ ID NO:17; SEQ ID NO:9 if the forward and reverse amplification primers are (I) SEQ ID NO:1 and SEQ ID NO:16 or (II) SEQ ID NO:1 and SEQ ID NO:17 or (III) SEQ ID NO:2 and SEQ ID NO:17; SEQ ID NO:10 if the forward and reverse amplification primers are SEQ ID NO:3 and SEQ ID NO:18; SEQ ID NO:11 if the forward and reverse amplification primers are SEQ ID NO:4 and SEQ ID NO:19; SEQ ID NO:12 if the forward and reverse amplification primers are SEQ ID NO:4 and SEQ ID NO:19; SEQ ID NO:13 if the forward and reverse amplification primers are SEQ ID NO:5 and SEQ ID NO:20; SEQ ID NO:14 if the forward and reverse amplification primers are SEQ ID NO:6 and SEQ ID NO:21; SEQ ID NO:15 if the forward and reverse amplification primers are SEQ ID NO:7 and SEQ ID NO:22.

In certain aspects of the formulations, wherein the target nucleic acid region is SEQ ID NO:38: (a) the detection probe comprises the sequence of SEQ ID NO:10 when the forward amplification primer and reverse amplification primer are configured to generate an amplicon of the target nucleic acid sequence that is at least about 89 nucleotides in length from SEQ ID NO:3 and SEQ ID NO:18 on the target nucleic acid region; (b) the detection probe comprises the sequence of SEQ ID NO:11 or SEQ ID NO:12 when the forward amplification primer and reverse amplification primer are configured to generate an amplicon of the target nucleic acid sequence that is at least about 93 nucleotides in length from SEQ ID NO:4 and SEQ ID NO:19 on the target nucleic acid region; (c) the detection probe comprises the sequence of SEQ ID NO:9 when the forward amplification primer and reverse amplification primer are configured to generate an amplicon of the target nucleic acid sequence that is at least about 100 nucleotides in length from SEQ ID NO:2 and SEQ ID NO:17 on the target nucleic acid region; (d) the detection probe comprises the sequence of SEQ ID NO:15 when the forward amplification primer and reverse amplification primer are configured to generate an amplicon of the target nucleic acid sequence that is at least about 102 nucleotides in length from SEQ ID NO:7 and SEQ ID NO:22 on the target nucleic acid region; (e) the detection probe comprises the sequence of SEQ ID NO:14 when the forward amplification primer and reverse amplification primer are configured to generate an amplicon of the target nucleic acid sequence that is at least about 119 nucleotides in length from SEQ ID NO:6 and SEQ ID NO:21 on the target nucleic acid region; (f) the detection probe comprises the sequence of SEQ ID NO:8 or SEQ ID NO:9 when the forward amplification primer and reverse amplification primer are configured to generate an amplicon of the target nucleic acid sequence that is at least about 123 nucleotides in length from SEQ ID NO:1 and SEQ ID NO:17 on the target nucleic acid region; (g) the detection probe comprises the sequence of SEQ ID NO:8 or SEQ ID NO:9 when the forward amplification primer and reverse amplification primer are configured to generate an amplicon of the target nucleic acid sequence that is at least about 127 nucleotides in length from SEQ ID NO:1 and SEQ ID NO:16 or the detection probe comprises the sequence of SEQ ID NO:13 when the forward amplification primer and reverse amplification primer are configured to generate an amplicon of the target nucleic acid sequence that is at least about 127 nucleotides in length from SEQ ID NO:5 and SEQ ID NO:20 on the target nucleic acid region.

In certain aspects of the formulations, wherein the target nucleic acid region is SEQ ID NO:39, the detection probe is from about 22 to about 27 nucleotides in length.

In certain aspects of the formulations, wherein the target nucleic acid region is SEQ ID NO:39, the detection probe is selected from the group consisting of SEQ ID NOs: 28, 29, 30, 31, 32 and 33. In certain aspects, wherein the target nucleic acid region is SEQ ID NO:39, the detection probe comprises the sequence of SEQ ID NO:28. In certain aspects, wherein the target nucleic acid region is SEQ ID NO:39, the detection probe comprises the sequence of SEQ ID NO:29. In certain aspects, wherein the target nucleic acid region is SEQ ID NO:39, the detection probe comprises the sequence of SEQ ID NO:30. In certain aspects, wherein the target nucleic acid region is SEQ ID NO:39, the detection probe comprises the sequence of SEQ ID NO:31. In certain aspects, wherein the target nucleic acid region is SEQ ID NO:39, the detection probe comprises the sequence of SEQ ID NO:32. In certain aspects, wherein the target nucleic acid region is SEQ ID NO:39, the detection probe comprises the sequence of SEQ ID NO:33.

In certain aspects of the formulations, wherein the target nucleic acid region is SEQ ID NO:39, the detection probe comprises a target nucleic acid sequence substantially corresponding to the oligo hybridization sequence of: SEQ ID NO:28 if the forward and reverse amplification primers are (I) SEQ ID NO:23 and SEQ ID NO:34 or (II) SEQ ID NO:24 and SEQ ID NO:34; SEQ ID NO:29 if the forward and reverse amplification primers are SEQ ID NO:25 and SEQ ID NO:35; SEQ ID NO:30 if the forward and reverse amplification primers are SEQ ID NO:25 and SEQ ID NO:35; SEQ ID NO:31 if the forward and reverse amplification primers are SEQ ID NO:26 and SEQ ID NO:36; SEQ ID NO:32 if the forward and reverse amplification primers are SEQ ID NO:27 and SEQ ID NO:37; SEQ ID NO:33 if the forward and reverse amplification primers are SEQ ID NO:27 and SEQ ID NO:37.

In certain aspects of the formulations, wherein the target nucleic acid region is SEQ ID NO:39: (a) the third oligomer comprises the sequence of SEQ ID NO:29 or SEQ ID NO:30 when the forward amplification primer and reverse amplification primer are configured to generate an amplicon of the target nucleic acid sequence that is at least about 89 nucleotides in length from SEQ ID NO:25 and SEQ ID NO:35 on the target nucleic acid region; (b) the third oligomer comprises the sequence of SEQ ID NO:28 when the forward amplification primer and reverse amplification primer are configured to generate an amplicon of the target nucleic acid sequence that is at least about 99 nucleotides in length from SEQ ID NO:24 and SEQ ID NO:34 on the target nucleic acid region; (c) the third oligomer comprises the sequence of SEQ ID NO:28 when the forward amplification primer and reverse amplification primer are configured to generate an amplicon of the target nucleic acid sequence that is at least about 109 nucleotides in length from SEQ ID NO:23 and SEQ ID NO:34 on the target nucleic acid region; (d) the third oligomer comprises the sequence of SEQ ID NO:32 or SEQ ID NO:33 when the forward amplification primer and reverse amplification primer are configured to generate an amplicon of the target nucleic acid sequence that is at least about 126 nucleotides in length from SEQ ID NO:27 and SEQ ID NO:37 on the target nucleic acid region; (e) the third oligomer comprises the sequence of SEQ ID NO:31 when the forward amplification primer and reverse amplification primer are configured to generate an amplicon of the target nucleic acid sequence that is at least about 143 nucleotides in length from SEQ ID NO:26 and SEQ ID NO:36 on the target nucleic acid region.

In certain aspects, the formulations for determining the presence (or absence) of VZV in a sample as described herein further comprise at least one detection probe configured to specifically anneal to oligo hybridizing sequences within the target nucleic acid region of SEQ ID NO:38 or SEQ ID NO:39, wherein the detection probe is flanked between the forward and reverse amplification primers.

In certain aspects of the formulations, the detection probe comprises at least one detectable label. In certain aspects, the detection probe further includes a second label, such as a quencher, that interacts with the first label. In certain aspects of the formulations, the label is selected from the group consisting of: (a) a chemiluminescent label; (b) a fluorescent label; (c) a quencher; and (d) a combination of two or more of (a), (b) and (c). In certain aspects, the label comprises a fluorescent label. In certain aspects, the label comprises a quencher. In certain aspects, the formulations comprise a detection probe having both a fluorescent label and a quencher.

In certain aspects of the formulations, the detection probe is linear, and does not exhibit any degree of self-complementarity held by intramolecular bonds. In such embodiments, the linear detection probe includes a fluorophore as the label. In some embodiments, the linear detection probe comprises both a fluorophore and a quenching moiety (e.g., a TaqMan™ probe).

In certain aspects of the formulations, the detection probe exhibits at least some degree of self-complementarity, and is used to facilitate detection of probe:target duplexes in a sample, without first requiring the removal of unhybridized probe prior to detection. In certain aspects of the formulations, a hairpin detection probe exhibiting at least some degree of self-complementarity is a molecular beacon or a molecular torch.

In certain aspects of the formulations, the labeled detection probe is non-extendable. For example, the labeled detection probe can be rendered non-extendable by 3'-phosphorylation; having a 3'-terminal 3'-deoxynucleotide (e.g., a terminal 2', 3'-dideoxynucleotide); having a 3'-terminal inverted nucleotide (e.g., in which the last nucleotide is inverted such that it is joined to the penultimate nucleotide by a 3' to 3' phosphodiester linkage or analog thereof, such as a phosphorothioate); or having an attached fluorophore, quencher, or other label that interferes with extension (possibly but not necessarily attached via the 3' position of the terminal nucleotide). In certain aspects, the 3'-terminal nucleotide is not methylated.

In certain aspects of the formulations, the detection probe comprises at least one modified nucleobase. In certain aspects, the modified nucleobase is selected from the group consisting of: (a) a 2'-O-methyl; (b) a 5-methyl-cytosine; (c) a 2'-fluorine; and (d) a combination of two or more of (a), (b) and (c).

In certain aspects, the formulations may further include additional reagents suitable for performing in vitro amplification such as, e.g., buffers, salt, various dNTPs, and/or enzymes.

In certain aspects, the formulations may be packaged in a variety of different embodiments, and those skilled in the art will appreciate that the disclosure embraces many different kit configurations.

In certain aspects, formulations disclosed herein may be aqueous, frozen, or lyophilized.

Also provided are reaction mixtures for determining the presence or absence of a VZV nucleic acid sequence in a sample, and amplifying, if present, a target nucleic acid sequence of VZV. The amplification primer formulation and detection probe formulation can be provided as separate formulations or compositions or in a single formulation of composition. The reaction mixtures may additionally contain other reagents necessary for in vitro amplification, including, but not limited to, buffers; salts; various dNTPs; enzymes (e.g., a thermostable DNA polymerase); and test samples.

In certain aspects, a reaction mixture for amplifying a target nucleic acid sequence within a target nucleic acid region of VZV, or amplifying an amplicon generated from the target nucleic acid sequence within the target nucleic acid region, comprises a first amplification primer, and a detection probe.

In certain aspects, the reaction mixtures comprise a set of amplification primers for determining the presence or absence of a VZV nucleic acid sequence in a sample, wherein a first amplification primer comprises a forward amplification primer and a second amplification primer comprises a reverse amplification primer.

In certain aspects, the reaction mixtures comprise amplification primers configured to specifically anneal to oligo hybridizing sequences within target nucleic acid regions of SEQ ID NO:38 and SEQ ID NO:39 of a VZV nucleic acid sequence (if present) in a sample.

In certain aspects, wherein the target nucleic acid region is SEQ ID NO:38, the reaction mixtures comprise forward and the reverse amplification primers each independently from about 19 to about 23 nucleotides in length, wherein the forward and reverse amplification primers are configured to generate an amplicon about 89 to about 127 nucleotides in length from the target nucleic acid region of SEQ ID NO:38.

In certain aspects, wherein the target nucleic acid region is SEQ ID NO:38, the reaction mixtures comprise a forward amplification primer selected from the group consisting of SEQ ID NOs: 1, 2, 3, 4, 5, 6 and 7 and a reverse amplification primer from about 19 to about 23 nucleotides in length, wherein the forward and reverse amplification primers are configured to generate an amplicon from a target nucleic acid sequence within SEQ ID NO:38 that is from about 89 to about 127 nucleotides in length. In certain aspects, wherein the target nucleic acid region is SEQ ID NO:38, the forward amplification primer comprises the sequence of SEQ ID NO:1. In certain aspects, wherein the target nucleic acid region is SEQ ID NO:38, the forward oligomer comprises the sequence of SEQ ID NO:2. In certain aspects, wherein the target nucleic acid region is SEQ ID NO:38, the forward oligomer comprises the sequence of SEQ ID NO:3. In certain aspects, wherein the target nucleic acid region is SEQ ID NO:38, the forward oligomer comprises the sequence of SEQ ID NO:4. In certain aspects, wherein the target nucleic acid region is SEQ ID NO:38, the forward oligomer comprises the sequence of SEQ ID NO:5. In certain aspects, wherein the target nucleic acid region is SEQ ID NO:38, the forward oligomer comprises the sequence of SEQ ID NO:6. In certain aspects, wherein the target nucleic acid region is SEQ ID NO:38, the forward oligomer comprises the sequence of SEQ ID NO:7.

In certain aspects, wherein the target nucleic acid region is SEQ ID NO:38, the reaction mixtures comprise a forward amplification primer selected from the group consisting of SEQ ID NOs: 1, 2, 3, 4, 5, 6 and 7, and a reverse amplification primer from about 19 to about 23 nucleotides in length and selected from the group consisting of SEQ ID NOs: 16, 17, 18, 19, 20, 21 and 22. In certain aspects, wherein the target nucleic acid region is SEQ ID NO:38, the reverse oligomer comprises the sequence of SEQ ID NO:16. In certain aspects, wherein the target nucleic acid region is SEQ ID NO:38, the reverse oligomer comprises the sequence of SEQ ID NO:17. In certain aspects, wherein the target nucleic acid region is SEQ ID NO:38, the reverse oligomer comprises the sequence of SEQ ID NO:18. In certain aspects, wherein the target nucleic acid region is SEQ ID NO:38, the reverse oligomer comprises the sequence of SEQ ID NO:19. In certain aspects, wherein the target nucleic acid region is SEQ ID NO:38, the reverse oligomer comprises the sequence of SEQ ID NO:20. In certain aspects, wherein the target nucleic acid region is SEQ ID NO:38, the reverse oligomer comprises the sequence of SEQ ID NO:21. In certain aspects, wherein the target nucleic acid region is SEQ ID NO:38, the reverse oligomer comprises the sequence of SEQ ID NO:22.

In certain aspects, wherein the target nucleic acid region is SEQ ID NO:38, the reaction mixtures comprise a reverse amplification primer selected from the group consisting of SEQ ID NOs: 16, 17, 18, 19, 20, 21 and 22 and a forward amplification primer from about 20 to about 23 nucleotides in length, wherein the amplification oligomers are configured to generate an amplicon from a target nucleic acid sequence within SEQ ID NO:38 that is from about 89 to about 127 nucleotides in length.

In certain aspects, wherein the target nucleic acid region is SEQ ID NO:38, the reaction mixtures comprise a forward amplification primer selected from the group consisting of SEQ ID NOs: 1, 2, 3, 4, 5, 6 and 7, and a reverse amplification primer selected from the group consisting of SEQ ID NOs: 16, 17, 18, 19, 20, 21 and 22, wherein the forward and reverse amplification primers are configured to generate an amplicon from a target nucleic acid sequence within SEQ ID NO:38 that is 89, 93, 100, 102, 119, 123, or 127 nucleotides in length. In certain aspects, wherein the target nucleic acid region is SEQ ID NO:38, the amplicon is 89 nucleotides in length. In certain aspects, wherein the target nucleic acid region is SEQ ID NO:38, the amplicon is 93 nucleotides in length. In certain aspects, wherein the target nucleic acid region is SEQ ID NO:38, the amplicon is 100 nucleotides in length. In certain aspects, wherein the target nucleic acid region is SEQ ID NO:38, the amplicon is 102 nucleotides in length. In certain aspects, wherein the target nucleic acid region is SEQ ID NO:38, the amplicon is 119 nucleotides in length. In certain aspects, wherein the target nucleic acid region is SEQ ID NO:38, the amplicon is 123 nucleotides in length. In certain aspects, wherein the target nucleic acid region is SEQ ID NO:38, the amplicon is 127 nucleotides in length.

In certain aspects, wherein the target nucleic acid region is SEQ ID NO:38, the reaction mixtures comprise, a forward amplification primer selected from the group consisting of SEQ ID NOs: 1, 2, 3, 4, 5, 6 and 7, and a reverse amplification primer is selected from the group consisting of SEQ ID NOs: 16, 17, 18, 19, 20, 21 and 22, wherein the forward and reverse amplification primers respectfully comprise target nucleic acid sequences corresponding to the oligo hybridization sequences of: (a) SEQ ID NO:1 and SEQ ID NO:16; (b) SEQ ID NO:1 and SEQ ID NO:17; (c) SEQ ID NO:2 and SEQ ID NO:17; (d) SEQ ID NO:3 and SEQ ID NO:18; (e) SEQ ID NO:4 and SEQ ID NO:19; (f) SEQ ID NO:5 and SEQ ID NO:20; (g) SEQ ID NO:6 and SEQ ID NO:21; (h) SEQ ID NO:7 and SEQ ID NO:22.

In certain aspects, wherein the target nucleic acid region is SEQ ID NO:38, the reaction mixtures comprise one or more of: (a) a forward amplification primer and a reverse amplification primer configured to generate an amplicon from a target nucleic acid sequence that is at least about 89 nucleotides in length and flanked between SEQ ID NO:3 and SEQ ID NO:18 within the target nucleic acid region; (b) a forward amplification primer and a reverse amplification primer configured to generate an amplicon from a target nucleic acid sequence that is at least about 93 nucleotides in length and flanked between SEQ ID NO:4 and SEQ ID NO:19 within the target nucleic acid region; (c) a forward amplification primer and a reverse amplification primer configured to generate an amplicon from a target nucleic acid sequence that is at least about 100 nucleotides in length and flanked between SEQ ID NO:2 and SEQ ID NO:17 within the target nucleic acid region; (d) a forward amplification primer and a reverse amplification primer configured to generate an amplicon from a target nucleic acid sequence that is at least about 102 nucleotides in length and flanked between SEQ ID NO:7 and SEQ ID NO:22 within the target nucleic acid region; (e) a forward amplification primer and a reverse amplification primer configured to generate an amplicon from a target nucleic acid sequence that is at least about 119 nucleotides in length and flanked between SEQ ID NO:6 and SEQ ID NO:21 within the target nucleic acid region; (f) a forward amplification primer and a reverse amplification primer configured to generate an amplicon from a target nucleic acid sequence that is at least about 123 nucleotides in length and flanked between SEQ ID NO:1 and SEQ ID NO:17 within the target nucleic acid region; and (g) a forward amplification primer and a reverse amplification primer configured to generate an amplicon from a target nucleic acid sequence that is at least about 127 nucleotides in length and flanked between SEQ ID NO:1 and SEQ ID NO:16 or SEQ ID NO:5 and SEQ ID NO:20 within the target nucleic acid region.

In certain aspects, wherein the target nucleic acid region is SEQ ID NO:39, the reaction mixtures comprise, a forward amplification primer and a reverse amplification primer each independently from about 20 to about 23 nucleotides in length, wherein the forward and reverse amplification primers are configured to generate an amplicon from a target nucleic acid sequence within SEQ ID NO:39 that is from about 89 to about 143 nucleotides in length.

In certain aspects, wherein the target nucleic acid region is SEQ ID NO:39, the reaction mixtures comprise a forward amplification primer selected from the group consisting of SEQ ID NOs: 23, 24, 25, 26 and 27, and a reverse amplification primer from about 20 to about 22 nucleotides in length, wherein the forward and reverse amplification primer are configured to generate an amplicon from a target nucleic acid sequence within SEQ ID NO:39 that is from about 89 to about 143 nucleotides in length. In certain aspects, wherein the target nucleic acid region is SEQ ID NO:39, the forward oligomer comprises the sequence of SEQ ID NO:23. In certain aspects, wherein the target nucleic acid region is SEQ ID NO:39, the forward oligomer comprises the sequence of SEQ ID NO:24. In certain aspects, wherein the target nucleic acid region is SEQ ID NO:39, the forward oligomer comprises the sequence of SEQ ID NO:25. In certain aspects, wherein the target nucleic acid region is SEQ ID NO:39, the forward oligomer comprises the sequence of SEQ ID NO:26. In certain aspects, wherein the target nucleic acid region is SEQ ID NO:39, the forward oligomer comprises the sequence of SEQ ID NO:27.

In certain aspects, wherein the target nucleic acid region is SEQ ID NO:39, the reaction mixtures comprise a forward amplification primer selected from the group consisting of SEQ ID NOs: 23, 24, 25, 26 and 27, and a reverse amplification primer from about 20 to about 22 nucleotides in length and selected from the group consisting of SEQ ID NOs: 34, 35, 36 and 37. In certain aspects, wherein the target nucleic acid region is SEQ ID NO:39, the reverse oligomer comprises the sequence of SEQ ID NO:34. In certain aspects, wherein the target nucleic acid region is SEQ ID NO:39, the reverse oligomer comprises the sequence of SEQ ID NO:35. In certain aspects, wherein the target nucleic acid region is SEQ ID NO:39, the reverse oligomer comprises the sequence of SEQ ID NO:36. In certain aspects, wherein the target nucleic acid region is SEQ ID NO:39, the reverse oligomer comprises the sequence of SEQ ID NO:37.

In certain aspects, wherein the target nucleic acid region is SEQ ID NO:39, the reaction mixtures comprise a reverse amplification primer selected from the group consisting of SEQ ID NOs: 34, 35, 36 and 37, and a forward amplification primer from about 20 to about 23 nucleotides in length, wherein the forward and reverse amplification primers are configured to generate an amplicon from a target nucleic acid sequence within SEQ ID NO:39 that is from about 89 to about 143 nucleotides in length.

In certain aspects, wherein the target nucleic acid region is SEQ ID NO:39, the reaction mixtures comprise, a forward amplification primer selected from the group consisting of SEQ ID NOs: 23, 24, 25, 26 and 27, and a reverse amplification primer is selected from the group consisting of SEQ ID NOs: 34, 35, 36 and 37, wherein the forward and reverse amplification primers are configured to generate an amplicon from a target nucleic acid sequence within SEQ ID NO:39 that is 89, 99, 109, 126, or 143 nucleotides in length. In certain aspects, wherein the target nucleic acid region is SEQ ID NO:39, the amplicon is 89 nucleotides in length. In certain aspects, wherein the target nucleic acid region is SEQ ID NO:39, the amplicon is 99 nucleotides in length. In certain aspects, wherein the target nucleic acid region is SEQ ID NO:39, the amplicon is 109 nucleotides in length. In certain aspects, wherein the target nucleic acid region is SEQ ID NO:39, the amplicon is 126 nucleotides in length. In certain aspects, wherein the target nucleic acid region is SEQ ID NO:39, the amplicon is 143 nucleotides in length.

In certain aspects, wherein the target nucleic acid region is SEQ ID NO:39, the reaction mixtures comprise a forward amplification primer selected from the group consisting of SEQ ID NOs: 23, 24, 25, 26 and 27, and a reverse amplification primer selected from the group consisting of SEQ ID NOs: 34, 35, 36 and 37, wherein the forward and reverse amplification primers respectfully comprise target nucleic acid sequences corresponding to the oligo hybridization sequences of: (a) SEQ ID NO:23 and SEQ ID NO:34; (b) SEQ ID NO:24 and SEQ ID NO:34; (c) SEQ ID NO:25 and SEQ ID NO:35; (d) SEQ ID NO:26 and SEQ ID NO:36; (e) SEQ ID NO:27 and SEQ ID NO:37.

In certain aspects, wherein the target nucleic acid region is SEQ ID NO:39, the reaction mixtures comprise one or more of: (a) a forward amplification primer and a reverse amplification primer configured to generate an amplicon from a target nucleic acid sequence that is at least about 89 nucleotides in length and flanked between SEQ ID NO:25 and SEQ ID NO:35 within the target nucleic acid region; (b) a forward amplification primer and a reverse amplification primer configured to generate an amplicon from a target nucleic acid sequence that is at least about 99 nucleotides in length and flanked between SEQ ID NO:24 and SEQ ID NO:34 within the target nucleic acid region; (c) a forward amplification primer and a reverse amplification primer configured to generate an amplicon from a target nucleic acid sequence that is at least about 109 nucleotides in length and flanked between SEQ ID NO:23 and SEQ ID NO:34 within the target nucleic acid region; (d) a forward amplification primer and a reverse amplification primer configured to generate an amplicon from a target nucleic acid sequence that is at least about 126 nucleotides in length and flanked between SEQ ID NO:27 and SEQ ID NO:37 within the target nucleic acid region; (e) a forward amplification primer and a reverse amplification primer configured to generate an amplicon from a target nucleic acid sequence that is at least about 143 nucleotides in length and flanked between SEQ ID NO:26 and SEQ ID NO:36 within the target nucleic acid region.

In certain aspects, the reaction mixtures comprise at least one amplification primer configured to anneal to the target nucleic acid sequence in the forward orientation and at least one amplification primer configured to anneal to the target nucleic acid sequence in the reverse orientation, wherein the amplification primers specifically hybridize to a contiguous nucleotide sequence comprising the oligo hybridizing sequences on the target nucleic acid sequence to be amplified within the target nucleic acid regions of SEQ ID NO:38 or SEQ ID NO:39 of the VZV nucleic acid sequence (if present) in a sample.

In some embodiments of the reaction mixtures, compositions for determining the presence (or absence) of a target nucleic acid sequence of VZV in a sample includes: (a) at least one forward amplification primer configured to specifically hybridize to an oligo hybridizing sequence within the target nucleic acid region of SEQ ID NO:38 or SEQ ID NO:39, and (b) at least one reverse amplification primer configured to specifically hybridize to an oligo hybridizing sequence within the target nucleic acid region of SEQ ID NO:38 or SEQ ID NO:39.

In certain aspects of the reaction mixtures, the forward amplification primer comprises at least one modified nucleobase. In certain aspects, the modified nucleobase is selected from the group consisting of: (a) a 2'-O-methyl; (b) a 5-methylcytosine; (c) a 2'-fluorine; and (d) a combination of two or more of (a), (b) and (c).

In certain aspects of the reaction mixture, the forward amplification primer comprises from two to six modified nucleobases. The two to six modified nucleobases can be the same or different. In certain aspects, the forward amplification primer comprises from two to six 5-methylcytosine residues. In some embodiments, the forward amplification primer comprises two 5-methylcytosine residues. In some embodiments, the forward amplification primer comprises three 5'-methylcytosine residues. In some embodiments, the forward amplification primer comprises four 5'-methylcytosine residues. In some embodiments, the forward amplification primer comprises five 5'-methylcytosine residues. In some embodiments, the forward amplification primer comprises six 5-methylcytosine residues. In certain aspects, the forward amplification primer comprises from two to six 2'-O-methyl residues. In some embodiments, the forward amplification primer comprises two 2'-O-methyl residues. In some embodiments, the forward amplification primer comprises three 2'-O-methyl residues. In some embodiments, the forward amplification primer comprises four 2'-O-methyl residues. In some embodiments, the forward amplification primer comprises five 2'-O-methyl residues. In some embodiments, the forward amplification primer comprises six 2'-O-methyl residues.

In certain aspects of the reaction mixtures, the reverse amplification primer comprises at least one modified nucleobase. In certain aspects, the modified nucleobase is selected from the group consisting of: (a) a 2'-O-methyl; (b) a 5'-methylcytosine; (c) a 2'-fluorine; and (d) a combination of two or more of (a), (b) and (c).

In certain aspects, the reverse amplification primer comprises from two to six modified nucleobases. The two to six modified nucleobases can be the same or different. In certain aspects, the reverse amplification primer comprises from two to six 5-methylcytosine residues. In some embodiments, the reverse amplification primer comprises two 5-methylcytosine residues. In some embodiments, the reverse amplification primer comprises three 5-methylcytosine residues. In some embodiments, the reverse amplification primer comprises four 5-methylcytosine residues. In some embodiments, the reverse amplification primer comprises five 5-methylcytosine residues. In some embodiments, the reverse amplification primer comprises six 5-methylcytosine residues. In certain aspects, the reverse amplification primer comprises from two to six 2'-O-methyl residues. In some embodiments, the reverse amplification primer comprises two 2'-O-methyl residue. In some embodiments, the reverse amplification primer comprises three 2'-O-methyl residues. In some embodiments, the reverse amplification primer comprises four 2'-O-methyl residues. In some embodiments, the reverse amplification primer comprises five 2'-O-methyl residues. In some embodiments, the reverse amplification primer comprises six 2'-O-methyl residues.

In certain aspects, the reaction mixtures comprise a third oligomer configured to specifically anneal to the target nucleic acid sequence to be amplified within the target nucleic acid region of SEQ ID NO:38 and SEQ ID NO:39 of the VZV nucleic acid sequence (if present) in a sample. In certain aspects, the third oligomer hybridizes to an oligo hybridization sequence within SEQ ID NO:38. In some embodiments, a third oligomer hybridizes to an oligo hybridization sequence within SEQ ID NO:39. In certain aspects, the third oligomer is a detection probe.

In certain aspects, wherein the target nucleic acid region is SEQ ID NO:38, the reaction mixtures comprise a detection probe about 23 to about 27 nucleotides in length.

In certain aspects, wherein the target nucleic acid region is SEQ ID NO:38, the reaction mixtures comprise a detection probe selected from the group consisting of SEQ ID NOs: 8, 9, 10, 11, 12, 13, 14 and 15. In certain aspects, wherein the target nucleic acid region is SEQ ID NO:38, the detection probe comprises the sequence of SEQ ID NO:8. In certain aspects, wherein the target nucleic acid region is SEQ ID NO:38, the detection probe comprises the sequence of SEQ ID NO:9. In certain aspects, wherein the target nucleic acid region is SEQ ID NO:38, the detection probe comprises the sequence of SEQ ID NO:10. In certain aspects, wherein the target nucleic acid region is SEQ ID NO:38, the detection probe comprises the sequence of SEQ ID NO:11. In certain aspects, wherein the target nucleic acid region is SEQ ID NO:38, the detection probe comprises the sequence of SEQ ID NO:12. In certain aspects, wherein the target nucleic acid region is SEQ ID NO:38, the detection probe comprises the sequence of SEQ ID NO:13. In certain aspects, wherein the target nucleic acid region is SEQ ID NO:38, the detection probe comprises the sequence of SEQ ID NO:14. In certain aspects, wherein the target nucleic acid region is SEQ ID NO:38, the detection probe oligomer comprises the sequence of SEQ ID NO:15.

In certain aspects, wherein the target nucleic acid region is SEQ ID NO:38, the reaction mixtures comprise a detection probe comprising a target nucleic acid sequence substantially corresponding to the oligo hybridization sequence of: SEQ ID NO:8 if the forward and reverse amplification primers are (I) SEQ ID NO:1 and SEQ ID NO:16 or (II) SEQ ID NO:1 and SEQ ID NO:17; SEQ ID NO:9 if the forward and reverse amplification primers are (I) SEQ ID NO:1 and SEQ ID NO:16 or (II) SEQ ID NO:1 and SEQ ID NO:17 or (III) SEQ ID NO:2 and SEQ ID NO:17; SEQ ID NO:10 if the forward and reverse amplification primers are SEQ ID NO:3 and SEQ ID NO:18; SEQ ID NO:11 if the forward and reverse amplification primers are SEQ ID NO:4 and SEQ ID NO:19; SEQ ID NO:12 if the forward and reverse amplification primers are SEQ ID NO:4 and SEQ ID NO:19; SEQ ID NO:13 if the forward and reverse amplification primers are SEQ ID NO:5 and SEQ ID NO:20; SEQ ID NO:14 if the forward and reverse amplification primers are SEQ ID NO:6 and SEQ ID NO:21; SEQ ID NO:15 if the forward and reverse amplification primers are SEQ ID NO:7 and SEQ ID NO:22.

In certain aspects, wherein the target nucleic acid region is SEQ ID NO:38 the reaction mixtures comprises one or more of: (a) a detection probe comprising the sequence of SEQ ID NO:10 when the forward amplification primer and reverse amplification primer are configured to generate an amplicon of the target nucleic acid sequence that is at least about 89 nucleotides in length from SEQ ID NO:3 and SEQ ID NO:18 on the target nucleic acid region; (b) a detection probe comprising the sequence of SEQ ID NO:11 or SEQ ID NO:12 when the forward amplification primer and reverse amplification primer are configured to generate an amplicon of the target nucleic acid sequence that is at least about 93 nucleotides in length from SEQ ID NO:4 and SEQ ID NO:19 on the target nucleic acid region; (c) a detection probe comprising the sequence of SEQ ID NO:9 when the forward amplification primer and reverse amplification primer are configured to generate an amplicon of the target nucleic acid sequence that is at least about 100 nucleotides in length from SEQ ID NO:2 and SEQ ID NO:17 on the target nucleic acid region; (d) a detection probe comprising the sequence of SEQ ID NO:15 when the forward amplification primer and reverse amplification primer are configured to generate an amplicon of the target nucleic acid sequence that is at least about 102 nucleotides in length from SEQ ID NO:7 and SEQ ID NO:22 on the target nucleic acid region; (e) a detection probe comprising the sequence of SEQ ID NO:14 when the forward amplification primer and reverse amplification primer are configured to generate an amplicon of the target nucleic acid sequence that is at least about 119 nucleotides in length from SEQ ID NO:6 and SEQ ID NO:21 on the target nucleic acid region; (f) a detection probe comprising the sequence of SEQ ID NO:8 or SEQ ID NO:9 when the forward amplification primer and reverse amplification primer are configured to generate an amplicon of the target nucleic acid sequence that is at least about 123 nucleotides in length from SEQ ID NO:1 and SEQ ID NO:17 on the target nucleic acid region; (g) a detection probe comprising the sequence of SEQ ID NO:8 or SEQ ID NO:9 when the forward amplification primer and reverse amplification primer are configured to generate an amplicon of the target nucleic acid sequence that is at least about 127 nucleotides in length from SEQ ID NO:1 and SEQ ID NO:16 or the detection probe comprises the sequence of SEQ ID NO:13 when the forward amplification primer and reverse amplification primer are configured to generate an amplicon of the target nucleic acid sequence that is at least about 127 nucleotides in length from SEQ ID NO:5 and SEQ ID NO:20 on the target nucleic acid region.

In certain aspects, wherein the target nucleic acid region is SEQ ID NO:39, the reaction mixtures comprise a detection probe about 22 to about 27 nucleotides in length.

In certain aspects, wherein the target nucleic acid region is SEQ ID NO:39, the reaction mixtures comprise, a detection probe selected from the group consisting of SEQ ID NOs: 28, 29, 30, 31, 32 and 33. In certain aspects, wherein the target nucleic acid region is SEQ ID NO:39, the detection probe comprises the sequence of SEQ ID NO:28. In certain aspects, wherein the target nucleic acid region is SEQ ID NO:39, the detection probe comprises the sequence of SEQ ID NO:29. In certain aspects, wherein the target nucleic acid region is SEQ ID NO:39, the detection probe comprises the sequence of SEQ ID NO:30. In certain aspects, wherein the target nucleic acid region is SEQ ID NO:39, the detection probe comprises the sequence of SEQ ID NO:31. In certain aspects, wherein the target nucleic acid region is SEQ ID NO:39, the detection probe comprises the sequence of SEQ ID NO:32. In certain aspects, wherein the target nucleic acid region is SEQ ID NO:39, the detection probe comprises the sequence of SEQ ID NO:33.

In certain aspects, wherein the target nucleic acid region is SEQ ID NO:39, the reaction mixtures comprise a detection probe comprising a target nucleic acid sequence substantially corresponding to the oligo hybridization sequence of: SEQ ID NO:28 if the forward and reverse amplification primers are (I) SEQ ID NO:23 and SEQ ID NO:34 or (II)

SEQ ID NO:24 and SEQ ID NO:34; SEQ ID NO:29 if the forward and reverse amplification primers are SEQ ID NO:25 and SEQ ID NO:35; SEQ ID NO:30 if the forward and reverse amplification primers are SEQ ID NO:25 and SEQ ID NO:35; SEQ ID NO:31 if the forward and reverse amplification primers are SEQ ID NO:26 and SEQ ID NO:36; SEQ ID NO:32 if the forward and reverse amplification primers are SEQ ID NO:27 and SEQ ID NO:37; SEQ ID NO:33 if the forward and reverse amplification primers are SEQ ID NO:27 and SEQ ID NO:37.

In certain aspects, wherein the target nucleic acid region is SEQ ID NO:39, the reaction mixtures comprise one or more of: (a) a third oligomer comprising the sequence of SEQ ID NO:29 or SEQ ID NO:30 when the forward amplification primer and reverse amplification primer are configured to generate an amplicon of the target nucleic acid sequence that is at least about 89 nucleotides in length from SEQ ID NO:25 and SEQ ID NO:35 on the target nucleic acid region; (b) a third oligomer comprising the sequence of SEQ ID NO:28 when the forward amplification primer and reverse amplification primer are configured to generate an amplicon of the target nucleic acid sequence that is at least about 99 nucleotides in length from SEQ ID NO:24 and SEQ ID NO:34 on the target nucleic acid region; (c) a third oligomer comprising the sequence of SEQ ID NO:28 when the forward amplification primer and reverse amplification primer are configured to generate an amplicon of the target nucleic acid sequence that is at least about 109 nucleotides in length from SEQ ID NO:23 and SEQ ID NO:34 on the target nucleic acid region; (d) a third oligomer comprising the sequence of SEQ ID NO:32 or SEQ ID NO:33 when the forward amplification primer and reverse amplification primer are configured to generate an amplicon of the target nucleic acid sequence that is at least about 126 nucleotides in length from SEQ ID NO:27 and SEQ ID NO:37 on the target nucleic acid region; (e) a third oligomer comprising the sequence of SEQ ID NO:31 when the forward amplification primer and reverse amplification primer are configured to generate an amplicon of the target nucleic acid sequence that is at least about 143 nucleotides in length from SEQ ID NO:26 and SEQ ID NO:36 on the target nucleic acid region.

In certain aspects, reaction mixtures for determining the presence (or absence) of VZV in a sample comprise at least one detection probe configured to specifically anneal to oligo hybridizing sequences within the target nucleic acid region of SEQ ID NO:38 or SEQ ID NO:39, wherein the detection probe is flanked between the forward and reverse amplification primers.

In certain aspects of the reaction mixtures, the detection probe comprises at least one detectable label. In some aspects, the detection probe further includes a second label that interacts with the first label. In some aspects, the second label is a quencher.

In certain aspects of the reaction mixtures, the label is selected from the group consisting of: (a) a chemiluminescent label; (b) a fluorescent label; (c) a quencher; and (d) a combination of two or more of (a), (b) and (c). In certain aspects, the reaction mixture comprises a fluorescent label. In certain aspects, the reaction mixture comprises a quencher. In certain aspects, the reaction mixture comprises both a fluorescent dye and quencher.

In certain aspects of the reaction mixtures, the detection probe is linear and does not exhibit any degree of self-complementarity held by intramolecular bonds. In some embodiments, the linear detection probe includes a fluorophore as the label. In some embodiments, the linear detection probe comprises both a fluorophore and a quenching moiety (e.g., a TaqMan™ probe).

In certain aspects of the reaction mixtures, the detection probe exhibits at least some degree of self-complementarity, and is used to facilitate detection of probe:target duplexes in a sample, without first requiring the removal of unhybridized probe prior to detection. In certain aspects of the reaction mixtures, a hairpin detection probe exhibiting at least some degree of self-complementarity is a molecular beacon or a molecular torch.

In certain aspects of the reaction mixtures, the labeled detection probe is non-extendable. For example, the labeled detection probe can be rendered non-extendable by 3'-phosphorylation; having a 3'-terminal 3'-deoxynucleotide (e.g., a terminal 2', 3'-dideoxynucleotide); having a 3'-terminal inverted nucleotide (e.g., in which the last nucleotide is inverted such that it is joined to the penultimate nucleotide by a 3' to 3' phosphodiester linkage or analog thereof, such as a phosphorothioate); or having an attached fluorophore, quencher, or other label that interferes with extension (possibly but not necessarily attached via the 3' position of the terminal nucleotide). In certain aspects, the 3'-terminal nucleotide is not methylated.

In certain aspects of the reaction mixtures, the detection probe comprises at least one modified nucleobase. In certain aspects, the modified nucleobase is selected from the group consisting of: (a) a 2'-O-methyl; (b) a 5-methylcytosine; (c) a 2'-fluorine; and (d) a combination of two or more of (a), (b) and (c).

In certain aspects, a reaction mixture comprises at least one amplification primer or detection probe as describe herein. In certain aspects, a reaction mixture includes multiple amplification primers, and/or detection probes. In certain aspects, a reaction mixture includes a single set of forward and reverse amplification primers that produce a single amplicon of the target nucleic acid sequence from a target nucleic acid region. In certain aspects, a reaction mixture includes multiple sets of amplification primers that produce multiple amplicons from various target nucleic acid sequences within various target nucleic acid regions. In certain aspects, a reaction mixture includes multiple sets of amplification primers that produce multiple amplicons from various target nucleic acid sequences within a single target nucleic acid region.

In certain aspects, a reaction mixture includes additional reagents for determining the presence of VZV in a sample and the amplification, if present, of a target nucleic acid sequence of the VZV nucleic acid sequence in a sample. In certain aspects, a reaction mixture may include reagents suitable for performing in vitro amplification such as: various dNTPs; enzymes; buffers; and/or salts.

In certain aspects, a reaction mixture may include various individual nucleotide subunits of DNA such as: dATP, dCTP, dGTP, and dTTP; and/or ATP, CTP, GTP and UTP. In certain aspects, a reaction mixture may include a DNA polymerase enzyme or a reverse transcriptase enzyme. In certain aspects, a reaction mixture may include an organic buffer. In certain aspects, the reaction mixture may include one or more surfactants.

In certain aspects, a reaction mixture may include one or more inorganic salts selected from the group comprising: magnesium chloride; sodium chloride; potassium chloride; and sodium citrate. In certain aspects, a reaction mixture may include magnesium chloride. In certain aspects, a reaction mixture may include magnesium chloride at a concentration between 3 mM and 6 mM. In certain aspects, the concentration of magnesium chloride is 2 mM. In certain aspects, the concentration of magnesium chloride is 4 mM. In certain aspects, the concentration of magnesium chloride is 6 mM.

In certain aspects, a reaction mixture may be an aqueous reaction mixture. In certain aspects, a reaction mixture may be frozen. In certain aspects, a reaction mixture may be lyophilized. In certain aspects, the lyophilized reaction mixture may appear as a powder or cake or a sphere. In certain aspects, the lyophilized reaction mixture may contain bulking agents such as, e.g., trehalose, raffinose, or a combination thereof.

Exemplary compositions, kits, reaction mixtures, formulations and methods are further illustrated by the following non-limiting examples.

Exemplary compositions, kits, reaction mixtures, formulations and methods are further illustrated by the following non-limiting examples.

LISTING OF EMBODIMENTS

1. An oligonucleotide composition for amplifying a target nucleic acid sequence within a target nucleic acid region of VZV, or amplifying an amplicon generated from the target nucleic acid sequence within the target nucleic acid region, comprising: at least two amplification primers, wherein a first amplification primer is a forward amplification primer and a second amplification primer is a reverse amplification primer.

2. The oligonucleotide compositions of embodiment 1, wherein the target nucleic acid region is SEQ ID NO:38 or SEQ ID NO:39.

3. The oligonucleotide compositions of embodiments 1 or 2, wherein the target nucleic acid region is SEQ ID NO:38, and wherein the forward and the reverse amplification primers are each independently from about 19 to about 23 nucleotides in length, and wherein the forward and reverse amplification primers are configured to generating an amplicon about 89 to about 127 nucleotides in length from the target nucleic acid region of SEQ ID NO:38.

4. The oligonucleotide compositions of any one of embodiments 1 to 3, wherein the target nucleic acid region is SEQ ID NO:38, and the forward amplification primer is selected from a group consisting of SEQ ID NOs: 1, 2, 3, 4, 5, 6 and 7, and the reverse amplification primer is from about 19 to about 23 nucleotides in length, and wherein the two amplification primers are configured to generate an amplicon about 89 to about 127 nucleotides in length from the target nucleic acid region of SEQ ID NO:38.

5. The oligonucleotide compositions of any one of embodiments 1 to 4, wherein the target nucleic acid region is SEQ ID NO:38, and the reverse amplification primer is selected from the group consisting of SEQ ID NOs: 16, 17, 18, 19, 20, 21 and 22.

6. The oligonucleotide compositions of any one of embodiments 1 to 3, wherein the target nucleic acid region is SEQ ID NO:38, and wherein the reverse amplification primer is selected from a group consisting of SEQ ID NOs: 16, 17, 18, 19, 20, 21 and 22, and the forward amplification primer is from about 20 to about 23 nucleotides in length, and wherein the reverse and forward the amplification primers are configured to generate an amplicon about 89 to about 127 nucleotides in length from the target nucleic acid region of SEQ ID NO:38.

7. The oligonucleotide compositions of embodiment 4 or embodiment 6, wherein the forward amplification primer is configured to hybridize to an oligo hybridizing region within SEQ ID NO:38 or its complement, wherein the reverse amplification primer is configured to hybridize to an oligo hybridizing region within SEQ ID NO:38 or its complement, and wherein the distance between the oligo hybridizing region of the first amplification primer and the oligo hybridizing region of the second amplification region is 89, 93, 100, 102, 119, 123 or 127 nucleotides in length along SEQ ID NO:38 when measured from the most distant nucleotides of the two oligo hybridizing regions.

8. The oligonucleotide compositions of any one of embodiments 1 to 7, wherein the target nucleic acid region is SEQ ID NO:38, and wherein the forward and the reverse amplification primers comprise target nucleic acid sequences corresponding to: (a) SEQ ID NO:1 and SEQ ID NO:16; (b) SEQ ID NO:1 and SEQ ID NO:17; (c) SEQ ID NO:2 and SEQ ID NO:17; (d) SEQ ID NO:3 and SEQ ID NO:18; (e) SEQ ID NO:4 and SEQ ID NO:19; (f) SEQ ID NO:5 and SEQ ID NO:20; (g) SEQ ID NO:6 and SEQ ID NO:21; or (h) SEQ ID NO:7 and SEQ ID NO:22.

9. The oligonucleotide compositions of embodiments 1 or 2, wherein the target nucleic acid region is SEQ ID NO:39, and wherein the forward and reverse amplification primer are each independently from about 20 to about 23 nucleotides in length, and wherein the forward and reverse amplification primers are configured to generating an amplicon about 89 to about 143 nucleotides in length from the target nucleic acid region of SEQ ID NO:39.

10. The oligonucleotide compositions of embodiments 1 or 2 or 9, wherein the target nucleic acid region is SEQ ID NO:39, and the forward amplification primer is selected from a group consisting of SEQ ID NOs: 23, 24, 25, 26 and 27, and the reverse amplification primer is from about 20 to about 23 nucleotides in length, and wherein the two amplification primers are configured to generate an amplicon about 89 to about 143 nucleotides in length from the target nucleic acid region of SEQ ID NO:39.

11. The oligonucleotide compositions of embodiment 10, wherein the target nucleic acid region is SEQ ID NO:39, and the reverse amplification primer is selected from the group consisting of SEQ ID NOs: 34, 35, 36 and 37.

12. The oligonucleotide compositions of embodiments 1 or 2 or 9, wherein the target nucleic acid region is SEQ ID NO:39, and wherein the reverse amplification primer is selected from a group consisting of SEQ ID NOs: 34, 35, 36 and 37, and the forward amplification primer is from about 20 to about 23 nucleotides in length, and wherein the reverse and forward the amplification primers are configured to generate an amplicon about 89 to about 143 nucleotides in length from the target nucleic acid region of SEQ ID NO:39.

13. The oligonucleotide compositions of embodiment 10 or 12, wherein the forward amplification primer is configured to hybridize to an oligo hybridizing region within SEQ ID NO:39 or its complement, wherein the reverse amplification primer is configured to hybridize to an oligo hybridizing region within SEQ ID NO:39 or its complement, and wherein the distance between the oligo hybridizing region of the first amplification primer and the oligo hybridizing region of the second amplification region is of 89, 99, 109, 126 and 143 nucleotides in length along SEQ ID NO:39 when measured from the most distant nucleotides of the two oligo hybridizing regions.

14. The oligonucleotide compositions of embodiments 1 or 2 or any one of embodiments 9 to 13, wherein the target nucleic acid region is SEQ ID NO:39, and wherein the forward and the reverse amplification primers comprise target nucleic acid sequences corresponding to: (a) SEQ ID NO:23 and SEQ ID NO:34; (b) SEQ ID NO:24 and SEQ ID NO:34; (c) SEQ ID NO:25 and SEQ ID NO:35; (d) SEQ ID NO:26 and SEQ ID NO:36; or (e) SEQ ID NO:27 and SEQ ID NO:37.

15. The oligonucleotide compositions of any one of embodiments 1 to 14, further comprising a third oligonucleotide.

16. The oligonucleotide compositions of embodiment 15, wherein the third oligonucleotide is a detection probe.

17. The oligonucleotide compositions of any one of embodiments 2 to 8, wherein the target nucleic acid region is SEQ ID NO:38, and wherein the detection probe is from about 23 to about 27 nucleotides in length.

18. The oligonucleotide compositions of embodiment 17, wherein the target nucleic acid region is SEQ ID NO:38, and wherein the detection probe is selected from a group consisting of SEQ ID NOs: 8, 9, 10, 11, 12, 13, 14 and 15.

19. The oligonucleotide compositions of embodiment 17, wherein if the detection probe comprises a target hybridizing sequence of: (a) SEQ ID NO:8, then the forward and reverse amplification primers respectfully comprise (I) SEQ ID NO:1 and SEQ ID NO:16 or (II) SEQ ID NO:1 and SEQ ID NO:17; (b) SEQ ID NO:9, then the forward and reverse amplification primers respectfully comprise (I) SEQ ID NO:1 and SEQ ID NO:16 or (II) SEQ ID NO:1 and SEQ ID NO:17 or (III) SEQ ID NO:2 and SEQ ID NO:17; (c) SEQ ID NO:10, then the forward and reverse amplification primers respectfully comprise SEQ ID NO:3 and SEQ ID NO:18; (d) SEQ ID NO:11, then the forward and reverse amplification primers respectfully comprise SEQ ID NO:4 and SEQ ID NO:19; (e) SEQ ID NO:12, then the forward and reverse amplification primers respectfully comprise SEQ ID NO:4 and SEQ ID NO:19; (f) SEQ ID NO:13, then the forward and reverse amplification primers respectfully comprise SEQ ID NO:5 and SEQ ID NO:20; (g) SEQ ID NO:14, then the forward and reverse amplification primers respectfully comprise SEQ ID NO:6 and SEQ ID NO:21; or (h) SEQ ID NO:15, then the forward and reverse amplification primers respectfully comprise SEQ ID NO:7 and SEQ ID NO:22.

20. The oligonucleotide compositions of embodiment 2 or any one of embodiments 9 to 14, wherein the target nucleic acid region is SEQ ID NO:39, and wherein the detection probe is from about 22 to about 27 nucleotides in length.

21. The oligonucleotide compositions of embodiment 20, wherein the target nucleic acid region is SEQ ID NO:39, and wherein the detection probe is selected from a group consisting of SEQ ID NOs: 28, 29, 30, 31, 32 and 33.

22. The oligonucleotide compositions of embodiment 20, wherein if the detection probe comprises a target hybridizing sequence of: (a) SEQ ID NO:28, then if the forward and reverse amplification primers respectfully comprise (I) SEQ ID NO:23 and SEQ ID NO:34 or (II) SEQ ID NO:24 and SEQ ID NO:34; (b) SEQ ID NO:29, then the forward and reverse amplification primers respectfully comprise SEQ ID NO:25 and SEQ ID NO:35; (c) SEQ ID NO:30, then the forward and reverse amplification primers respectfully comprise SEQ ID NO:25 and SEQ ID NO:35; (d) SEQ ID NO:31, then the forward and reverse amplification primers respectfully comprise SEQ ID NO:26 and SEQ ID NO:36; (e) SEQ ID NO:32, then the forward and reverse amplification primers respectfully comprise SEQ ID NO:27 and SEQ ID NO:37; or (f) SEQ ID NO:33, then the forward and reverse amplification primers respectfully comprise SEQ ID NO:27 and SEQ ID NO:37.

23. The oligonucleotide compositions of any one of embodiments 15 to 22, wherein the detection probe further comprises at least one detectable label.

24. The oligonucleotide compositions of embodiment 23, wherein one or more of the detectable labels is selected from the group consisting of: (a) a chemiluminescent label; (b) a fluorescent label; (c) a quencher; or (d) a combination of two or more of (a), (b) and (c).

25. The oligonucleotide compositions of embodiment 24, wherein one or more of the detectable labels comprise the fluorescent label; or wherein one or more of the detectable labels comprise the quencher; or wherein one or more of the detectable labels comprise both the fluorescent label and the quencher.

26. The oligonucleotide compositions of any one of embodiments 15 to 25, wherein the detection probe is a TaqMan™ detection probe.

27. The oligonucleotide compositions of any one of embodiments 15 to 25, wherein the detection probe further comprises a non-target-hybridizing sequence; or wherein the detection probe comprising the non-target-hybridizing sequence is a hairpin detection probe; or wherein the hairpin detection probe is a molecular beacon or a molecular torch.

28. The oligonucleotide compositions of any one of embodiments 15 to 27, wherein the detection probe further comprises at least one modified nucleobase.

29. The oligonucleotide compositions of embodiment 28, wherein one or more of the modified nucleobases is selected from the group consisting of: (a) a 2'-O-methyl; (b) a 5-methylcytosine; (c) a 2'-fluorine; or (d) a combination of two or more of (a), (b) and (c).

30. The oligonucleotide compositions of embodiments 28 or 29, wherein the detection probe comprises from three to ten modified nucleobases; or wherein the detection probe comprises from three to ten 5-methylcytosine modified nucleobases; or wherein the detection probe comprises three 5-methylcytosine modified nucleobases; or wherein the detection probe comprises six 5-methylcytosine modified nucleobases; or wherein the detection probe comprises seven 5-methylcytosine modified nucleobases; or wherein the detection probe comprises ten 5-methylcytosine modified nucleobases; or wherein at least one modification is a 5-methylcytosine modified nucleobase; or wherein the detection probe comprises from three to ten 2'-O-methyl modified nucleobases; or wherein the detection probe comprises three 2'-O-methyl modified nucleobases; or, wherein the detection probe comprises six 2'-O-methyl modified nucleobases; or wherein the detection probe comprises seven 2'-O-methyl modified nucleobases; or wherein the detection probe comprises ten 2'-O-methyl modified nucleobases; or wherein at least one modification is a 2'-O-methyl modified nucleobase.

31. The oligonucleotide compositions of any one of embodiments 1 to 30, wherein the forward amplification primer further comprises at least one modified nucleobase.

32. The oligonucleotide compositions of embodiment 31, wherein one or more of the modified nucleobases is selected from the group consisting of: (a) a 2'-O-methyl; (b) a 5-methylcytosine; (c) a 2'-fluorine; or (d) a combination of two or more of (a), (b) and (c).

33. The oligonucleotide compositions of embodiment 31 or 32, wherein the forward amplification primer comprises from two to six modified nucleobases; or wherein the forward amplification primer comprises from two to six 5-methylcytosine modified nucleobases; or wherein the forward amplification primer comprises two 5-methylcytosine modified nucleobases; or wherein the forward amplification primer comprises three 5-methylcytosine modified nucleobases; or wherein the forward amplification primer comprises four 5-methylcytosine modified nucleobases; or wherein the forward amplification primer comprises six 5-methylcytosine modified nucleobases; or wherein at least one modification is a 5-methylcytosine modified nucleobase; or wherein the forward amplification primer comprises from two to six 2'-O-methyl modified nucleobases; or wherein the forward amplification primer comprises two 2'-O-methyl modified nucleobases; or wherein the forward amplification primer comprises three 2'-O-methyl modified nucleobases; or wherein the forward amplification primer comprises four 2'-O-methyl modified nucleobases; or wherein the forward amplification primer comprises six 2'-O-methyl modified nucleobases; or wherein at least one modification is a 2'-O-methyl modified nucleobase.

34. The oligonucleotide compositions of any one of embodiments 1 to 33, wherein the reverse amplification primer further comprises at least one modified nucleobase.

35. The oligonucleotide compositions of embodiment 34, wherein one or more of the modified nucleobases is selected from the group consisting of: (a) a 2'-O-methyl; (b) a 5-methylcytosine; (c) a 2'-fluorine; or (d) a combination of two or more of (a), (b) and (c).

36. The oligonucleotide compositions of embodiment 34 or 35, wherein the reverse amplification primer comprises from two to six modified nucleobases; or wherein the reverse amplification primer comprises from two to six 2'-fluorine modified nucleobases; or wherein the reverse amplification primer comprises one 2'-fluorine modified nucleobases; or wherein the reverse amplification primer comprises three 2'-fluorine modified nucleobases; or wherein the reverse amplification primer comprises four 2'-fluorine modified nucleobases; or wherein the reverse amplification primer comprises six 2'-fluorine modified nucleobases; or wherein at least one modification is a 2'-fluorine modified nucleobases; or wherein the reverse amplification primer comprises from two to six 5-methylcytosine modified nucleobases; or wherein the reverse amplification primer comprises one 5-methylcytosine modified nucleobases; or wherein the reverse amplification primer comprises three 5-methylcytosine modified nucleobases; or wherein the reverse amplification primer comprises four 5-methylcytosine modified nucleobases; or wherein the reverse amplification primer comprises five 5-methylcytosine modified nucleobases; or wherein the reverse amplification primer comprises six 5-methylcytosine modified nucleobases; or wherein at least one modification is a 5-methylcytosine modified nucleobase.

37. An oligonucleotide composition for the detection a target nucleic acid sequence within a target nucleic acid region of VZV, or detecting an amplicon generated from the target nucleic acid sequence within the target nucleic acid region, comprising: at least one oligonucleotide for detecting the target nucleic acid sequence.

38. The oligonucleotide compositions of embodiment 37, wherein the target nucleic acid region is SEQ ID NO:38 or SEQ ID NO:39.

39. The oligonucleotide compositions of embodiment 38, wherein the target nucleic acid region is SEQ ID NO:38, and wherein the detection probe is from about 23 to about 27 nucleotides in length.

40. The oligonucleotide compositions of embodiment 39, wherein the target nucleic acid region is SEQ ID NO:38, and wherein the detection probe is selected from a group consisting of SEQ ID NOs: 8, 9, 10, 11, 12, 13, 14 and 15.

41. The oligonucleotide compositions of embodiments 39 or 40, further comprising at least one set of amplification primers, wherein one amplification primer is a forward amplification primer, and one amplification primer is a reverse amplification primer.

42. The oligonucleotide compositions of embodiment 41, wherein the target nucleic acid region is SEQ ID NO:38, and the forward and reverse amplification primers are each individually from about 19 to about 23 nucleotides in length, and wherein the forward and reverse amplification primers are configured to generating an amplicon about 89 to about 127 nucleotides in length from the target nucleic acid region of SEQ ID NO:38.

43. The oligonucleotide compositions of embodiment 42, wherein the target nucleic acid region is SEQ ID NO:38, and the forward amplification primer is selected from the group consisting of SEQ ID NOs: 1, 2, 3, 4, 5, 6 and 7.

44. The oligonucleotide compositions of embodiments 42 or 43, wherein the target nucleic acid region is SEQ ID NO:38, and the reverse amplification primer is selected from the group consisting of SEQ ID NOs: 16, 17, 18, 19, 20, 21 and 22.

45. The oligonucleotide compositions of embodiment 41, wherein the target nucleic acid region is SEQ ID NO:38, and wherein the reverse amplification primer is selected from a group consisting of SEQ ID NOs: 16, 17, 18, 19, 20, 21 and 22, and the forward amplification primer is from about 20 to about 23 nucleotides in length, and wherein the reverse and forward the amplification primers are configured to generate an amplicon about 89 to about 127 nucleotides in length from the target nucleic acid region of SEQ ID NO:38.

46. The oligonucleotide compositions of embodiments 43 or 45, wherein the forward amplification primer is configured to hybridize to an oligo hybridizing region within SEQ ID NO:38 or its complement, wherein the reverse amplification primer is configured to hybridize to an oligo hybridizing region within SEQ ID NO:38 or its complement, and wherein the distance between the oligo hybridizing region of the first amplification primer and the oligo hybridizing region of the second amplification region is 89, 93, 100, 102, 119, 123 or 127 nucleotides in length along SEQ ID NO:38 when measured from the most distant nucleotides of the two oligo hybridizing regions.

47. The oligonucleotide compositions of any one of embodiments 41 to 46, wherein the target nucleic acid region is SEQ ID NO:38, and wherein the forward and the reverse amplification primers comprise target nucleic acid sequences corresponding to: (a) SEQ ID NO:1 and SEQ ID NO:16; (b) SEQ ID NO:1 and SEQ ID NO:17; (c) SEQ ID NO:2 and SEQ ID NO:17; (d) SEQ ID NO:3 and SEQ ID NO:18; (e) SEQ ID NO:4 and SEQ ID NO:19; (f) SEQ ID NO:5 and SEQ ID NO:20; (g) SEQ ID NO:6 and SEQ ID NO:21; or (h) SEQ ID NO:7 and SEQ ID NO:22.

48. The oligonucleotide compositions of embodiment 39, wherein if the detection probe comprises a target hybridizing sequence of: (a) SEQ ID NO:8, then the forward and reverse amplification primers respectfully comprise (I) SEQ ID NO:1 and SEQ ID NO:16 or (II) SEQ ID NO:1 and SEQ ID NO:17; (b) SEQ ID NO:9, then the forward and reverse amplification primers respectfully comprise (I) SEQ ID NO:1 and SEQ ID NO:16 or (II) SEQ ID NO:1 and SEQ ID NO:17 or (III) SEQ ID NO:2 and SEQ ID NO:17; (c) SEQ ID NO:10, then the forward and reverse amplification primers respectfully comprise SEQ ID NO:3 and SEQ ID NO:18; (d) SEQ ID NO:11, then the forward and reverse amplification primers respectfully comprise SEQ ID NO:4 and SEQ ID NO:19; (e) SEQ ID NO:12, then the forward and reverse amplification primers respectfully comprise SEQ ID NO:4 and SEQ ID NO:19; (f) SEQ ID NO:13, then the forward and reverse amplification primers respectfully comprise SEQ ID NO:5 and SEQ ID NO:20; (g) SEQ ID NO:14, then the forward and reverse amplification primers respectfully comprise SEQ ID NO:6 and SEQ ID NO:21; (h) SEQ ID NO:15, then the forward and reverse amplification primers respectfully comprise SEQ ID NO:7 and SEQ ID NO:22.

49. The oligonucleotide compositions of embodiment 38, wherein the target nucleic acid region is SEQ ID NO:39, and wherein the detection probe is from about 22 to about 27 nucleotides in length.

50. The oligonucleotide compositions of embodiment 49, wherein the target nucleic acid region is SEQ ID NO:39, and wherein the detection probe is selected from a group consisting of SEQ ID NOs: 28, 29, 30, 31, 32 and 33.

51. The oligonucleotide compositions of embodiments 49 or 50, further comprising at least one set of amplification primers, wherein one amplification primer is a forward amplification primer, and one amplification primer is a reverse amplification primer.

52. The oligonucleotide compositions of embodiment 51, wherein the target nucleic acid region is SEQ ID NO:39, and the forward and reverse amplification primers are each individually from about 20 to about 23 nucleotides in length, and wherein the forward and reverse amplification primers are configured to generating an amplicon about 89 to about 143 nucleotides in length from the target nucleic acid region of SEQ ID NO:39.

53. The oligonucleotide compositions of embodiment 52, wherein the target nucleic acid region is SEQ ID NO:39, and the forward amplification primer is selected from the group consisting of SEQ ID NOs: 23, 24, 25, 26 and 27.

54. The oligonucleotide compositions of embodiments 52 or 53, wherein the target nucleic acid region is SEQ ID NO:39, and the reverse amplification primer is selected from the group consisting of SEQ ID NOs: 34, 35, 36 and 37.

55. The oligonucleotide compositions of embodiment 51, wherein the target nucleic acid region is SEQ ID NO:39, and wherein the reverse amplification primer is selected from a group consisting of SEQ ID NOs: 34, 35, 36 and 37, and the forward amplification primer is from about 20 to about 23 nucleotides in length, and wherein the reverse and forward the amplification primers are configured to generate an amplicon about 89 to about 143 nucleotides in length from the target nucleic acid region of SEQ ID NO:39.

56. The oligonucleotide compositions of embodiments 53 or 55, wherein the forward amplification primer is configured to hybridize to an oligo hybridizing region within SEQ ID NO:39 or its complement, wherein the reverse amplification primer is configured to hybridize to an oligo hybridizing region within SEQ ID NO:39 or its complement, and wherein the distance between the oligo hybridizing region of the first amplification primer and the oligo hybridizing region of the second amplification region is of 89, 99, 109, 126 and 143 nucleotides in length along SEQ ID NO:39 when measured from the most distant nucleotides of the two oligo hybridizing regions.

57. The oligonucleotide compositions of any one of embodiments 51 to 56, wherein the target nucleic acid region is SEQ ID NO:39, and wherein the forward and the reverse amplification primers comprise target nucleic acid sequences corresponding to: (a) SEQ ID NO:23 and SEQ ID NO:34; (b) SEQ ID NO:24 and SEQ ID NO:34; (c) SEQ ID NO:25 and SEQ ID NO:35; (d) SEQ ID NO:26 and SEQ ID NO:36; or (e) SEQ ID NO:27 and SEQ ID NO:37.

58. The oligonucleotide compositions of embodiment 49, wherein if the detection probe comprises a target hybridizing sequence of: (a) SEQ ID NO:28, then the forward and reverse amplification primers respectfully comprise (I) SEQ ID NO:23 and SEQ ID NO:34 or (II) SEQ ID NO:24 and SEQ ID NO:34, (b) SEQ ID NO:29, then the forward and reverse amplification primers respectfully comprise SEQ ID NO:25 and SEQ ID NO:35, (c) SEQ ID NO:30, then the forward and reverse amplification primers respectfully comprise SEQ ID NO:25 and SEQ ID NO:35, (d) SEQ ID NO:31, then the forward and reverse amplification primers respectfully comprise SEQ ID NO:26 and SEQ ID NO:36, (e) SEQ ID NO:32, then the forward and reverse amplification primers respectfully comprise SEQ ID NO:27 and SEQ ID NO:37, (f) SEQ ID NO:33, then the forward and reverse amplification primers respectfully comprise SEQ ID NO:27 and SEQ ID NO:37.

59. The oligonucleotide compositions of any one of embodiments 37 or 38, wherein the detection probe further comprises at least one detectable label.

60. The oligonucleotide compositions of embodiment 59, wherein one or more of the detectable labels is selected from the group consisting of: (a) a chemiluminescent label; (b) a fluorescent label; (c) a quencher; or (d) a combination of two or more of (a), (b) and (c).

61. The oligonucleotide compositions of embodiment 60, wherein one or more detectable labels comprise the fluorescent label; or wherein one or more detectable labels comprise the quencher; or wherein one or more detectable labels comprise both the fluorescent label and the quencher.

62. The oligonucleotide compositions of any one of embodiments 37 to 61, wherein the detection probe is a TaqMan™ detection probe.

63. The oligonucleotide compositions of any one of embodiments 37 to 61, wherein the detection probe further comprises a non-target-hybridizing sequence; or wherein the detection probe comprising the non-target-hybridizing sequence is a hairpin detection probe; or wherein the hairpin detection probe is a molecular beacon or a molecular torch.

64. The oligonucleotide compositions of any one of embodiments 37 to 63, wherein the detection probe further comprises at least one modified nucleobase.

65. The oligonucleotide compositions of embodiment 64, wherein one or more of the modified nucleobases is selected from the group consisting of: (a) a 2'-O-methyl; (b) a 5-methylcytosine; (c) a 2'-fluorine; or (d) a combination of two or more of (a), (b) and (c).

66. The oligonucleotide compositions of embodiments 64 or 65, wherein the detection probe comprises from three to ten modified nucleobases; or wherein the detection probe comprises from three to ten 5-methylcytosine modified nucleobases; or wherein the detection probe comprises three 5-methylcytosine modified nucleobases; or wherein the detection probe comprises six 5-methylcytosine modified nucleobases; or wherein the detection probe comprises seven 5-methylcytosine modified nucleobases; or wherein the detection probe comprises ten 5-methylcytosine modified nucleobases; or wherein at least one modification is a 5-methylcytosine modified nucleobase; or wherein the detection probe comprises from three to ten 2'-O-methyl modified nucleobases; or wherein the detection probe comprises three 2'-O-methyl modified nucleobases; or, wherein the detection probe comprises six 2'-O-methyl modified nucleobases; or wherein the detection probe comprises seven 2'-O-methyl modified nucleobases; or wherein the detection probe comprises ten 2'-O-methyl modified nucleobases; or wherein at least one modification is a 2'-O-methyl modified nucleobase.

67. The oligonucleotide compositions of any one of embodiments 41 to 66, wherein the forward amplification primer further comprises at least one modified nucleobase.

68. The oligonucleotide compositions of embodiment 67, wherein one or more of the modified nucleobases is selected from the group consisting of: (a) a 2'-O-methyl; (b) a 5-methylcytosine; (c) a 2'-fluorine; or (d) a combination of two or more of (a), (b) and (c).

69. The oligonucleotide compositions of embodiments 67 or 68, wherein the forward amplification primer comprises from two to six modified nucleobases; or wherein the forward amplification primer comprises from two to six 5-methylcytosine modified nucleobases; or wherein the forward amplification primer comprises two 5-methylcytosine modified nucleobases; or wherein the forward amplification primer comprises three 5-methylcytosine modified nucleobases; or wherein the forward amplification primer comprises four 5-methylcytosine modified nucleobases; or wherein the forward amplification primer comprises six 5-methylcytosine modified nucleobases; or wherein at least one modification is a 5-methylcytosine modified nucleobase; or wherein the forward amplification primer comprises from two to six 2'-O-methyl modified nucleobases; or wherein the forward amplification primer comprises two 2'-O-methyl modified nucleobases; or wherein the forward amplification primer comprises three 2'-O-methyl modified nucleobases; or wherein the forward amplification primer comprises four 2'-O-methyl modified nucleobases; or wherein the forward amplification primer comprises six 2'-O-methyl modified nucleobases; or wherein at least one modification is a 2'-O-methyl modified nucleobase.

70. The oligonucleotide compositions of any one of embodiments 41 to 69, wherein the reverse amplification primer further comprises at least one modified nucleobase.

71. The oligonucleotide compositions of embodiment 70, wherein one or more of the modified nucleobases is selected from the group consisting of: (a) a 2'-O-methyl; (b) a 5-methylcytosine; (c) a 2'-fluorine; or (d) a combination of two or more of (a), (b) and (c).

72. The oligonucleotide compositions of embodiment 70 or 71, wherein the reverse amplification primer comprises from two to six modified nucleobases; or wherein the reverse amplification primer comprises from two to six 2'-fluorine modified nucleobases; or wherein the reverse amplification primer comprises two 2'-fluorine modified nucleobases; or wherein the reverse amplification primer comprises three 2'-fluorine modified nucleobases; or wherein the reverse amplification primer comprises four 2'-fluorine modified nucleobases; or wherein the reverse amplification primer comprises five 2'-fluorine modified nucleobases; or wherein the reverse amplification primer comprises six 2'-fluorine modified nucleobases; or wherein at least two modification is a 2'-fluorine modified nucleobases; or wherein the reverse amplification primer comprises from two to six 5-methylcytosine modified nucleobases; or wherein the reverse amplification primer comprises two 5-methylcytosine modified nucleobases; or wherein the reverse amplification primer comprises three 5-methylcytosine modified nucleobases; or wherein the reverse amplification primer comprises four 5-methylcytosine modified nucleobases; or wherein the reverse amplification primer comprises five 5-methylcytosine modified nucleobases; or wherein the reverse amplification primer comprises six 5-methylcytosine modified nucleobases; or wherein at least one modification is a 5-methylcytosine modified nucleobase.

73. A kit comprising compositions for detecting the presence of VZV in a sample, and amplifying, if present, a target nucleic acid sequence of VZV, wherein the kit generally comprises: one or more oligonucleotides for detecting the target nucleic acid sequence, or detecting an amplicon generated from the target nucleic acid sequence; and one or more oligonucleotides for amplifying the target nucleic acid sequence, or amplifying an amplicon generated from the target nucleic acid sequence.

74. The kit of embodiment 73 further comprising at least two amplification primers as in any one of embodiments 1 to 36, wherein a first amplification primer is a forward amplification primer and a second amplification primer is a reverse amplification primer.

75. The kit of embodiment 74, wherein the kit further comprises: various reagents for performing in vitro amplification and generation of an amplicon from a target nucleic acid sequence, if a VZV nucleic acid sequence is present in a sample; and guidance for determining whether a probe: target hybrid formed under hybridization conditions in the test sample using any of a variety of known techniques to amplify the target nucleic acid sequence.

76. The kit of embodiment 75, wherein the kit may include various reagents suitable for performing in vitro amplification such as: buffers; salts; various dNTPs; or enzymes.

77. The kit as in embodiment 76, wherein the kit may include various salts such as magnesium chloride, sodium chloride, potassium chloride, or sodium citrate.

78. The kit of embodiment 76, wherein the kit may include various dNTPs such as: deoxyadenosine triphosphate (dATP), deoxycytidine triphosphate (dCTP), deoxyguanosine triphosphate (dGTP), deoxythymidine triphosphate (dTTP); or adenosine triphosphate (ATP), cytidine triphosphate (CTP), guanosine triphosphate (GTP) and uridine triphosphate (UTP).

79. The kit of embodiment 76, wherein the kit may include various enzymes such as a thermostable DNA polymerase, a reverse transcriptase, or RNA polymerase.

80. The kit of embodiment 76, wherein the amplification primers may be aqueous, frozen, or lyophilized.

81. The kit of embodiment 76, wherein the various reagents, as described herein, may be packaged in a variety of different embodiments.

82. The kit of embodiment 74, wherein the amplification primers included in the kit may include a single set of forward and reverse amplification primers that produce a single amplicon of the target nucleic acid sequence; or wherein the kit may include multiple sets of amplification primers that produce multiple amplicons from various target nucleic acid sequences across various target nucleic acid regions; or wherein the kit may include multiple sets of amplification primers that produce multiple amplicons from various target nucleic acid sequences within a single target nucleic acid region.

83. The kit of embodiment 74, wherein the kit includes instructional guidance for amplifying a target nucleic acid sequence of a target region using conventional end-point PCR amplification to produce additional dsDNA molecules with the aid of DNA polymerase.

84. The kit of embodiment 83, wherein the kit includes various reagents suitable for performing conventional end-point PCR amplification methods; or wherein the kit includes various reagents suitable for performing real-time PCR amplification methods; or wherein the kit includes various reagents suitable for performing LCR amplification methods; or wherein the kit includes various reagents suitable for performing SDA amplification methods; or wherein the kit includes various reagents suitable for performing TMA amplification methods; or wherein the kit includes various reagents suitable for performing NASBA amplification methods.

85. The kit of embodiment 73 further comprising at least one oligonucleotide as in any of embodiments 37 to 72 for detecting the target nucleic acid sequence, or detecting the amplicon generated from the target nucleic acid sequence within the target nucleic acid region.

86. The kit of embodiment 85, wherein the kit further comprises: various reagents for performing in vitro detection of the target nucleic acid sequence, or detection of the amplicon generated from the target nucleic acid sequence, if a VZV nucleic acid sequence is present in a sample; and guidance for determining whether a probe:target hybrid formed under hybridization conditions in the test sample using any of a variety of known techniques to amplify the target nucleic acid sequence.

87. The kit of embodiment 86, wherein the kit may include various reagents suitable for performing in vitro amplification such as: buffers; salts; various dNTPs; or enzymes.

88. The kit of embodiment 87, wherein the kit may include various salts such as magnesium chloride, sodium chloride, potassium chloride, or sodium citrate.

89. The kit of embodiment 87, wherein the kit may include various dNTPs such as: deoxyadenosine triphosphate (dATP), deoxycytidine triphosphate (dCTP), deoxyguanosine triphosphate (dGTP), deoxythymidine triphosphate (dTTP); or adenosine triphosphate (ATP), cytidine triphosphate (CTP), guanosine triphosphate (GTP) and uridine triphosphate (UTP).

90. The kit of embodiment 87, wherein the kit may include various enzymes such as a thermostable DNA polymerase, a reverse transcriptase, or RNA polymerase.

91. The kit of embodiment 87, wherein the detection probes may be aqueous, frozen, or lyophilized.

92. The kit of embodiment 87, wherein the various reagents, as described herein, may be packaged in a variety of different embodiments.

93. The kit of embodiment 87, wherein the oligonucleotides included in the kit are intended to be paired to various amplification oligonucleotides depending on specific requirements of the end-user's laboratory developed tests.

94. The kit of embodiment 86, wherein the kit includes various reagents suitable for performing real-time PCR.

95. The kit of embodiment 94, wherein the kit includes instructions for detecting a target nucleic acid sequence with one or more detection probes using real-time PCR, and wherein the detection probe hybridizes to the amplification product and produces a signal.

96. The kit of embodiment 94, wherein the kit includes instructions for detecting a target nucleic acid sequence with one or more detection probes using real-time PCR, and wherein the detection probe is labeled with a detectable label.

97. The kit of embodiment 94, wherein the kit includes instructions for detecting a target nucleic acid sequence with one or more detection probes using real-time PCR, and wherein the detection probe may be unlabeled and detected indirectly by binding to another binding partner to a moiety on the probe.

98. The kit of embodiment 96, wherein the kit includes instructions for detecting a target nucleic acid sequence with one or more detection probes using real-time PCR, and wherein the detection probe is labeled with a detectable label, and wherein the labeled probe comprises a second moiety, such as a quencher.

99. The kit of embodiment 86, wherein the kit includes instructions for detecting a target nucleic acid sequence with one or more detection probes using conventional end-point PCR, and wherein the detection probe hybridizes to the amplification product and produces a signal.

100. The kit of embodiment 99, wherein end-point detection is accomplished using agarose gel electrophoresis.

101. The kit of embodiment 73, wherein the kit may optionally include a non-VZV internal control nucleic acid that is amplified and detected in the same assay reaction mixtures by using amplification and detection probes specific for the IC sequence.

102. The kit of embodiment 73, wherein the kit may include additional guidance pertaining to sample preparation prior to amplification or, such as: the use of a capture oligomer to hybridize to the target nucleic acid sequence; and routine methods for washing any non-target material found on the probe:target duplex.

103. The kit of embodiment 102, wherein additional instruction regarding routine methods of target capture may include guidance for lysing samples to release intracellular contents including the target nucleic acid sequences of the VZV nucleic acid sequence, if present, in a sample.

104. The kit of embodiment 103, wherein additional instruction regarding routine methods of target capture may include guidance for specific or non-specific target capture of the target nucleic acid sequence found in the sample.

105. The kit of embodiment 104, wherein guidance may recommend a nonspecific capture probe to preferentially hybridize to the target nucleic acid sequence, or the complement thereof, under stringent hybridization conditions forms a probe:target duplex thereby enabling detection.

106. The kit as in any one of embodiments 102 to 105, wherein guidance may prefer nonspecific capture probes for substantially aqueous mixtures.

107. The kit as in any one of embodiments 102 to 106, wherein guidance may recommend washing the probe:target duplex to remove all non-target nucleic acid components that may have bound to the nonspecific capture probe.

108. The kit of embodiment 107, wherein guidance may recommend washing the probe:target duplex multiple times.

109. The kit as in any one of embodiments 102 to 108, wherein guidance may recommend other means of physically separating the target nucleic acid sequences from a sample.

110. The kit of embodiment 109, wherein paramagnetic beads may be used to retrieve a bound target nucleic acid sequence.

111. A method for amplifying or detecting a target nucleic acid sequence of VZV, wherein the method generally comprises: using one or more oligonucleotides for detecting the target nucleic acid sequence, or detecting an amplicon generated from the target nucleic acid sequence; and using one or more oligonucleotides for amplifying the target nucleic acid sequence, or amplifying an amplicon generated from the target nucleic acid sequence.

112. The method of embodiment 111 for amplifying the target nucleic acid sequence, or amplifying the amplicon generated from the target nucleic acid sequence, comprising the steps of: obtaining a sample; contacting the sample with at least two amplification primers, wherein a first amplification primer is a forward amplification primer and a second amplification primer is a reverse amplification primer; providing conditions for generating the amplicon from the target nucleic acid sequence; and determining whether VZV is present in the sample.

113. The method of embodiment 112, wherein the target nucleic acid region is SEQ ID NO:38 or SEQ ID NO:39.

114. The method of embodiments 112 or 113, wherein the target nucleic acid region is SEQ ID NO:38, and wherein the forward and the reverse amplification primers are each independently from about 19 to about 23 nucleotides in length, and wherein the forward and reverse amplification primers are configured to generating an amplicon about 89 to about 127 nucleotides in length from the target nucleic acid region of SEQ ID NO:38.

115. The method of any one of embodiments 112 to 114, wherein the target nucleic acid region is SEQ ID NO:38, and the forward amplification primer is selected from a group consisting of SEQ ID NOs: 1, 2, 3, 4, 5, 6 and 7, and the reverse amplification primer is from about 19 to about 23 nucleotides in length, and wherein the two amplification primers are configured to generate an amplicon about 89 to about 127 nucleotides in length from the target nucleic acid region of SEQ ID NO:38.

116. The method of any one of embodiments 112 to 115, wherein the target nucleic acid region is SEQ ID NO:38, and the reverse amplification primer is selected from the group consisting of SEQ ID NOs: 16, 17, 18, 19, 20, 21 and 22.

117. The method of any one of embodiments 112 to 114, wherein the target nucleic acid region is SEQ ID NO:38, and wherein the reverse amplification primer is selected from a group consisting of SEQ ID NOs: 16, 17, 18, 19, 20, 21 and 22, and the forward amplification primer is from about 20 to about 23 nucleotides in length, and wherein the reverse and forward the amplification primers are configured to generate an amplicon about 89 to about 127 nucleotides in length from the target nucleic acid region of SEQ ID NO:38.

118. The method of any one of embodiments 115 to 117, wherein the forward amplification primer is configured to hybridize to an oligo hybridizing region within SEQ ID NO:38 or its complement, wherein the reverse amplification primer is configured to hybridize to an oligo hybridizing region within SEQ ID NO:38 or its complement, and wherein the distance between the oligo hybridizing region of the first amplification primer and the oligo hybridizing region of the second amplification region is 89, 93, 100, 102, 119, 123 or 127 nucleotides in length along SEQ ID NO:38 when measured from the most distant nucleotides of the two oligo hybridizing regions.

119. The method of any one of embodiments 112 to 118, wherein the target nucleic acid region is SEQ ID NO:38, and wherein the forward and the reverse amplification primers comprise target nucleic acid sequences corresponding to: (a) SEQ ID NO:1 and SEQ ID NO:16; (b) SEQ ID NO:1 and SEQ ID NO:17; (c) SEQ ID NO:2 and SEQ ID NO:17; (d) SEQ ID NO:3 and SEQ ID NO:18; (e) SEQ ID NO:4 and SEQ ID NO:19; (f) SEQ ID NO:5 and SEQ ID NO:20; (g) SEQ ID NO:6 and SEQ ID NO:21; or (h) SEQ ID NO:7 and SEQ ID NO:22.

120. The method of embodiments 112 or 113, wherein the target nucleic acid region is SEQ ID NO:39, and wherein the forward and reverse amplification primer are each independently from about 20 to about 23 nucleotides in length, and wherein the forward and reverse amplification primers are configured to generating an amplicon about 89 to about 143 nucleotides in length from the target nucleic acid region of SEQ ID NO:39.

121. The method of embodiments 112 or 113 or 120, wherein the target nucleic acid region is SEQ ID NO:39, and the forward amplification primer is selected from a group consisting of SEQ ID NOs: 23, 24, 25, 26 and 27, and the reverse amplification primer is from about 20 to about 22 nucleotides in length, and wherein the two amplification primers are configured to generate an amplicon about 89 to about 143 nucleotides in length from the target nucleic acid region of SEQ ID NO:39.

122. The method of embodiment 121, wherein the target nucleic acid region is SEQ ID NO:39, and the reverse amplification primer is selected from the group consisting of SEQ ID NOs: 34, 35, 36 and 37.

123. The method of embodiments 112 or 113 or 120, wherein the target nucleic acid region is SEQ ID NO:39, and wherein the reverse amplification primer is selected from a group consisting of SEQ ID NOs: 34, 35, 36 and 37, and the forward amplification primer is from about 20 to about 23 nucleotides in length, and wherein the reverse and forward the amplification primers are configured to generate an amplicon about 89 to about 143 nucleotides in length from the target nucleic acid region of SEQ ID NO:39.

124. The method of embodiments 121 or 123, wherein the forward amplification primer is configured to hybridize to an oligo hybridizing region within SEQ ID NO:39 or its complement, wherein the reverse amplification primer is configured to hybridize to an oligo hybridizing region within SEQ ID NO:39 or its complement, and wherein the distance between the oligo hybridizing region of the first amplification primer and the oligo hybridizing region of the second amplification region is of 89, 99, 109, 126 and 143 nucleotides in length along SEQ ID NO:39 when measured from the most distant nucleotides of the two oligo hybridizing regions.

125. The method of embodiments 112 or 113 or any one of embodiments 120 to 124, wherein the target nucleic acid region is SEQ ID NO:39, and wherein the forward and the reverse amplification primers comprise target nucleic acid sequences corresponding to: (a) SEQ ID NO:23 and SEQ ID NO:34; (b) SEQ ID NO:24 and SEQ ID NO:34; (c) SEQ ID NO:25 and SEQ ID NO:35; (d) SEQ ID NO:26 and SEQ ID NO:36; or (e) SEQ ID NO:27 and SEQ ID NO:37.

126. The method of any one of embodiments 112 to 125, further comprising a third oligonucleotide.

127. The method of embodiment 126, wherein the third oligonucleotide is a detection probe.

128. The method of any one of embodiments 113 to 119, wherein the target nucleic acid region is SEQ ID NO:38, and wherein the detection probe is from about 23 to about 27 nucleotides in length.

129. The method of embodiment 128, wherein the target nucleic acid region is SEQ ID NO:38, and wherein the detection probe is selected from a group consisting of SEQ ID NOs: 8, 9, 10, 11, 12, 13, 14 and 15.

130. The method of embodiment 128, wherein if the detection probe comprises a target hybridizing sequence of: (a) SEQ ID NO:8, then the forward and reverse amplification primers respectfully comprise (I) SEQ ID NO:1 and SEQ ID NO:16 or (II) SEQ ID NO:1 and SEQ ID NO:17; (b) SEQ ID NO:9, then the forward and reverse amplification primers respectfully comprise (I) SEQ ID NO:1 and SEQ ID NO:16 or (II) SEQ ID NO:1 and SEQ ID NO:17 or (III) SEQ ID NO:2 and SEQ ID NO:17; (c) SEQ ID NO:10, then the forward and reverse amplification primers respectfully comprise SEQ ID NO:3 and SEQ ID NO:18; (d) SEQ ID NO:11, then the forward and reverse amplification primers respectfully comprise SEQ ID NO:4 and SEQ ID NO:19; (e) SEQ ID NO:12, then the forward and reverse amplification primers respectfully comprise SEQ ID NO:4 and SEQ ID NO:19; (f) SEQ ID NO:13, then the forward and reverse amplification primers respectfully comprise SEQ ID NO:5 and SEQ ID NO:20; (g) SEQ ID NO:14, then the forward and reverse amplification primers respectfully comprise SEQ ID NO:6 and SEQ ID NO:21; or (h) SEQ ID NO:15, then the forward and reverse amplification primers respectfully comprise SEQ ID NO:7 and SEQ ID NO:22.

131. The method of embodiment 113 or any one of embodiments 120 to 125, wherein the target nucleic acid region is SEQ ID NO:39, and wherein the detection probe is from about 22 to about 27 nucleotides in length.

132. The method of embodiment 131, wherein the target nucleic acid region is SEQ ID NO:39, and wherein the detection probe is selected from a group consisting of SEQ ID NOs: 28, 29, 30, 31, 32 and 33.

133. The method of embodiment 131, wherein if the detection probe comprises a target hybridizing sequence of: (a) SEQ ID NO:28, then if the forward and reverse amplification primers respectfully comprise (I) SEQ ID NO:23 and SEQ ID NO:34 or (II) SEQ ID NO:24 and SEQ ID NO:34; (b) SEQ ID NO:29, then the forward and reverse amplification primers respectfully comprise SEQ ID NO:25 and SEQ ID NO:35; (c) SEQ ID NO:30, then the forward and reverse amplification primers respectfully comprise SEQ ID NO:25 and SEQ ID NO:35; (d) SEQ ID NO:31, then the forward and reverse amplification primers respectfully comprise SEQ ID NO:26 and SEQ ID NO:36; (e) SEQ ID NO:32, then the forward and reverse amplification primers respectfully comprise SEQ ID NO:27 and SEQ ID NO:37; or (f) SEQ ID NO:33, then the forward and reverse amplification primers respectfully comprise SEQ ID NO:27 and SEQ ID NO:37.

134. The method of any one of embodiments 126 to 133, wherein the detection probe further comprises at least one detectable label.

135. The method of embodiment 134, wherein one or more of the detectable labels is selected from the group consisting of: (a) a chemiluminescent label; (b) a fluorescent label; (c) a quencher; or (d) a combination of two or more of (a), (b) and (c).

136. The method of embodiment 135, wherein one or more detectable labels comprise the fluorescent label; or wherein one or more detectable labels comprise the quencher; or wherein one or more detectable labels comprise both the fluorescent label and the quencher.

137. The method of any one of embodiments 126 to 136, wherein the detection probe is a TaqMan™ detection probe.

138. The method of any one of embodiments 126 to 136, wherein the detection probe further comprises a non-target-hybridizing sequence; or wherein the detection probe comprising the non-target-hybridizing sequence is a hairpin detection probe; or wherein the hairpin detection probe is a molecular beacon or a molecular torch.

139. The method of any one of embodiments 126 to 138, wherein the detection probe further comprises at least one modified nucleobase.

140. The method of embodiment 139, wherein one or more of the modified nucleobases is selected from the group consisting of: (a) a 2'-O-methyl; (b) a 5-methylcytosine; (c) a 2'-fluorine; or (d) a combination of two or more of (a), (b) and (c).

141. The method of embodiments 139 or 140, wherein the detection probe comprises from three to ten modified nucleobases; or wherein the detection probe comprises from three to ten 5-methylcytosine modified nucleobases; or wherein the detection probe comprises three 5-methylcytosine modified nucleobases; or wherein the detection probe comprises six 5-methylcytosine modified nucleobases; or wherein the detection probe comprises seven 5-methylcytosine modified nucleobases; or wherein the detection probe comprises ten 5-methylcytosine modified nucleobases; or wherein at least one modification is a 5-methylcytosine modified nucleobase; or wherein the detection probe comprises from three to ten 2'-O-methyl modified nucleobases; or wherein the detection probe comprises three 2'-O-methyl modified nucleobases; or, wherein the detection probe comprises six 2'-O-methyl modified nucleobases; or wherein the detection probe comprises seven 2'-O-methyl modified nucleobases; or wherein the detection probe comprises ten 2'-O-methyl modified nucleobases; or wherein at least one modification is a 2'-O-methyl modified nucleobase.

142. The method of any one of embodiments 112 to 141, wherein the forward amplification primer further comprises at least one modified nucleobase.

143. The method of embodiment 142, wherein one or more of the modified nucleobases is selected from the group consisting of: (a) a 2'-O-methyl; (b) a 5-methylcytosine; (c) a 2'-fluorine; or (d) a combination of two or more of (a), (b) and (c).

144. The method of embodiments 142 or 143, wherein the forward amplification primer comprises from one to six modified nucleobases; or wherein the forward amplification primer comprises from one to six 5-methylcytosine modified nucleobases; or wherein the forward amplification primer comprises one 5-methylcytosine modified nucleobase; or wherein the forward amplification primer comprises two 5-methylcytosine modified nucleobases; or wherein the forward amplification primer comprises three 5-methylcytosine modified nucleobases; or wherein the forward amplification primer comprises four 5-methylcytosine modified nucleobases; or wherein the forward amplification primer comprises five 5-methylcytosine modified nucleobases; or wherein the forward amplification primer comprises six 5-methylcytosine modified nucleobases; or wherein at least one modification is a 5-methylcytosine modified nucleobase; or wherein the forward amplification primer comprises from one to six 2'-O-methyl modified nucleobases; or wherein the forward amplification primer comprises one 2'-O-methyl modified nucleobase; or wherein the forward amplification primer comprises two 2'-O-methyl modified nucleobases; or wherein the forward amplification primer comprises three 2'-O-methyl modified nucleobases; or wherein the forward amplification primer comprises four 2'-O-methyl modified nucleobases; or wherein the forward amplification primer comprises five 2'-O-methyl modified nucleobases; or wherein the forward amplification primer comprises six 2'-O-methyl modified nucleobases; or wherein at least one modification is a 2'-O-methyl modified nucleobase.

145. The method of any one of embodiments 112 to 144, wherein the reverse amplification primer further comprises at least one modified nucleobase.

146. The method of embodiment 145, wherein one or more of the modified nucleobases is selected from the group consisting of: (a) a 2'-O-methyl; (b) a 5'-methylcytosine; (c) a 2'-fluorine; or (d) a combination of two or more of (a), (b) and (c).

147. The method of embodiments 145 or 146, wherein the reverse amplification primer comprises from two to six modified nucleobases; or wherein the reverse amplification primer comprises from two to six 2'-fluorine modified nucleobases; or wherein the reverse amplification primer comprises two 2'-fluorine modified nucleobases; or wherein the reverse amplification primer comprises three 2'-fluorine modified nucleobases; or wherein the reverse amplification primer comprises four 2'-fluorine modified nucleobases; or wherein the reverse amplification primer comprises five 2'-fluorine modified nucleobases; or wherein the reverse amplification primer comprises six 2'-fluorine modified nucleobases; or wherein at least two modification is a 2'-fluorine modified nucleobases; or wherein the reverse amplification primer comprises from two to six 5-methylcytosine modified nucleobases; or wherein the reverse amplification primer comprises two 5-methylcytosine modified nucleobases; or wherein the reverse amplification primer comprises three 5-methylcytosine modified nucleobases; or wherein the reverse amplification primer comprises four 5-methylcytosine modified nucleobases; or wherein the reverse amplification primer comprises five 5-methylcytosine modified nucleobases; or wherein the reverse amplification primer comprises six 5-methylcytosine modified nucleobases; or wherein at least one modification is a 5-methylcytosine modified nucleobase.

148. The method of embodiment 111 for the detection the target nucleic acid, or detecting an amplicon generated from the target nucleic acid sequence, comprising the steps of: obtaining a sample; contacting the sample with at least one oligonucleotide for detecting the target nucleic acid sequence; providing conditions for detecting the presence of the target nucleic acid sequence; and determining whether VZV is present in the sample.

149. The method of embodiment 148, wherein the target nucleic acid region is SEQ ID NO:38 or SEQ ID NO:39.

150. The method of embodiment 149, wherein the target nucleic acid region is SEQ ID NO:38, and wherein the detection probe is from about 23 to about 27 nucleotides in length.

151. The method of embodiment 150, wherein the target nucleic acid region is SEQ ID NO:38, and wherein the detection probe is selected from a group consisting of SEQ ID NOs: 8, 9, 10, 11, 12, 13, 14 and 15.

152. The method of embodiments 150 or 151, further comprising at least one set of amplification primers, wherein one amplification primer is a forward amplification primer, and one amplification primer is a reverse amplification primer.

153. The method of embodiment 152, wherein the target nucleic acid region is SEQ ID NO:38, and the forward and reverse amplification primers are each individually from about 19 to about 23 nucleotides in length, and wherein the forward and reverse amplification primers are configured to generating an amplicon about 89 to about 127 nucleotides in length from the target nucleic acid region of SEQ ID NO:38.

154. The method of embodiment 153, wherein the target nucleic acid region is SEQ ID NO:38, and the forward amplification primer is selected from the group consisting of SEQ ID NOs: 1, 2, 3, 4, 5, 6 and 7.

155. The method of embodiments 153 or 154, wherein the target nucleic acid region is SEQ ID NO:38, and the reverse amplification primer is selected from the group consisting of SEQ ID NOs: 16, 17, 18, 19, 20, 21 and 22.

156. The method of embodiment 155, wherein the target nucleic acid region is SEQ ID NO:38, and wherein the reverse amplification primer is selected from a group consisting of SEQ ID NOs: 16, 17, 18, 19, 20, 21 and 22, and the forward amplification primer is from about 20 to about 23 nucleotides in length, and wherein the reverse and forward the amplification primers are configured to generate an amplicon about 89 to about 127 nucleotides in length from the target nucleic acid region of SEQ ID NO:38.

157. The method of embodiments 154 or 156, wherein the forward amplification primer is configured to hybridize to an oligo hybridizing region within SEQ ID NO:38 or its complement, wherein the reverse amplification primer is configured to hybridize to an oligo hybridizing region within SEQ ID NO:38 or its complement, and wherein the distance between the oligo hybridizing region of the first amplification primer and the oligo hybridizing region of the second amplification region is 89, 93, 100, 102, 119, 123 or 127 nucleotides in length along SEQ ID NO:38 when measured from the most distant nucleotides of the two oligo hybridizing regions.

158. The method of any one of embodiments 152 to 157, wherein the target nucleic acid region is SEQ ID NO:38, and wherein the forward and the reverse amplification primers comprise target nucleic acid sequences corresponding to: (a) SEQ ID NO:1 and SEQ ID NO:16; (b) SEQ ID NO:1 and SEQ ID NO:17; (c) SEQ ID NO:2 and SEQ ID NO:17; (d) SEQ ID NO:3 and SEQ ID NO:18; (e) SEQ ID NO:4 and SEQ ID NO:19; (f) SEQ ID NO:5 and SEQ ID NO:20; (g) SEQ ID NO:6 and SEQ ID NO:21; or (h) SEQ ID NO:7 and SEQ ID NO:22.

159. The method of embodiment 150, wherein if the detection probe comprises a target hybridizing sequence of: (a) SEQ ID NO:8, then the forward and reverse amplification primers respectfully comprise (I) SEQ ID NO:1 and SEQ ID NO:16 or (II) SEQ ID NO:1 and SEQ ID NO:17; (b) SEQ ID NO:9, then the forward and reverse amplification primers respectfully comprise (I) SEQ ID NO:1 and SEQ ID NO:16 or (II) SEQ ID NO:1 and SEQ ID NO:17 or (III) SEQ ID NO:2 and SEQ ID NO:17; (c) SEQ ID NO:10, then the forward and reverse amplification primers respectfully comprise SEQ ID NO:3 and SEQ ID NO:18; (d) SEQ ID NO:11, then the forward and reverse amplification primers respectfully comprise SEQ ID NO:4 and SEQ ID NO:19; (e) SEQ ID NO:12, then the forward and reverse amplification primers respectfully comprise SEQ ID NO:4 and SEQ ID NO:19; (f) SEQ ID NO:13, then the forward and reverse amplification primers respectfully comprise SEQ ID NO:5 and SEQ ID NO:20; (g) SEQ ID NO:14, then the forward and reverse amplification primers respectfully comprise SEQ ID NO:6 and SEQ ID NO:21; (h) SEQ ID NO:15, then the forward and reverse amplification primers respectfully comprise SEQ ID NO:7 and SEQ ID NO:22.

160. The method of embodiment 149, wherein the target nucleic acid region is SEQ ID NO:39, and wherein the detection probe is from about 22 to about 27 nucleotides in length.

161. The method of embodiments 160 or 161, wherein the target nucleic acid region is SEQ ID NO:39, and wherein the detection probe is selected from a group consisting of SEQ ID NOs: 28, 29, 30, 31, 32 and 33.

162. The method of embodiment 161, further comprising at least one set of amplification primers, wherein one amplification primer is a forward amplification primer, and one amplification primer is a reverse amplification primer.

163. The method of embodiment 162, wherein the target nucleic acid region is SEQ ID NO:39, and the forward and reverse amplification primers are each individually from about 20 to about 23 nucleotides in length, and wherein the forward and reverse amplification primers are configured to generating an amplicon about 89 to about 143 nucleotides in length from the target nucleic acid region of SEQ ID NO:39.

164. The method of embodiment 163, wherein the target nucleic acid region is SEQ ID NO:39, and the forward amplification primer is selected from the group consisting of SEQ ID NOs: 23, 24, 25, 26 and 27.

165. The method of embodiments 163 or 164, wherein the target nucleic acid region is SEQ ID NO:39, and the reverse amplification primer is selected from the group consisting of SEQ ID NOs: 34, 35, 36 and 37.

166. The method of embodiment 162, wherein the target nucleic acid region is SEQ ID NO:39, and wherein the reverse amplification primer is selected from a group consisting of SEQ ID NOs: 34, 35, 36 and 37, and the forward amplification primer is from about 20 to about 23 nucleotides in length, and wherein the reverse and forward the amplification primers are configured to generate an amplicon about 89 to about 143 nucleotides in length from the target nucleic acid region of SEQ ID NO:39.

167. The method of embodiments 164 or 166, wherein the forward amplification primer is configured to hybridize to an oligo hybridizing region within SEQ ID NO:39 or its complement, wherein the reverse amplification primer is configured to hybridize to an oligo hybridizing region within SEQ ID NO:39 or its complement, and wherein the distance between the oligo hybridizing region of the first amplification primer and the oligo hybridizing region of the second amplification region is of 89, 99, 109, 126 and 143 nucleotides in length along SEQ ID NO:39 when measured from the most distant nucleotides of the two oligo hybridizing regions.

168. The method of any one of embodiments 162 to 167, wherein the target nucleic acid region is SEQ ID NO:39, and wherein the forward and the reverse amplification primers comprise target nucleic acid sequences corresponding to: (a) SEQ ID NO:23 and SEQ ID NO:34; (b) SEQ ID NO:24 and SEQ ID NO:34; (c) SEQ ID NO:25 and SEQ ID NO:35; (d) SEQ ID NO:26 and SEQ ID NO:36; or (e) SEQ ID NO:27 and SEQ ID NO:37.

169. The method of embodiment 160, wherein if the detection probe comprises a target hybridizing sequence of: (a) SEQ ID NO:28, then the forward and reverse amplification primers respectfully comprise (I) SEQ ID NO:23 and SEQ ID NO:34 or (II) SEQ ID NO:24 and SEQ ID NO:34, (b) SEQ ID NO:29, then the forward and reverse amplification primers respectfully comprise SEQ ID NO:25 and SEQ ID NO:35, (c) SEQ ID NO:30, then the forward and reverse amplification primers respectfully comprise SEQ ID NO:25 and SEQ ID NO:35, (d) SEQ ID NO:31, then the forward and reverse amplification primers respectfully comprise SEQ ID NO:26 and SEQ ID NO:36, (e) SEQ ID NO:32, then the forward and reverse amplification primers respectfully comprise SEQ ID NO:27 and SEQ ID NO:37, (f) SEQ ID NO:33, then the forward and reverse amplification primers respectfully comprise SEQ ID NO:27 and SEQ ID NO:37.

170. The method of embodiments 148 or 149, wherein the detection probe further comprises at least one detectable label.

171. The method of embodiment 170, wherein one or more of the detectable labels is selected from the group consisting of: (a) a chemiluminescent label; (b) a fluorescent label; (c) a quencher; or (d) a combination of two or more of (a), (b) and (c).

172. The method of embodiment 171, wherein one or more detectable labels comprise the fluorescent label; or wherein one or more detectable labels comprise the quencher; or wherein one or more detectable labels comprise both the fluorescent label and the quencher.

173. The method of any one of embodiments 148 to 172, wherein the detection probe is a TaqMan™ detection probe.

174. The method of any one of embodiments 148 to 172, wherein the detection probe further comprises a non-target-hybridizing sequence; or wherein the detection probe comprising the non-target-hybridizing sequence is a hairpin detection probe; or wherein the hairpin detection probe is a molecular beacon or a molecular torch.

175. The method of any one of embodiments 148 to 174 wherein the detection probe further comprises at least one modified nucleobase.

176. The method of embodiment 175, wherein one or more of the modified nucleobases is selected from the group consisting of: (a) a 2'-O-methyl; (b) a 5-methylcytosine; (c) a 2'-fluorine; or (d) a combination of two or more of (a), (b) and (c).

177. The method of embodiments 175 or 176, wherein the detection probe comprises from three to ten modified nucleobases; or wherein the detection probe comprises from three to ten 5-methylcytosine modified nucleobases; or wherein the detection probe comprises three 5-methylcytosine modified nucleobases; or wherein the detection probe comprises six 5-methylcytosine modified nucleobases; or wherein the detection probe comprises seven 5-methylcytosine modified nucleobases; or wherein the detection probe comprises ten 5-methylcytosine modified nucleobases; or wherein at least one modification is a 5-methylcytosine modified nucleobase; or wherein the detection probe comprises from three to ten 2'-O-methyl modified nucleobases; or wherein the detection probe comprises three 2'-O-methyl modified nucleobases; or, wherein the detection probe comprises six 2'-O-methyl modified nucleobases; or wherein the detection probe comprises seven 2'-O-methyl modified nucleobases; or wherein the detection probe comprises ten 2'-O-methyl modified nucleobases; or wherein at least one modification is a 2'-O-methyl modified nucleobase.

178. The method of any one of embodiments 152 to 177, wherein the forward amplification primer further comprises at least one modified nucleobase.

179. The method of embodiment 178, wherein one or more of the modified nucleobases is selected from the group consisting of: (a) a 2'-O-methyl; (b) a 5-methylcytosine; (c) a 2'-fluorine; or (d) a combination of two or more of (a), (b) and (c).

180. The method of embodiment 178 or 179, wherein the forward amplification primer comprises from two to six modified nucleobases; or wherein the forward amplification primer comprises from two to six 5-methylcytosine modified nucleobases; or wherein the forward amplification primer comprises two 5-methylcytosine modified nucleobases; or wherein the forward amplification primer comprises three 5-methylcytosine modified nucleobases; or wherein the forward amplification primer comprises four 5-methylcytosine modified nucleobases; or wherein the forward amplification primer comprises six 5-methylcytosine modified nucleobases; or wherein at least one modification is a 5-methylcytosine modified nucleobase; or wherein the forward amplification primer comprises from two to six 2'-O-methyl modified nucleobases; or wherein the forward amplification primer comprises two 2'-O-methyl modified nucleobases; or wherein the forward amplification primer comprises three 2'-O-methyl modified nucleobases; or wherein the forward amplification primer comprises four 2'-O-methyl modified nucleobases; or wherein the forward amplification primer comprises six 2'-O-methyl modified nucleobases; or wherein at least one modification is a 2'-O-methyl modified nucleobase.

181. The method of any one of embodiments 152 to 180, wherein the reverse amplification primer further comprises at least one modified nucleobase.

182. The method of embodiment 181, wherein one or more of the modified nucleobases is selected from the group consisting of: (a) a 2'-O-methyl; (b) a 5-methylcytosine; (c) a 2'-fluorine; or (d) a combination of two or more of (a), (b) and (c).

183. The method of embodiments 181 or 182, wherein the reverse amplification primer comprises from one to six modified nucleobases; or wherein the reverse amplification primer comprises from one to six 2'-fluorine modified nucleobases; or wherein the reverse amplification primer comprises one 2'-fluorine modified nucleobases; or wherein the reverse amplification primer comprises two 2'-fluorine modified nucleobases; or wherein the reverse amplification primer comprises three 2'-fluorine modified nucleobases; or wherein the reverse amplification primer comprises four 2'-fluorine modified nucleobases; or wherein the reverse amplification primer comprises five 2'-fluorine modified nucleobases; or wherein the reverse amplification primer comprises six 2'-fluorine modified nucleobases; or wherein at least one modification is a 2'-fluorine modified nucleobases; or wherein the reverse amplification primer comprises from one to six 5-methylcytosine modified nucleobases; or wherein the reverse amplification primer comprises one 5-methylcytosine modified nucleobases; or wherein the reverse amplification primer comprises two 5-methylcytosine modified nucleobases; or wherein the reverse amplification primer comprises three 5-methylcytosine modified nucleobases; or wherein the reverse amplification primer comprises four 5-methylcytosine modified nucleobases; or wherein the reverse amplification primer comprises five 5-methylcytosine modified nucleobases; or wherein the reverse amplification primer comprises six 5-methylcytosine modified nucleobases; or wherein at least one modification is a 5-methylcytosine modified nucleobase.

184. A formulation for amplifying a target nucleic acid sequence of VZV, wherein the formulation generally comprises: one or more oligonucleotides for detecting the target nucleic acid sequence, or detecting an amplicon generated from the target nucleic acid sequence; or one or more oligonucleotides for amplifying the target nucleic acid sequence, or amplifying an amplicon generated from the target nucleic acid sequence.

185. The formulation of embodiment 184, wherein the amplification primer formulation and detection probe formulation are two separate products.

186. The formulation of embodiment 184 further comprising at least two amplification primers as in any one of embodiments 1 to 36, wherein a first amplification primer is a forward amplification primer and a second amplification primer is a reverse amplification primer.

187. The formulation of embodiment 186, wherein the amplification primers included in the kit may include a single set of forward and reverse amplification primers that produce a single amplicon of the target nucleic acid sequence; or wherein the kit may include multiple sets of amplification primers that produce multiple amplicons from various target nucleic acid sequences across various target nucleic acid regions; or wherein the kit may include multiple sets of amplification primers that produce multiple amplicons from various target nucleic acid sequences within a single target nucleic acid region.

188. The formulation of embodiment 184, wherein the formulation may also contain additional reagents for determining the presence of a VZV nucleic acid sequence in a sample.

189. The formulation of embodiment 188 further comprising at least one oligonucleotide as in any of embodiments 37 to 72 for detecting the target nucleic acid sequence, or detecting the amplicon generated from the target nucleic acid sequence within the target nucleic acid region.

190. The formulation of any one of embodiments 184 or 189, wherein the formulation may also contain additional reagents for amplifying, if present, a target nucleic acid sequence of the VZV nucleic acid sequence in a sample.

191. The formulation of embodiment 184, wherein the formulation may include reagents suitable for performing in vitro amplification such as: various dNTPs; enzymes; buffers; or salts.

192. The formulation of embodiment 191, wherein the formulation may include various individual nucleotide subunits of DNA such as: deoxyadenosine triphosphate (dATP), deoxycytidine triphosphate (dCTP), deoxyguanosine triphosphate (dGTP), deoxythymidine triphosphate (dTTP); or adenosine triphosphate (ATP), cytidine triphosphate (CTP), guanosine triphosphate (GTP) and uridine triphosphate (UTP).

193. The formulation of embodiment 191, wherein the formulation may include a DNA polymerase enzyme; or wherein the formulation may include a reverse transcriptase enzyme; or wherein the formulation may include an organic buffer; or wherein the formulation may include surfactants; or wherein the formulation may include inorganic salts.

194. The formulation of embodiment 191, wherein the formulation may include inorganic salts selected from the group comprising: magnesium chloride; sodium chloride; potassium chloride; and sodium citrate.

195. The formulation of embodiment 191, wherein an aqueous formulation may be dropped into liquid nitrogen and lyophilized according to procedures well-known to a person of ordinary skill in the art of molecular biology.

196. The formulation of embodiment 195, wherein the lyophilized formulation may appear as a powder or cake or a sphere.

197. The formulation of embodiment 196, wherein if the formulation is lyophilized, the formulation may further contain bulking agents such as, e.g., trehalose, raffinose, or a combination thereof.

198. A reaction mixture for amplifying a target nucleic acid sequence of VZV, wherein the reaction mixture generally comprises: one or more oligonucleotides for detecting the target nucleic acid sequence, or detecting an amplicon generated from the target nucleic acid sequence; and one or more oligonucleotides for amplifying the target nucleic acid sequence, or amplifying an amplicon generated from the target nucleic acid sequence.

199. The reaction mixture of embodiment 198 further comprising at least two amplification primers as in any one of embodiments 1 to 36, wherein a first amplification primer is a forward amplification primer and a second amplification primer is a reverse amplification primer.

200. The reaction mixture of any one of embodiments 199, wherein the amplification primers included in the kit may include a single set of forward and reverse amplification primers that produce a single amplicon of the target nucleic acid sequence; or wherein the kit may include multiple sets of amplification primers that produce multiple amplicons from various target nucleic acid sequences across various target nucleic acid regions; or wherein the kit may include multiple sets of amplification primers that produce multiple amplicons from various target nucleic acid sequences within a single target nucleic acid region.

201. The reaction mixture of any embodiment 198, wherein the reaction mixture may also contain additional reagents for determining the presence of a VZV nucleic acid sequence in a sample.

202. A reaction mixture of embodiment 198, further comprising at least one oligonucleotide as in any of embodiments 37 to 72 for detecting the target nucleic acid sequence, or detecting the amplicon generated from the target nucleic acid sequence within the target nucleic acid region.

203. The reaction mixture of any one of embodiment 198 to 202, wherein the reaction mixture may also contain additional reagents for amplifying, if present, a target nucleic acid sequence of the VZV nucleic acid sequence in a sample.

204. The reaction mixture of embodiments 198, wherein the reaction mixture may include reagents suitable for performing in vitro amplification such as: various dNTPs; enzymes; buffers; or salts.

205. The reaction mixture of embodiment 204, wherein the reaction mixture may include various individual nucleotide subunits of DNA such as: deoxyadenosine triphosphate (dATP), deoxycytidine triphosphate (dCTP), deoxyguanosine triphosphate (dGTP), deoxythymidine triphosphate (dTTP); or adenosine triphosphate (ATP), cytidine triphosphate (CTP), guanosine triphosphate (GTP) and uridine triphosphate (UTP).

206. The reaction mixture of embodiment 204, wherein the reaction mixture may include a DNA polymerase enzyme; or wherein the reaction mixture may include a reverse transcriptase enzyme; or wherein the reaction mixture may include an organic buffer; or wherein the reaction mixture may include surfactants; or wherein the reaction mixture may include inorganic salts.

207. The reaction mixture of embodiment 204, wherein the reaction mixture may include inorganic salts selected from the group comprising: magnesium chloride; sodium chloride; potassium chloride; and sodium citrate.

208. The reaction mixture as in embodiment 207, wherein the reaction mixture comprises magnesium chloride; or wherein the concentration of magnesium chloride is between 3 mM and 6 mM; or wherein the concentration of magnesium chloride is 2 mM; or wherein the concentration of magnesium chloride is 4 mM; or wherein the concentration of magnesium chloride is 6 mM.

EXAMPLES

The oligonucleotides presented are useful for the amplification or detection of the target nucleic acid regions SEQ ID NO:38 and SEQ ID NO:39 within the VZV nucleic acid sequence. Specifically, the primers and probes can be used in combination to amplify and detect target nucleic acid sequences within target nucleic acid regions of VZV. In some embodiments, the primers and probes are used in combination with a fluorescently labelled probe. The oligonucleotides function to amplify or detect target nucleic acid sequences in clinical specimens or contrived clinical specimens, not cross-react with common organisms potentially found in the sample, and not interfere with internal controls.

The following examples illustrate certain disclosed embodiments and are not to be construed as limiting the scope of this disclosure in any way.

Example 1: Oligomer Design Considerations 18 unique primer and probe combinations (PPR), as shown in Table 1, were evaluated for VZV detection in vitro. All oligo sets cover the target nucleic acid regions of SEQ ID NO:38 and SEQ ID NO:39 within the broader VZV Nucleic Acid Sequence.

TABLE 1

Primer and Probe Combinations (PPR).

| Primer and Probe (PPR) Combination | Product Description | Oligomer SEQ ID NO: | Target SEQ ID NO: | Units | Final Conc. | Volume (µL) |
|---|---|---|---|---|---|---|
| PPR Mix 1 | forward primer | 1 | 38 | µM | 0.60 | 3.0 |
| | detection probe | 8 | | µM | 0.60 | 3.0 |
| | reverse primer | 16 | | µM | 0.40 | 1.8 |
| | IC Oligo Mix | | | x | 1.00 | 5.0 |
| | MgCl$_2$ | | | mM | 4.00 | 2.0 |
| | KCL | | | mM | 65.00 | 16.3 |
| | Water | | | | | 369.0 |
| | Total Volume | | | | | 400.00 |
| PPR Mix 2 | forward primer | 2 | 38 | µM | 0.60 | 3.0 |
| | detection probe | 9 | | µM | 0.60 | 3.0 |
| | reverse primer | 17 | | µM | 0.40 | 1.6 |
| | IC Oligo Mix | | | x | 1.00 | 5.0 |
| | MgCl$_2$ | | | mM | 4.00 | 2.0 |
| | KCL | | | mM | 65.00 | 16.3 |
| | Water | | | | | 369.2 |
| | Total Volume | | | | | 400.00 |
| PPR Mix 3 | forward primer | 1 | 38 | µM | 0.60 | 3.0 |
| | detection probe | 8 | | µM | 0.60 | 3.0 |
| | reverse primer | 17 | | µM | 0.40 | 1.8 |
| | IC Oligo Mix | | | x | 1.00 | 5.0 |
| | MgCl$_2$ | | | mM | 4.00 | 2.0 |
| | KCL | | | mM | 65.00 | 16.3 |
| | Water | | | | | 369.0 |
| | Total Volume | | | | | 400.00 |
| PPR Mix 4 | forward primer | 1 | 38 | µM | 0.60 | 3.0 |
| | detection probe | 9 | | µM | 0.60 | 3.0 |
| | reverse primer | 16 | | µM | 0.40 | 1.6 |
| | IC Oligo Mix | | | x | 1.00 | 5.0 |
| | MgCl$_2$ | | | mM | 4.00 | 2.0 |
| | KCL | | | mM | 65.00 | 16.3 |
| | Water | | | | | 369.2 |
| | Total Volume | | | | | 400.00 |
| PPR Mix 5 | forward primer | 1 | 38 | µM | 0.60 | 3.0 |
| | detection probe | 9 | | µM | 0.60 | 3.0 |
| | reverse primer | 17 | | µM | 0.40 | 1.6 |
| | IC Oligo Mix | | | x | 1.00 | 5.0 |
| | MgCl$_2$ | | | mM | 4.00 | 2.0 |
| | KCL | | | mM | 65.00 | 16.3 |
| | Water | | | | | 369.2 |
| | Total Volume | | | | | 400.00 |
| PPR Mix 6 | forward primer | 3 | 38 | µM | 0.60 | 3.0 |
| | detection probe | 10 | | µM | 0.60 | 1.4 |
| | reverse primer | 18 | | µM | 0.40 | 2.3 |
| | IC Oligo Mix | | | x | 1.00 | 5.0 |
| | MgCl$_2$ | | | mM | 4.00 | 2.0 |
| | KCL | | | mM | 65.00 | 16.3 |
| | Water | | | | | 370.1 |
| | Total Volume | | | | | 400.00 |
| PPR Mix 7 | forward primer | 4 | 38 | µM | 0.60 | 3.0 |
| | detection probe | 12 | | µM | 0.60 | 3.0 |
| | reverse primer | 19 | | µM | 0.40 | 1.4 |
| | IC Oligo Mix | | | x | 1.00 | 5.0 |
| | MgCl$_2$ | | | mM | 4.00 | 2.0 |
| | KCL | | | mM | 65.00 | 16.3 |
| | Water | | | | | 369.4 |
| | Total Volume | | | | | 400.00 |
| PPR Mix 8 | forward primer | 4 | 38 | µM | 0.60 | 3.0 |
| | detection probe | 11 | | µM | 0.60 | 3.0 |

TABLE 1-continued

Primer and Probe Combinations (PPR).

| Primer and Probe (PPR) Combination | Product Description | Oligomer SEQ ID NO: | Target SEQ ID NO: | Units | Final Conc. | Volume (μL) |
|---|---|---|---|---|---|---|
| | reverse primer | 19 | | μM | 0.40 | 1.5 |
| | IC Oligo Mix | | | x | 1.00 | 5.0 |
| | MgCl₂ | | | mM | 4.00 | 2.0 |
| | KCL | | | mM | 65.00 | 16.3 |
| | Water | | | | | 369.3 |
| | Total Volume | | | | | 400.00 |
| PPR Mix 9 | forward primer | 5 | 38 | μM | 0.60 | 3.0 |
| | detection probe | 13 | | μM | 0.60 | 1.5 |
| | reverse primer | 20 | | μM | 0.40 | 2.0 |
| | IC Oligo Mix | | | x | 1.00 | 5.0 |
| | MgCl₂ | | | mM | 4.00 | 2.0 |
| | KCL | | | mM | 65.00 | 16.3 |
| | Water | | | | | 370.3 |
| | Total Volume | | | | | 400.00 |
| PPR Mix 10 | forward primer | 6 | 38 | μM | 0.60 | 3.0 |
| | detection probe | 14 | | μM | 0.60 | 2.5 |
| | reverse primer | 21 | | μM | 0.40 | 1.6 |
| | IC Oligo Mix | | | x | 1.00 | 5.0 |
| | MgCl₂ | | | mM | 4.00 | 2.0 |
| | KCL | | | mM | 65.00 | 16.3 |
| | Water | | | | | 369.6 |
| | Total Volume | | | | | 400.00 |
| PPR Mix 11 | forward primer | 7 | 38 | μM | 0.60 | 2.0 |
| | detection probe | 15 | | μM | 0.60 | 2.0 |
| | reverse primer | 22 | | μM | 0.40 | 1.7 |
| | IC Oligo Mix | | | x | 1.00 | 5.0 |
| | MgCl₂ | | | mM | 4.00 | 2.0 |
| | KCL | | | mM | 65.00 | 16.3 |
| | Water | | | | | 371.0 |
| | Total Volume | | | | | 400.00 |
| PPR Mix 12 | forward primer | 23 | 39 | μM | 0.60 | 1.9 |
| | detection probe | 28 | | μM | 0.60 | 1.5 |
| | reverse primer | 34 | | μM | 0.40 | 1.3 |
| | IC Oligo Mix | | | x | 1.00 | 5.0 |
| | MgCl₂ | | | mM | 4.00 | 2.0 |
| | KCL | | | mM | 65.00 | 16.3 |
| | Water | | | | | 372.1 |
| | Total Volume | | | | | 400.00 |
| PPR Mix 13 | forward primer | 24 | 39 | μM | 0.60 | 1.6 |
| | detection probe | 28 | | μM | 0.60 | 1.5 |
| | reverse primer | 34 | | μM | 0.40 | 1.3 |
| | IC Oligo Mix | | | x | 1.00 | 5.0 |
| | MgCl₂ | | | mM | 4.00 | 2.0 |
| | KCL | | | mM | 65.00 | 16.3 |
| | Water | | | | | 372.3 |
| | Total Volume | | | | | 400.00 |
| PPR Mix 14 | forward primer | 25 | 39 | μM | 0.60 | 1.7 |
| | detection probe | 29 | | μM | 0.60 | 3.0 |
| | reverse primer | 35 | | μM | 0.40 | 1.6 |
| | IC Oligo Mix | | | x | 1.00 | 5.0 |
| | MgCl₂ | | | mM | 4.00 | 2.0 |
| | KCL | | | mM | 65.00 | 16.3 |
| | Water | | | | | 370.4 |
| | Total Volume | | | | | 400.00 |
| PPR Mix 15 | forward primer | 25 | 39 | μM | 0.60 | 1.7 |
| | detection probe | 30 | | μM | 0.60 | 3.0 |
| | reverse primer | 35 | | μM | 0.40 | 1.2 |
| | IC Oligo Mix | | | x | 1.00 | 5.0 |
| | MgCl₂ | | | mM | 4.00 | 2.0 |
| | KCL | | | mM | 65.00 | 16.3 |
| | Water | | | | | 370.9 |
| | Total Volume | | | | | 400.00 |
| PPR Mix 16 | forward primer | 26 | 39 | μM | 0.60 | 2.1 |
| | detection probe | 31 | | μM | 0.60 | 1.9 |
| | reverse primer | 36 | | μM | 0.40 | 1.4 |
| | IC Oligo Mix | | | x | 1.00 | 5.0 |
| | MgCl₂ | | | mM | 4.00 | 2.0 |
| | KCL | | | mM | 65.00 | 16.3 |
| | Water | | | | | 371.4 |
| | Total Volume | | | | | 400.00 |
| PPR Mix 17 | forward primer | 27 | 39 | μM | 0.60 | 1.6 |
| | detection probe | 32 | | μM | 0.60 | 3.0 |
| | reverse primer | 37 | | μM | 0.40 | 1.7 |
| | IC Oligo Mix | | | x | 1.00 | 5.0 |
| | MgCl₂ | | | mM | 4.00 | 2.0 |
| | KCL | | | mM | 65.00 | 16.3 |
| | Water | | | | | 370.6 |
| | Total Volume | | | | | 400.00 |
| PPR Mix 18 | forward primer | 27 | 39 | μM | 0.60 | 1.6 |
| | detection probe | 33 | | μM | 0.60 | 3.0 |
| | reverse primer | 37 | | μM | 0.40 | 1.6 |
| | IC Oligo Mix | | | x | 1.00 | 5.0 |
| | MgCl₂ | | | mM | 4.00 | 2.0 |
| | KCL | | | mM | 65.00 | 16.3 |
| | Water | | | | | 370.6 |
| | Total Volume | | | | | 400.00 |

18 different primer and probe combinations were selected and tested (same day of preparation). Samples were stored at 4° C. until ready to test. VZV culture fluid; Ellen (Catalog #0810171CF, Zeptometrix, Buffalo, NY) was diluted into Specimen Transport Medium (STM) (Catalog #5128-1220, QIAGEN (Digene), Germantown, MD). Each of the 18 specimen tubes received 1000 ul of VZV culture fluid (at 10000 cp/rxn) in STM. A negative control consisting of 1000 ul of STM (without VZV) was also run in parallel. Detection probes included the use of a non-canonical base such as 5-methyl-2'-deoxycytosine (5-Me-dC) to increase the melting temperature ($T_m$). All PPR PCR reactions were run using the thermocycling conditions listed in Table 2 and tested against internal controls (Table 3).

TABLE 2

Fusion Thermocycling Conditions for Example 1.

| | | |
|---|---|---|
| 2 minutes | 95° C. | 1 cycle |
| 8 seconds | 95° C. | 45 cycles |
| 25 seconds | 60° C. | |

TABLE 3

Internal Controls (IC) Primers and Probes.

| Product Description | SEQ ID | Sequence |
|---|---|---|
| Forward Primer | SEQ ID NO: 40 | 5'-ATGGTCAATTAGAGACAAAG-3' |
| Reverse Primer | SEQ ID NO: 41 | 5'-CGTTCACTATTGGTCTCTGC-3' |
| Detection Probe | SEQ ID NO: 42 | 5'-Quasar 705-CGGAATCACA AGTCAATCATCGCGCA-BHQ2-3' |

The threshold cycle ($C_t$) and number of positive reactions from each of the 18 different PPR combinations as reported in Table 1 are provided in Table 4. All PPR PCR reactions were run using the thermocycling conditions as listed in Table 2 using Hologic's PANTHER FUSION® instrumentation on FAM channel. As the PPR PCR reactions were entirely conducted on PANTHER FUSION® Instrumentation for automation, no plates were used. A total of 2 sample extractions for each PPR were processed. One extraction contained 3 PCR replicates from the eluate. The other extraction contained 1 PCR replicate. So, for each PPR, 2 sample extractions yield 4 PCR replicates. Total reaction volume for each PPR was 400.0 µl.

TABLE 4

VZV culture fluid spiked into STM and tested at 10k cp/rxn with 18 various PPR Mix.

| Combination | $C_t$ (average) | Reactivity (# of positive) |
| --- | --- | --- |
| PPR Mix 1 | 34.33 | 4/4 |
| PPR Mix 2 | 38.65 | 4/4 |
| PPR Mix 3 | 34.20 | 4/4 |
| PPR Mix 4 | 36.45 | 4/4 |
| PPR Mix 5 | 37.88 | 4/4 |
| PPR Mix 6 | 33.49 | 4/4 |
| PPR Mix 7 | 32.39 | 4/4 |
| PPR Mix 8 | 29.85 | 4/4 |
| PPR Mix 9 | 0.00 | 0/4 |
| PPR Mix 10 | 29.67 | 4/4 |
| PPR Mix 11 | 30.53 | 4/4 |
| PPR Mix 12 | 30.56 | 4/4 |
| PPR Mix 13 | 30.29 | 4/4 |
| PPR Mix 14 | 31.13 | 4/4 |
| PPR Mix 15 | 29.61 | 4/4 |
| PPR Mix 16 | 30.31 | 4/4 |
| PPR Mix 17 | 37.93 | 4/4 |
| PPR Mix 18 | 0.00 | 0/4 |

Results: The $C_t$ is the cycle number where the relative fluorescent unit signal exceeds a set RFU threshold value—correlating to the point at which the measured fluorescent signal is statistically greater than the baseline signal; thereby differentiating amplification signals from the background noise. Based on the data, several of the mixes showed poor results, while other combination of primers and probes showed good results and were selected for further evaluation of target nucleic acid region (SEQ ID NO:38 and SEQ ID NO:39). For SEQ ID NO:38, after analyzing slope (the log-linear phase measure of reaction efficiency), the cycle number where the fluorescent signal of the reaction crosses the threshold, relative fluorescence unit, and any known mismatches (via analytical software), PPR Mix 8 was determined to be the best candidate to move forward with. When comparing real-time PCR results from samples containing different amounts of the target nucleic acid sequences, low $C_t$ values indicate high amounts of amplicons (copies of the target nucleic acid sequence), while high $C_t$ values indicate lower amounts of amplicon products. PPR Mix 8 showed a low $C_t$ value, thus indicative of the highest amounts of amplicons. Generally, $C_t$ values below about 29 cycles indicate abundant PCR product, whereas $C_t$ values above about 38 cycles denote minimal amounts of polynucleotides. PPR Mix 8 also has a high RFU value (samples that contain higher quantities of polynucleotide amplicons will have higher corresponding RFU values). For SEQ ID NO:39, PPR Mix 15 was selected for similar reasons as described herein. However, one strain showed a 1 bp mismatch in the reverse primer. RFU was not has high as that in PPR Mix 8, but slope and $C_t$ values proved favorable. Although PPR Mix 16 proved similarly ideal (with a low $C_t$ and 1 bp mismatch in the reverse primer in one strain), PPR Mix 16 generated a larger amplicon of 143 bp, which was larger than PPR Mix 15.

Example 2: Oligonucleotide Performance Under Different Primers, Probe, and MgCl$_2$ Concentrations To evaluate the flexibility of the oligonucleotides for SEQ ID NO:38 to function under different assay conditions, various concentrations of primers, probes, and MgCl$_2$ were tested in combination. Three concentrations of primers (0.4, 0.7, and 1.0 µM), 3 concentrations of the probe (0.2, 0.5, and 0.8 µM) and 3 concentrations of MgCl$_2$ (2, 4, and 6 mM) were tested against VZV plasmid (Hologic, Marlborough, MA) was diluted to 1000 cp/rxn and tested against PPR Mixes 1-18 using the thermocycling conditions listed in Table 2, and tested against internal controls (Table 3). RFU and $C_t$ data indicate PPRs are robust and can withstand changes in oligo and salt concentration, without causing major issues in $C_t$ value. Accordingly, VZV oligonucleotide combinations can functions in a wide range of assay conditions. The $C_t$ values are consistent across all conditions tested and range of MgCl$_2$ concentrations. The baseline fluorescence (and final RFU) is impacted by probe concentration—as expected.

Both PPR Mix 8 and PPR Mix 15 were subsequently tested with various concentrations of VZV culture fluid to determine which oligo set to move forward with. The results are shown in Table 5. All PPR PCR reactions were run using the thermocycling conditions listed in Table 2.

TABLE 5

VZV spiked into STM was tested at 1000, 100, and 10 cp/rxn with each PPR Mix; VZV sample, FAM channel.

| Conc. (cp/rxn) | PPR | reactivity | Avg $C_t$ | Avg RFU | Signal to Noise |
| --- | --- | --- | --- | --- | --- |
| 1000 | PPR Mix 8: SEQ ID NO: 38 | 10/10 | 32.83 | 47195.61 | 7.68 |
|  | PPR Mix 15: SEQ ID NO: 39 | 10/10 | 33.16 | 39866.77 | 8.17 |
| 100 | PPR Mix 8: SEQ ID NO: 38 | 10/10 | 36.08 | 38848.50 | 6.25 |
|  | PPR Mix 15: SEQ ID NO: 39 | 10/10 | 36.64 | 30142.47 | 5.89 |
| 10 | PPR Mix 8: SEQ ID NO: 38 | 2/10 | 36.85 | 32530.67 | 5.57 |
|  | PPR Mix 15: SEQ ID NO: 39 | 1/10 | 37.89 | 23408.48 | 4.84 |

Results: Based on Ct, reactivity, RFU and signal to noise ratio, PPR Mix 8 for SEQ ID NO:38 was selected as the best candidate for further testing.

To further ensure PPR Mix 8 and PPR Mix 15 are the best PPR candidates, cross reactivity against HSV-1 and HSV-2 (two strains of Herpes simplex virus which likewise share similar nucleic acid sequences) to determine if the two oligonucleotide sets cross reacts (e.g., anneal, amplify and detect) to off-target sequences of HSV-1 or HSV-2.

TABLE 6

HSV-1 and HSV-2 tested at highest concentration with each PPR Mix.

| Sample | Sample Description | Concentration |
| --- | --- | --- |
| HSV-1 | HSV-1 in STM | 5E+04 TCID 50/ml |
| HSV-2 | HSV-2 in STM | 1.43E+04 TCID 50/ml |
| Positive Control | VZV culture fluid in STM | 1000 cp/rxn |
| Negative Control | STM | N/A |

Results: Herpes Simplex Virus Type 1 (HSV-1) (Strain MacIntyre) & Herpes Simplex Virus Type 2 (HSV-2) (Strain MS) were both diluted in STM (at high concentrations). Positive control consisted of VZV culture fluid in STM at 1000 cp/rxn. Negative control consisted of STM (without VZV). PCR thermocycling conditions correlate to conditions in Table 2. Using software to plot the rate of change of the relative fluorescence units (RFU) on the Y-axis against time (number of cycles) on the Y-axis ($-\Delta F/\Delta T$) (e.g., Melting curve analysis), the data showed no measurable change in fluorescence (RFU) over time (e.g., no increase in PCR product (amplicons)). The measured RFU (e.g., background noise pertaining to the dissociation of dsDNA into single-stranded DNA (ssDNA) due to PCR remained consistent throughout 45 PCR cycles. Based on the data summarized herein, PPR Mix 8 (for SEQ ID NO:38), was selected for sensitivity and specificity evaluations.

Example 3: Analytical Sensitivity; Viral Sensitivity

Generally, a person of ordinary skill in the art of molecular biology will appreciate viral sensitivity experiments most closely resemble clinical samples, as the presence of a host cell in culture fluid emulates in vivo conditions. One VZV strain (Isolate A) (Catalog #0810172CF, Zeptometrix, Buffalo, NY) diluted in STM as described herein was evaluated for reactivity with a PPR Mix 8. A Negative control (consisting of STM without VZV) was run in parallel. A second strain (Unknown) of VZV (Catalog #23-279-161, Thermo Fisher Scientific (AcroMetrix), Waltham, MA) diluted to 31.6 cp/ml and 10 cp/ml was likewise tested against a negative control consisting a PBS/PK mixture (3 mg/ml final PK conc.) and a positive control (consisting of the VZV plasmid diluted in STM to 100 cp/rxn). VZV in STM was evaluated at 10-1000 cp/rxn (278-27778 cp/ml). VZV in plasma was tested at 10-10,000 cp/ml (0.4-360 cp/rxn). In both strains, PPR Mix 8 was run using the thermocycling conditions as listed in Table 2, and tested against internal controls (Table 3). Results are listed in tables 7 & 8.

TABLE 7

Viral Sensitivity in STM Results, VZV in STM.

| Channel | Conc. (cp/rxn) | Conc. (cp/ml) | Reactivity | Avg $C_t$ | SD $C_t$ | Avg RFU | SD RFU | Avg T Slope | Avg Background |
|---|---|---|---|---|---|---|---|---|---|
| FAM* (VZV) | 1000 | 27778 | 10/10 | 32.83 | 0.29 | 47195.61 | 5313.92 | 860.85 | 7060.83 |
|  | 100 | 2778 | 10/10 | 36.08 | 0.46 | 38848.50 | 6026.69 | 768.46 | 7393.43 |
|  | 10 | 278 | 2/10 | 36.85 | 0.34 | 32530.67 | 4650.48 | 768.47 | 7122.13 |
| RED677 (IC Signal) | 1000 | 27778 | 10/10 | 26.63 | 0.11 | 10573.91 | 460.37 | 312.24 | 3711.42 |
|  | 100 | 2778 | 10/10 | 26.81 | 0.20 | 9452.58 | 1185.41 | 432.67 | 3357.90 |
|  | 10 | 278 | 10/10 | 26.58 | 0.14 | 11071.70 | 570.67 | 328.88 | 3962.92 |

*Reactivity defined as an amplification curve crossing a threshold of 1000 RFU.

TABLE 8

Viral Sensitivity in Plasma Results, VZV in Plasma.

| Channel | Conc. (cp/rxn) | Conc. (cp/ml) | Reactivity | Avg $C_t$ | SD $C_t$ | Avg RFU | SD RFU | Avg T Slope | Avg Background |
|---|---|---|---|---|---|---|---|---|---|
| FAM* (VZV) | 360 | 10000 | 3/3 | 30.22 | 0.04 | 41326.19 | 1687.85 | 766.12 | 5706.16 |
|  | 36 | 1000 | 3/3 | 33.79 | 0.29 | 38272.61 | 1821.86 | 528.66 | 5734.32 |
|  | 3.6 | 100 | 2/3 | 37.68 | 1.22 | 27158.30 | 10965.47 | 535.78 | 5367.53 |
|  | 1.1 | 31.6 | 1/3 | 36.96 | N/A | 33328.94 | N/A | 476.95 | 5619.97 |
|  | 0.4 | 10 | 1/3 | 37.29 | N/A | 28379.25 | N/A | 675.68 | 5583.70 |
| RED677 (IC Signal) | 360 | 10000 | 3/3 | 28.93 | 0.15 | 8076.73 | 705.01 | 295.16 | 2489.73 |
|  | 36 | 1000 | 3/3 | 28.93 | 0.20 | 7616.55 | 612.98 | 293.39 | 2266.45 |
|  | 3.6 | 100 | 3/3 | 29.00 | 0.26 | 7248.75 | 1213.24 | 281.91 | 2176.72 |
|  | 1.1 | 31.6 | 3/3 | 29.19 | 0.16 | 7444.21 | 327.57 | 363.27 | 2241.11 |
|  | 0.4 | 10 | 3/3 | 29.07 | 0.08 | 7958.86 | 379.22 | 383.61 | 2391.72 |

*Reactivity defined as an amplification curve crossing a threshold of 1000 RFU.

Results: 100% detection was seen for VZV spiked in STM at 100 cp/rxn and 20% at 10 cp/rxn. 100% detection was seen for VZV in plasma at 36 cp/rxn with 66% detection at 3.6 cp/rxn. Expected limit of detection (LoD) for VZV in plasma is 31.6 cp/ml based on $C_t$ value at 100 cp/ml. The AcroMetrix VZV panel shows a true LoD for VZV less than 1000 cp/ml (36 cp/rxn). Internal control was 100% detected in both studies.

Plasmid Sensitivity

Unlike viral samples, plasmid DNA is readily accessible within the solution and does not require cell lysis in order to test. Testing plasmid DNA eliminates the problems involving the DNA extraction process, as issues with nucleic acid extraction will result in a poor limit of detection and will give the appearance that the LDT is performing poorly. Here, plasmid sensitivity was evaluated by testing VZV plasmid in STM at six concentrations (10 to 1,000,000 copies/reaction). Determining the VZV plasmid limit of detection (LoD) with the oligo set (PPR Mix 8) ensures compatibility. VZV plasmid (Hologic, Marlborough, MA) was diluted to 1000000, 10000, 1000, 1000, 100, 10 cp/rxn in STM and tested against PPR Mix 8 (specific for SEQ ID NO:38). Negative control consisted of STM (without VZV). PPR Mix 8 was run using the thermocycling conditions listed in Table 2, and tested against internal controls (Table 3). Results are provided in Table 9.

TABLE 9

Plasmid Sensitivity Results, VZV plasmid. Reactivity was 6/6 (100%) for all samples.

| Conc. (cp/rxn) | Avg of $C_t$ | StdDev of $C_t$ | Avg of RFU | Std Dev of RFU | Avg T-Slope | Avg Background | Total RFU | Signal to Noise |
|---|---|---|---|---|---|---|---|---|
| 1,000,000 | 18.25 | 0.06 | 53866.89 | 2676.51 | 720.27 | 7481.25 | 61348.14 | 8.20 |
| 100,000 | 21.63 | 0.08 | 54742.92 | 1383.12 | 546.75 | 7346.34 | 62089.26 | 8.45 |
| 10,000 | 25.32 | 0.08 | 52404.83 | 3070.87 | 724.19 | 7167.25 | 59572.08 | 8.31 |
| 1,000 | 28.74 | 0.22 | 52745.64 | 4867.53 | 620.23 | 8018.33 | 60763.97 | 7.58 |
| 100 | 32.14 | 0.13 | 49430.17 | 2652.52 | 698.08 | 7306.13 | 56736.29 | 7.77 |
| 10 | 35.34 | 0.51 | 38864.82 | 5691.82 | 599.81 | 6664.06 | 45528.88 | 6.83 |

Results: Generally, the slope of the curve is used to determine the reaction efficiency, which, should be between about 90% and about 110%—corresponding to a slope between about −3.6 and about −3.10. Here, PPR Mix 8 shows a linear slope of 3.44. The correlation coefficient (R2) value, which is a measure of replicate reproducibility (corresponding to a measure of how well the data fits a standard curve e.g., linearity of the standard curve) and ideally should equal 1, although 0.999 is generally the maximum value. Here, R2 of 0.9982. The slope of 3.44 and an R2 of 0.9982 signifies high PCR efficiency. The plasmid limit of detection (LoD) is between 1 and 10 cp/rxn (27 and 277 cp/ml). Commonly, 2 to 10, the theoretical limit of detection of the reaction is considered the lowest number of target nucleic acid sequences that can be reliably quantified. Evaluating VZV plasmid LoD with chosen oligo set (PPR Mix 8) confirmed compatibility. 100% detection for VZV plasmid (Hologic, Marlborough, MA) was measured town to 10 cp/rxn.

Viral Genomic DNA Sensitivity & Concentration Comparison of Plasmid, gDNA, and Virus Testing for genomic DNA requires lysis of cells in order to access the virus. Genomic DNA sensitivity was evaluated by testing VZV gDNA (Ellen) (Catalog #VR-1367, ATCC, Manassas, VA), VZV plasmid (Hologic, Marlborough, MA), and VZV culture fluid (Ellen) in STM at six concentrations (10-1,000,000 copies/reaction). PCR formulations were prepared according to PPR Mix 8 from Table 1. Plasmid, gDNA, and viral culture fluid were spiked into STM separately and at the indicated concentrations. Results are provided in Table 10.

Results: gDNA contamination is detected using IC that does not contain reverse transcriptase. If the Ct for the IC is higher than the Ct generated by the most dilute target, the Ct indicates that gDNA is not contributing to signal generation. Here, 100% detection for gDNA and plasmid was seen down to 31.6 cp/rxn with similar $C_t$ values (0.3 difference). For the viral culture fluid, 100% detection was only measured at 1000 cp/rxn and showed anywhere from a 1.3-2.2 log difference in concentration from the gDNA.

Example 4: Specificity

For specificity testing, 38 organisms commonly found in blood, tissue, or lesions were prepared in 9 panels by spiking as close as possible (dependent on availability) to 1E6 cp/ml into STM. Each panel was evaluated for specificity with a PCR formulation according to PPR Mix 8 from Table 1. Panel composition and reactivity results is listed in Table 11. Positive control consisted of VZV culture fluid in STM, whereas negative control consisted of STM (without VZV). PPR Mix 8 was run using the thermocycling conditions listed in Table 2, and tested against internal controls (Table 3).

TABLE 10

Concentration Comparison among virus, gDNA, and plasmid, FAM channel.

| Sample | Conc. (cp/rxn) | Conc. (cp/ml) | Reactivity | Avg of $C_t$ | StdDev of $C_t$ | Avg of RFU | StdDev of RFU | Avg T-Slope | Avg Background | Δ in $C_t$ | Δ in $C_t$ (log) |
|---|---|---|---|---|---|---|---|---|---|---|---|
| gDNA | 1000 | 27778 | 6/6 | 28.9 | 0.3 | 53153.2 | 3862.0 | 732.1 | 7570.9 | | |
| Plasmid | | | 6/6 | 28.6 | 0.2 | 52414.7 | 4392.9 | 607.8 | 7290.3 | −0.3 | −0.08 |
| Virus | | | 6/6 | 36.1 | 0.7 | 40191.1 | 8511.1 | 613.9 | 7096.1 | 7.3 | 2.19 |
| gDNA | 316 | 8778 | 6/6 | 30.8 | 0.2 | 44355.3 | 3381.1 | 634.6 | 6195.6 | | |
| Plasmid | | | 6/6 | 30.3 | 0.2 | 51017.6 | 3879.7 | 650.5 | 7024.3 | −0.5 | −0.16 |
| Virus | | | 4/6 | 37.2 | 0.1 | 34594.3 | 2647.1 | 729.1 | 7009.1 | 6.4 | 1.92 |
| gDNA | 100 | 2778 | 6/6 | 32.8 | 0.2 | 51645.0 | 3935.4 | 592.7 | 7436.8 | | |
| Plasmid | | | 6/6 | 32.5 | 0.5 | 47212.5 | 2424.5 | 690.6 | 6819.3 | −0.3 | −0.09 |
| Virus | | | 1/6 | 37.4 | N/A | 30654.7 | N/A | 628.0 | 6627.6 | 4.7 | 1.40 |
| gDNA | 31.6 | 878 | 6/6 | 34.1 | 0.4 | 47378.5 | 3676.5 | 646.3 | 6863.8 | | |
| Plasmid | | | 6/6 | 33.8 | 0.4 | 47695.7 | 2479.1 | 647.6 | 7215.2 | −0.3 | −0.10 |
| Virus | | | 4/6 | 38.3 | 0.3 | 25989.9 | 6507.4 | 696.5 | 7398.6 | 4.3 | 1.28 |

TABLE 11

VZV Specificity Results.

| Panel | Organism | Strain | Final Concentration | Units | Reactivity |
|---|---|---|---|---|---|
| 1 | BK Virus | N/A | $1.00 \times 10^6$ | cp/ml | 0/3 = 0% |
|  | Epstein-Barr Virus (EBV) | B95-8 | $1.00 \times 10^6$ | cp/ml |  |
|  | Human Parvovirus | B19 | $1.00 \times 10^5$ | IU/ml |  |
|  | CMV | AD-169 | $1.00 \times 10^6$ | TCID50/ml |  |
| 2 | *Candida albicans* | CBS 562 | $1.00 \times 10^6$ | CFU/ml | 0/3 = 0% |
|  | *Chlamydia trachomatis* | Serovar E | $1.00 \times 10^6$ | IFU/ml |  |
|  | Human Immunodeficiency virus Type 1 (HIV-1) | Type B | $1.00 \times 10^5$ | cp/ml |  |
|  | Hepatitis A virus (HAV) | HM175 | $1.43 \times 10^5$ | TCID50/ml |  |
| 3 | Dengue Virus Type 1 | Hawaii | $1.43 \times 10^4$ | TCID50/ml | 0/3 = 0% |
|  | Dengue Virus Type 2 | New Guinea C | $1.43 \times 10^4$ | TCID50/ml |  |
|  | Dengue Virus Type 3 | H87 | $1.43 \times 10^5$ | TCID50/ml |  |
|  | Dengue Virus Type 4 | H241 | $1.43 \times 10^4$ | TCID50/ml |  |
| 4 | Herpes Simplex Virus Type 2 (HSV-2) | MS | $1.43 \times 10^4$ | TCID50/ml | 0/3 = 0% |
|  | HIV Type 2 (HIV-2) | NIH-Z | $1.43 \times 10^3$ | TCID50/ml |  |
|  | HPV purified plasmid DNA | Type 18 | $1.00 \times 10^6$ | cp/ml |  |
|  | Synthetic HPV DNA | Type 16 | $1.00 \times 10^4$ | cp/ml |  |
| 5 | Human Herpes Virus Type 6A (HHV-6A) | GS | $1.00 \times 10^6$ | cp/ml | 0/3 = 0% |
|  | Human Herpes Virus Type 6B (HHV-6B) | Z29 | $1.00 \times 10^6$ | cp/ml |  |
|  | Human Herpes Virus Type 7 (HHV-7) | SB | $1.43 \times 10^6$ | TCID50/ml |  |
|  | Human Herpes Virus Type 8 (HHV-8) | N/A | $1.00 \times 10^6$ | cp/ml |  |
| 6 | Human T-Lymphotropic Virus Type I (HTLV-I) | N/A | $1.00 \times 10^6$ | vp/ml | 0/3 = 0% |
|  | Human T-Lymphotropic Virus Type II (HTLV-II) Culture Fluid | N/A | $1.00 \times 10^6$ | vp/ml |  |
|  | Human Hepatitis B Virus (HBV) | N/A | $1.00 \times 10^4$ | cp/ml |  |
|  | Human Hepatitis C Virus (HCV) | N/A | $1.00 \times 10^4$ | cp/ml |  |
| 7 | *Mycobacterium smegmatis* | W-113 | $1.00 \times 10^6$ | CFU/ml | 0/3 = 0% |
|  | *Neisseria gonorrhoeae* | NCTC 8375 | $1.00 \times 10^6$ | CFU/ml |  |
|  | Propionibacterium acnes | NCTC 737 | $1.00 \times 10^6$ | CFU/ml |  |
|  | *Staphylococcus aureus* | NCTC 8532 | $1.00 \times 10^6$ | CFU/ml |  |
| 8 | West Nile Virus (WNV) | NY 2001-6263 | $5.00 \times 10^3$ | cp/ml | 0/3 = 0% |
|  | Vaccinia Virus | "Vaccine" | $1.43 \times 10^6$ | TCID50/ml |  |
|  | *Trichomonas vaginalis* | JH 31A #4 | $1.00 \times 10^6$ | cells/ml |  |
|  | *Staphylococcus epidermidis* | RP62A | $1.00 \times 10^6$ | CFU/ml |  |
|  | HSV-1 Strain MacIntyre | MacIntyre | $1.43 \times 10^4$ | TCID50/ml |  |
|  | *Mycobacterium gordonae* | L. Wayne W-1609 | $1.00 \times 10^6$ | cp/ml |  |
| 9 | Mumps Virus | Enders | $5.00 \times 10^4$ | TCID50/ml | 0/3 = 0% |
|  | Measles Virus | N/A | $1.43 \times 10^6$ | TCID50/ml |  |
|  | Adenovirus | 7 | $1.00 \times 10^5$ | TCID50/ml |  |
|  | Adenovirus | 4 | $1.00 \times 10^4$ | TCID50/ml |  |

Results: Of the 38 organisms tested, 0% were positive for VZV and 100% were positive for the internal control. Positive control consisting of VZV culture fluid in STM reported positive for VZV and IC, whereas the negative control (STM without VZV) was positive for IC only.

Example 5: Interference

To measure interference, VZV reactivity was evaluated in the presence of the 38 organisms from the specificity study. Panels 2-8 were diluted 1:10 VZV strain (Isolate A) in STM at 27,778 cp/ml. Isolate A is culture fluid of one particular strain of VZV and is "live" until the point where the cells are lysed. Panels 1 and 9 were likewise diluted 1:10 VZV strain (Isolate A) culture fluid in STM at 27,778 cp/ml. Panels 1 and 9 did not come from the specificity study and therefore were prepared fresh. To evaluate CMV interference, CMV culture fluid was spiked into each panel at 27,778 cp/ml. Each of the 9 panels were tested with PPR Mix 8. Positive control consisted of CMV, and VZV at 27,778 cp/ml in STM. Negative control consisted of STM (without VZV). PPR Mix 8 was run using the thermocycling conditions listed in Table 2, and tested against internal controls (Table 3). Results are provided in table 12.

TABLE 12

VZV Performance in the Presence of Common Organisms.

| Panel | Organism | Strain | Final Concentration | Units | Reactivity |
|---|---|---|---|---|---|
| 1 | BK Virus | N/A | $1.00 \times 10^6$ | cp/ml | 1/1 = 100% |
| | Epstein-Barr Virus (EBV) | B95-8 | $1.00 \times 10^6$ | cp/ml | |
| | Human Parvovirus | B19 | $1.00 \times 10^5$ | IU/ml | |

TABLE 12-continued VZV Performance in the Presence of Common Organisms.

| Panel | Organism | Strain | Final Concentration | Units | Reactivity |
|---|---|---|---|---|---|
| 2 | *Candida albicans* | CBS 562 | $1.00 \times 10^5$ | CFU/ml | 1/1 = 100% |
|  | *Chlamydia trachomatis* | Serovar E | $1.00 \times 10^5$ | IFU/ml |  |
|  | Human Immunodeficiency virus Type 1 (HIV-1) | Type B | $1.00 \times 10^4$ | cp/ml |  |
|  | Hepatitis A virus (HAV) | HM175 | $1.43 \times 10^4$ | TCID50/ml |  |
| 3 | Dengue Virus Type 1 | Hawaii | $1.43 \times 10^3$ | TCID50/ml | 1/1 = 100% |
|  | Dengue Virus Type 2 | New Guinea C | $1.43 \times 10^3$ | TCID50/ml |  |
|  | Dengue Virus Type 3 | H87 | $1.43 \times 10^4$ | TCID50/ml |  |
|  | Dengue Virus Type 4 | H241 | $1.43 \times 10^3$ | TCID50/ml |  |
| 4 | Herpes Simplex Virus Type 2 (HSV-2) | MS | $1.43 \times 10^3$ | TCID50/ml | 1/1 = 100% |
|  | HIV Type 2 (HIV-2) | NIH-Z | $1.43 \times 10^2$ | TCID50/ml |  |
|  | HPV purified plasmid DNA | Type 18 | $1.00 \times 10^5$ | cp/ml |  |
|  | Synthetic HPV DNA | Type 16 | $1.00 \times 10^3$ | cp/ml |  |
| 5 | Human Herpes Virus Type 6A (HHV-6A) | GS | $1.00 \times 10^5$ | cp/ml | 1/1 = 100% |
|  | Human Herpes Virus Type 6B (HHV-6B) | Z29 | $1.00 \times 10^5$ | cp/ml |  |
|  | Human Herpes Virus Type 7 (HHV-7) | SB | $1.43 \times 10^5$ | TCID50/ml |  |
|  | Human Herpes Virus Type 8 (HHV-8) | N/A | $1.00 \times 10^5$ | cp/ml |  |
| 6 | Human T-Lymphotropic Virus Type I (HTLV-I) | N/A | $1.00 \times 10^5$ | vp/ml | 1/1 = 100% |
|  | Human T-Lymphotropic Virus Type II (HTLV-II) Culture Fluid | N/A | $1.00 \times 10^5$ | vp/ml |  |
|  | Human Hepatitis B Virus (HBV) | N/A | $1.00 \times 10^5$ | cp/ml |  |
|  | Human Hepatitis C Virus (HCV) | N/A | $1.00 \times 10^3$ | cp/ml |  |
| 7 | *Mycobacterium smegmatis* | W-113 | $1.00 \times 10^5$ | CFU/ml | 1/1 = 100% |
|  | *Neisseria gonorrhoeae* | NCTC 8375 | $1.00 \times 10^5$ | CFU/ml |  |
|  | Propionibacterium acnes | NCTC 737 | $1.00 \times 10^5$ | CFU/ml |  |
|  | *Staphylococcus aureus* | NCTC 8532 | $1.00 \times 10^5$ | CFU/ml |  |
| 8 | West Nile Virus (WNV) | NY 2001-6263 | $5.00 \times 10^2$ | cp/ml | 1/1 = 100% |
|  | Vaccinia Virus | "Vaccine" | $1.43 \times 10^5$ | TCID50/ml |  |
|  | *Trichomonas vaginalis* | JH 31A #4 | $1.00 \times 10^5$ | cells/ml |  |
|  | *Staphylococcus epidermidis* | RP62A | $1.00 \times 10^5$ | CFU/ml |  |
|  | HSV-1 Strain MacIntyre | MacIntyre | $5.00 \times 10^3$ | TCID50/ml |  |
|  | *Mycobacterium gordonae* | L. Wayne W-1609 | $1.00 \times 10^5$ | cp/ml |  |
| 9 | Mumps Virus | Enders | $5.00 \times 10^4$ | TCID50/ml | 1/1 = 100% |
|  | Measles Virus | N/A | $1.43 \times 10^6$ | TCID50/ml |  |
|  | Adenovirus | 7 | $1.00 \times 10^5$ | TCID50/ml |  |
|  | Adenovirus | 4 | $1.00 \times 10^4$ | TCID50/ml |  |

Results: VZV and CMV were detected in 100% of the specificity panels tested. For VZV, 0 of the 38 organisms tested interfered with VZV detection. For CMV, 0 of the 34 organisms tested interfered with CMV detection. While $C_t$ values varied, the largest $C_t$ difference for CMV was 1.6 (when compared to the positive control). As all sample comprised concentrations higher than those expected in a clinical specimen, $C_t$ was not deemed significant unless greater than 3 $C_t$. The internal control was detected in 100% of the panels. The positive control (detected in 100% of the panels) was positive for VZV and the internal control. The negative control was positive for the internal control only.

Example 6: Reactivity

Reactivity testing ensures that the chosen oligo combination (PPR Mix 8) will similarly work with all available strains of the virus on the market, as testing only one strain of VZV does not insinuate that PPR Mix 8 will perform equally on analog strains, nor that Isolate A is representative of all VZV strains. The eight isolates tested characterize all quantitated strains of VZV available in the market at the time of testing. Non-quantified VZV strains, like those available from ATCC, were not tested, as unquantified strains provide no benefit for sensitivity testing. Here, PPR Mix 8 was tested against 8 different VZV strains in both viral transport medium (VTM) containing 2E4 cells/ml of HeLa and in STM containing 2E4 cells/ml. All 8 strains were tested at 100 & 1000 cp/rxn. The threshold cycle ($C_t$) and relative fluorescence unit (RFU) data is found in table 14. Positive control consisted of VZV in STM at 100 cp/rxn containing 2E4 cells/ml of HeLa. Negative controls consisted of STM in HeLa (without VZV) and VTM with HeLa (without VZV). PPR Mix 8 was run using the thermocycling conditions listed in Table 2, and tested against internal controls (Table 3). Results are provided in table 13.

TABLE 13

VZV Reactivity Results.

| Isolate | Medium | Conc. (cp/rxn) | Reactivity | Avg of Ct | StdDev of Ct | Avg of RFU | StdDev of RFU | Avg T Slope | Avg Background |
|---|---|---|---|---|---|---|---|---|---|
| Isolate A | STM with 2E4 cells/ml of HeLa Cells | 1000 | 3/3 | 33.78 | 0.21 | 35714.12 | 953.03 | 633.67 | 6416.13 |
| | | 100 | 3/3 | 37.06 | 0.65 | 26002.00 | 5970.30 | 630.55 | 7572.84 |
| Isolate B | | 1000 | 3/3 | 33.23 | 0.44 | 44905.99 | 2831.13 | 611.21 | 7174.42 |
| | | 100 | 3/3 | 37.25 | 1.12 | 24003.88 | 10032.15 | 684.23 | 6890.42 |
| Isolate D | | 1000 | 3/3 | 34.73 | 0.29 | 38925.20 | 473.70 | 540.76 | 7649.28 |
| | | 100 | 3/3 | 37.62 | 0.51 | 23024.63 | 3316.00 | 680.64 | 7351.41 |
| Ellen | | 1000 | 3/3 | 34.25 | 0.41 | 36295.19 | 4674.56 | 570.82 | 6363.47 |
| | | 100 | 1/3 | 38.39 | N/A | 17647.94 | N/A | 593.04 | 6721.58 |
| 82 | | 1000 | 3/3 | 31.91 | 0.18 | 45015.96 | 1214.91 | 598.98 | 7115.60 |
| | | 100 | 3/3 | 37.15 | 1.48 | 25178.83 | 9283.72 | 486.23 | 7349.01 |
| 275 | | 1000 | 3/3 | 33.37 | 0.11 | 44467.52 | 2909.58 | 659.14 | 7401.40 |
| | | 100 | 3/3 | 36.24 | 0.44 | 32215.08 | 2400.52 | 560.64 | 7778.35 |
| 1700 | | 1000 | 3/3 | 33.67 | 0.11 | 43942.26 | 1923.50 | 545.18 | 7321.07 |
| | | 100 | 2/3 | 37.92 | 0.55 | 17464.05 | 3075.97 | 599.76 | 7279.26 |
| 9939 | | 1000 | 3/3 | 33.80 | 0.41 | 44421.69 | 2750.26 | 619.39 | 7909.65 |
| | | 100 | 3/3 | 37.29 | 0.39 | 25178.25 | 3143.59 | 543.36 | 7015.65 |
| Isolate A | VTM with 2E4 cells/ml of HeLa Cells | 1000 | 3/3 | 33.67 | 0.17 | 37482.21 | 2158.38 | 552.34 | 6582.95 |
| | | 100 | 3/3 | 37.64 | 0.46 | 22573.32 | 1826.84 | 661.86 | 7166.72 |
| Isolate B | | 1000 | 3/3 | 33.66 | 0.36 | 35680.85 | 9411.74 | 694.31 | 6145.10 |
| | | 100 | 2/3 | 36.82 | 0.86 | 30568.34 | 9893.98 | 670.51 | 6994.66 |
| Isolate D | | 1000 | 3/3 | 34.65 | 0.13 | 34848.55 | 3188.54 | 527.24 | 7271.65 |
| | | 100 | 3/3 | 37.80 | 0.70 | 23384.56 | 8428.54 | 596.12 | 7154.69 |
| Ellen | | 1000 | 3/3 | 35.74 | 0.50 | 26510.26 | 4855.20 | 622.60 | 6561.79 |
| | | 100 | 0/3 | N/A | N/A | N/A | N/A | N/A | 6786.97 |
| 82 | | 1000 | 3/3 | 32.73 | 0.19 | 42883.36 | 2803.52 | 529.71 | 6815.79 |
| | | 100 | 3/3 | 37.12 | 1.27 | 27756.03 | 9365.32 | 621.31 | 7143.70 |
| 275 | | 1000 | 3/3 | 33.60 | 0.22 | 38964.58 | 4360.22 | 567.87 | 6956.88 |
| | | 100 | 1/3 | 38.21 | N/A | 20188.24 | N/A | 713.77 | 7618.84 |
| 1700 | | 1000 | 3/3 | 34.79 | 0.29 | 36156.39 | 5653.53 | 510.91 | 6510.33 |
| | | 100 | 2/3 | 38.55 | 0.01 | 15776.93 | 333.63 | 543.64 | 7034.33 |
| 9939 | | 1000 | 3/3 | 34.48 | 0.39 | 35547.92 | 7615.14 | 620.50 | 6825.64 |
| | | 100 | 2/3 | 37.30 | 0.02 | 25984.54 | 1220.15 | 648.78 | 6702.02 |

Results: All strains were reactive with the VZV oligos. 100% positivity was seen for all 8 VZV strains at 1000 cp/rxn. Isolate A, Isolate B, Isolate D, 82, 275, and 9939 were also 100% positive at 100 cp/rxn. The positive control of VZV plasmid in STM at 100 cp/rxn was positive for VZV. The negative controls consisting of both simulated clinical matrices were negative for VZV. Internal control was detected in all samples tested. All strains were reactive with the VZV oligos.

Example 7: VZV Analyte Specific Reagents Clinical Performance Study

VZV clinical reactivity with 20 positive and 20 negative clinical specimens were examined. A PCR formulation using the described primers and probe for VZV was used to detect VZV in archived clinical specimens. 37.5 µM VZV primers (SEQ ID NOs:4 and 19) and 25 µM VZV probe (SEQ ID NO: 11; 5'-Fluorescein, 3' BHQ1, All C modified with 5-Me-dC) were used in the reactions (PPR Mix 8). Test samples included 20 known VZV positive and 20 known VZV negative lesion swab specimen. VZV plasmid at 50 cp/reaction was used as a positive control. Samples were processed with 300 µL of specimen and 468 µL of STM (1:1.56) using the cycles described in Table 7-1 and PPR mix described in Table 7-2.

TABLE 7-1

Cycles.

| Stage | Cycles | Step | Temp (° C.) | Time |
|---|---|---|---|---|
| 1 | 1 | 1 | 95 | 2 min |
| 2 | 45 | 1 | 95 | 8 sec |
| | | 2 | 60 | 25 sec |

TABLE 7-2

PPR Mix.

| Oligo | Units | Stock Conc. | Final Conc. | ×1.25 | µL |
|---|---|---|---|---|---|
| VZV Primers | µM | 37.50 | 0.60 | 0.75 | 34.0 |
| VZV Probe | µM | 25.00 | 0.40 | 0.50 | 34.0 |
| DNA control primers (Table 3) | µM | 37.50 | 0.60 | 0.75 | 34.0 |
| DNA control probe (Table 3) | µM | 25.00 | 0.40 | 0.50 | 34.0 |
| Tris | mM | 1000.00 | 4.00 | 5.00 | 8.5 |
| MgCl$_2$ | mM | 1000.00 | 4.00 | 5.00 | 8.5 |
| KCl | mM | 2000.00 | 65.00 | 81.25 | 69.1 |
| | | | | Water | 1477.9 |
| | | | | Total: | 1700.0 |

TABLE 7-3

Clinical Samples.

| Sample ID | Sample date | Assay | Result |
|---|---|---|---|
| VZV POS_1 | 9 Jan. 2018 | Diasorin MDX | VZV Positive Clinical Specimen |
| VZV POS_2 | 19 Jan. 2018 | Diasorin MDX | VZV Positive Clinical Specimen |
| VZV POS_3 | 19 Jan. 2018 | Diasorin MDX | VZV Positive Clinical Specimen |
| VZV POS_4 | 17 Jan. 2018 | Diasorin MDX | VZV Positive Clinical Specimen |
| VZV POS_5 | 18 Jan. 2018 | Diasorin MDX | VZV Positive Clinical Specimen |
| VZV POS_6 | 24 Dec. 2017 | Diasorin MDX | VZV Positive Clinical Specimen |
| VZV POS_7 | 27 Dec. 2017 | Diasorin MDX | VZV Positive Clinical Specimen |
| VZV POS_8 | 25 Dec. 2017 | Diasorin MDX | VZV Positive Clinical Specimen |
| VZV POS_9 | 21 Dec. 2017 | Diasorin MDX | VZV Positive Clinical Specimen |
| VZV POS_10 | 25 Jan. 2018 | Inova QUANTA-Lyser | VZV Positive Clinical Specimen |
| VZV POS_11 | 25 Jan. 2018 | Inova QUANTA-Lyser | VZV Positive Clinical Specimen |
| VZV POS_12 | 22 Jan. 2018 | Inova QUANTA-Lyser | VZV Positive Clinical Specimen |
| VZV POS_13 | 2 Feb. 2018 | Inova QUANTA-Lyser | VZV Positive Clinical Specimen |
| VZV POS_14 | 29 Jan. 2018 | Inova QUANTA-Lyser | VZV Positive Clinical Specimen |
| VZV POS_15 | 2 Feb. 2018 | Inova QUANTA-Lyser | VZV Positive Clinical Specimen |
| VZV POS_16 | 10 Feb. 2018 | Diasorin MDX | VZV Positive Clinical Specimen |
| VZV POS_17 | 2 Feb. 2018 | Diasorin MDX | VZV Positive Clinical Specimen |
| VZV POS_18 | 12 Feb. 2018 | Inova QUANTA-Lyser | VZV Positive Clinical Specimen |
| VZV POS_19 | 7 Feb. 2018 | Diasorin MDX | VZV Positive Clinical Specimen |
| VZV POS_20 | 6 Feb. 2018 | Diasorin MDX | VZV Positive Clinical Specimen |
| VZV NEG_1 | 31 Jan. 2018 | Diasorin MDX | VZV Negative Clinical Specimen |
| VZV NEG_2 | 5 Feb. 2018 | Diasorin MDX | VZV Negative Clinical Specimen |
| VZV NEG_3 | 7 Feb. 2018 | Diasorin MDX | VZV Negative Clinical Specimen |
| VZV NEG_4 | 9 Feb. 2018 | Diasorin MDX | VZV Negative Clinical Specimen |
| VZV NEG_5 | 6 Feb. 2018 | Diasorin MDX | VZV Negative Clinical Specimen |
| VZV NEG_6 | 7 Feb. 2018 | Diasorin MDX | VZV Negative Clinical Specimen |
| VZV NEG_7 | 2 Feb. 2018 | Diasorin MDX | VZV Negative Clinical Specimen |
| VZV NEG_8 | 19 Jan. 2018 | Diasorin MDX | VZV Negative Clinical Specimen |
| VZV NEQ_9 | 17 Jan. 2018 | Diasorin MDX | VZV Negative Clinical Specimen |
| VZV NEG_10 | 17 Jan. 2018 | Diasorin MDX | VZV Negative Clinical Specimen |
| VZV NEG_11 | 1 Feb. 2018 | Diasorin MDX | VZV Negative Clinical Specimen |
| VZV NEG_12 | 21 Jan. 2018 | DSX | VZV Negative Clinical Specimen |
| VZV NEG_13 | 29 Jan. 2018 | Diasorin MDX | VZV Negative Clinical Specimen |
| VZV NEG_14 | 8 Feb. 2018 | Diasorin MDX | VZV Negative Clinical Specimen |
| VZV NEG_15 | 10 Feb. 2018 | Diasorin MDX | VZV Negative Clinical Specimen |
| VZV NEG_16 | 3 Feb. 2018 | Diasorin MDX | VZV Negative Clinical Specimen |
| VZV NEG_17 | 8 Feb. 2018 | Diasorin MDX | VZV Negative Clinical Specimen |
| VZV NEG_18 | 11 Feb. 2018 | Diasorin MDX | VZV Negative Clinical Specimen |
| VZV NEG_19 | 1 Feb. 2018 | Diasorin MDX | VZV Negative Clinical Specimen |
| VZV NEG_20 | 9 Feb. 2018 | Diasorin MDX | VZV Negative Clinical Specimen |

TABLE 7-4

Results, FAM channel.

| Sample ID | Positivity | Avg Ct | Avg RFU | Avg T Slope | Avg Estimated Background |
|---|---|---|---|---|---|
| POS CTRL | 1 | 33.78 | 45819 | 536 | 7319 |
| NEG CTRL |  |  | 53 |  | 6690 |
| VZV NEG_1 |  |  |  |  | 6406 |
| VZV NEG_2 |  |  |  |  | 6586 |
| VZV NEG_3 |  |  |  |  | 5432 |
| VZV NEG_4 |  |  |  |  | 6212 |
| VZV NEG_5 |  |  |  |  | 6460 |
| VZV NEG_6 |  |  |  |  | 7660 |
| VZV NEG_7 |  |  |  |  | 6869 |
| VZV NEG_8 |  |  |  |  | 6350 |
| VZV NEQ_9 |  |  |  |  | 6716 |
| VZV NEG_10 |  |  | 44 |  | 5729 |
| VZV NEG_11 |  |  |  |  | 6720 |
| VZV NEG_12 |  |  |  |  | 8079 |
| VZV NEG_13 |  |  |  |  | 5436 |
| VZV NEG_14 |  |  |  |  | 6751 |
| VZV NEG_15 |  |  |  |  | 6767 |
| VZV NEG_16 |  |  | 57 |  | 7130 |
| VZV NEG_17 |  |  |  |  | 6818 |
| VZV NEG_18 |  |  |  |  | 6188 |
| VZV NEG_19 |  |  |  |  | 7183 |
| VZV NEG_20 |  |  |  |  | 6706 |
| VZV POS_1 | 1 | 25.68 | 53055 | 587 | 7430 |
| VZV POS_2 | 1 | 19.32 | 50179 | 673 | 7006 |
| VZV POS_3 | 1 | 19.67 | 56025 | 535 | 8074 |
| VZV POS_4 | 1 | 22.79 | 57583 | 478 | 8109 |
| VZV POS_5 | 1 | 20.68 | 38151 | 533 | 5482 |
| VZV POS_6 | 1 | 21.45 | 37679 | 625 | 5190 |
| VZV POS_7 | 1 | 19.39 | 41470 | 630 | 5915 |
| VZV POS_8 | 1 | 20.05 | 44230 | 813 | 6179 |
| VZV POS_9 | 1 | 22.7 | 42114 | 511 | 6839 |
| VZV POS_10 | 1 | 29.43 | 46735 | 662 | 7019 |
| VZV POS_11 | 1 | 18.06 | 44749 | 796 | 6266 |
| VZV POS_12 | 1 | 20.56 | 35939 | 583 | 5160 |
| VZV POS_13 | 1 | 21.1 | 44065 | 772 | 6121 |
| VZV POS_14 | 1 | 19.56 | 46266 | 573 | 6168 |
| VZV POS_15 | 1 | 19.83 | 48359 | 508 | 6730 |
| VZV POS_16 | 1 | 24.59 | 43961 | 610 | 6229 |
| VZV POS_17 | 1 | 26.43 | 40510 | 685 | 5836 |
| VZV POS_18 | 1 | 24.38 | 44318 | 711 | 5975 |
| VZV POS_19 | 1 | 17.66 | 40743 | 572 | 5494 |
| VZV POS_20 | 1 | 26.61 | 45100 | 596 | 6731 |

TABLE 7-5

Results, Quasar 705 channel.

| Sample ID | Valid N | Avg Ct | Avg RFU | Avg T Slope | Avg Estimated Background |
|---|---|---|---|---|---|
| POS CTRL | 1 | 27.21 | 6533 | 365 | 2287 |
| NEG CTRL | 1 | 27.43 | 5105 | 309 | 1650 |
| VZV NEG_1 | 1 | 27.47 | 5411 | 304 | 1757 |
| VZV NEG_2 | 1 | 27.85 | 5147 | 248 | 1754 |
| VZV NEG_3 | 1 | 27.76 | 4467 | 254 | 1460 |
| VZV NEG_4 | 1 | 27.53 | 5191 | 287 | 1747 |
| VZV NEG_5 | 1 | 27.59 | 5483 | 290 | 1836 |
| VZV NEG_6 | 1 | 27.69 | 6264 | 279 | 2239 |
| VZV NEG_7 | 1 | 27.85 | 6068 | 247 | 2082 |
| VZV NEG_8 | 1 | 27.84 | 5459 | 252 | 1877 |
| VZV NEG_9 | 1 | 27.55 | 5875 | 293 | 2009 |
| VZV NEG_10 | 1 | 27.94 | 4877 | 236 | 1593 |
| VZV NEG_11 | 1 | 27.49 | 5883 | 304 | 1935 |
| VZV NEG_12 | 1 | 27.46 | 7219 | 311 | 2450 |
| VZV NEG_13 | 1 | 28.07 | 4858 | 360 | 1672 |
| VZV NEG_14 | 1 | 27.52 | 6006 | 297 | 2084 |
| VZV NEG_15 | 1 | 29.19 | 5540 | 353 | 1974 |
| VZV NEG_16 | 1 | 27.63 | 6108 | 284 | 2150 |
| VZV NEG_17 | 1 | 27.85 | 5931 | 255 | 2068 |
| VZV NEG_18 | 1 | 27.68 | 5126 | 270 | 1752 |
| VZV NEG_19 | 1 | 27.34 | 6554 | 331 | 2245 |
| VZV NEG_20 | 1 | 27.5 | 6168 | 301 | 1966 |
| VZV POS_1 | 1 | 27.56 | 6267 | 298 | 2152 |
| VZV POS_2 | 1 | 27.68 | 5717 | 250 | 1974 |
| VZV POS_3 | 1 | 27.59 | 6499 | 278 | 2303 |
| VZV POS_4 | 1 | 27.29 | 6738 | 331 | 2298 |
| VZV POS_5 | 1 | 28.07 | 5758 | 321 | 1948 |
| VZV POS_6 | 1 | 28.01 | 5006 | 308 | 1610 |
| VZV POS_7 | 1 | 27.57 | 6425 | 273 | 2142 |
| VZV POS_8 | 1 | 27.59 | 6485 | 276 | 2187 |
| VZV POS_9 | 1 | 27.67 | 5728 | 266 | 1929 |
| VZV POS_10 | 1 | 27.48 | 7083 | 308 | 2355 |
| VZV POS_11 | 1 | 27.47 | 6770 | 289 | 2255 |
| VZV POS_12 | 1 | 27.85 | 4608 | 225 | 1508 |
| VZV POS_13 | 1 | 27.86 | 5845 | 241 | 1919 |
| VZV POS_14 | 1 | 27.71 | 6184 | 252 | 1980 |
| VZV POS_15 | 1 | 27.46 | 6710 | 292 | 2260 |
| VZV POS_16 | 1 | 27.69 | 6300 | 273 | 2111 |
| VZV POS_17 | 1 | 27.77 | 5391 | 256 | 1782 |
| VZV POS_18 | 1 | 27.56 | 5498 | 278 | 1775 |
| VZV POS_19 | 1 | 28.2 | 5228 | 293 | 1684 |
| VZV POS_20 | 1 | 27.84 | 5783 | 250 | 1967 |

TABLE 7-6

Results, 2 × 2 Table for VZV Clinical Performance Table.

| | | Reference Assay | |
|---|---|---|---|
| | | + | − |
| VZV-specific Primers/Probes | + | 20 | 0 |
| | − | 0 | 20 |
| | Total | 20 | 20 |
| % Positive agreement | | 100.00% | |
| % Negative agreement | | 100.00% | |
| % Overall agreement | | 100.00% | |

Conclusion: The VZV-specific primers and probe show ≥90% clinical concordance with comparator VZV assays. Negative agreement for 20 VZV negative clinical specimens was 100.0%. Positive agreement for 20 VZV positive clinical specimens was 100.0%. The VZV-specific oligomers detected VZV in all samples known to contain VZV and did not detect VZV in any samples known to lack VZV.

Example 8: VZV-Specific Oligomer Reactivity Analysis

The ability to amplify and detect different strains or isolates of VZV and VZV control plasmid were evaluated. 37.5 μM VZV primers (SEQ ID NOs:4 and 19) and 25 μM VZV probe (SEQ ID NO: 11; 5'-Fluorescein, 3' BHQ1, All C modified with 5-Me-dC) were used in the reactions (PPR Mix 8). VZV virus was present in the reactions at 500 cp/reaction. VZV plasmid was present in the reactions at 158, 50, or 15.8 cp/reaction. Positive control plasmid was present in the reactions at 50 cp/reaction.

Samples were processed using the cycles described in Table 8-1 and PPR mix described in Table 8-2.

TABLE 8-1

Cycles.

| Stage | Cycles | Step | Temp (° C.) | Time |
|---|---|---|---|---|
| 1 | 1 | 1 | 95 | 2 min |
| 2 | 45 | 1 | 95 | 8 sec |
| | | 2 | 60 | 25 sec |

TABLE 8-2

PPR Mix.

| Oligo | Units | Stock Conc. | Final Conc. | ×1.25 | μL |
|---|---|---|---|---|---|
| VZV Primers | μM | 37.50 | 0.60 | 0.75 | 58.0 |
| VZV Probe | μM | 25.00 | 0.40 | 0.50 | 58.0 |
| DNA control primers (Table 3) | μM | 37.50 | 0.60 | 0.75 | 58.0 |
| DNA control probe (Table 3) | μM | 25.00 | 0.40 | 0.50 | 58.0 |
| Tris | mM | 1000.00 | 4.00 | 5.00 | 14.5 |
| MgCl$_2$ | mM | 1000.00 | 4.00 | 5.00 | 14.5 |
| KCl | mM | 2000.00 | 65.00 | 81.25 | 117.8 |
| Water | | | | | 2521.2 |
| Total: | | | | | 2900.0 |

TABLE 8-3

VZV strains, *Varicella Zoster* Virus Culture Fluid (Zeptometrix).

| Panel | Sample | Strain | Stock Conc. (cp/ml) | Cp/reaction |
|---|---|---|---|---|
| 1 | VZV plasmid | | | 158 |
| 2 | VZV plasmid | | | 50 |
| 3 | VZV plasmid | | | 15.8 |
| 4 | Lot 307758 | Isolate A | $7.32 \times 10^8$ | 500 |
| 5 | Lot 307484 | Isolate B | $8.36 \times 10^8$ | 500 |
| 6 | Lot 307689 | Isolate D | $1.85 \times 10^9$ | 500 |
| 7 | Lot 309264 (sublot: 514237) | 1700 | $8.41 \times 10^5$ | 500 |
| 8 | Lot 307096 (sublot: 512283) | 275 | $7.32 \times 10^7$ | 500 |
| 9 | Lot 308996 (sublot: 514297) | 82 | $2.03 \times 10^9$ | 500 |
| 10 | Lot 319159 (sublot: 512284) | 9939 | $8.60 \times 10^7$ | 500 |
| 11 | Lot 315128 (sublot: 520858) | Ellen | $9.86 \times 10^8$ | 500 |

TABLE 8-4

Results, FAM channel.

| Sample ID | Ct Count | Avg Count | SD Count | Avg RFU | SD RFU | Avg Estimated Background | SD Estimated Background | Avg T Slope | SD T Slope |
|---|---|---|---|---|---|---|---|---|---|
| Pos Ctrl | 1 | 33.4 | | 43246.0 | | 7263.0 | | 636.0 | |
| Neg Ctrl | | | | | | 7538.0 | | | |
| Panel 1 | 20 | 31.3 | 0.2 | 50038.3 | 2604.7 | 7215.6 | 346.2 | 717.2 | 71.7 |
| Panel 2 | 20 | 33.0 | 0.3 | 47700.3 | 2938.6 | 6899.3 | 489.1 | 600.3 | 118.3 |
| Panel 3 | 20 | 34.7 | 0.6 | 39230.0 | 4653.7 | 6576.0 | 273.9 | 628.0 | 127.6 |
| Panel 4 | 3 | 27.3 | 0.0 | 52961.3 | 1209.5 | 7336.3 | 197.2 | 730.0 | 4.4 |
| Panel 5 | 3 | 28.0 | 0.2 | 52752.0 | 1827.9 | 7243.7 | 230.5 | 759.7 | 186.0 |
| Panel 6 | 3 | 28.8 | 0.1 | 50836.7 | 1875.1 | 6923.7 | 335.0 | 543.3 | 11.1 |
| Panel 7 | 3 | 29.8 | 0.2 | 44459.0 | 1598.9 | 6853.0 | 348.7 | 522.0 | 38.6 |
| Panel 8 | 3 | 28.4 | 0.0 | 49254.7 | 1918.4 | 7013.0 | 358.0 | 651.3 | 25.4 |
| Panel 9 | 3 | 29.3 | 0.1 | 49341.3 | 2261.9 | 7194.0 | 357.1 | 713.0 | 38.7 |
| Panel 10 | 3 | 28.6 | 0.2 | 48780.7 | 671.6 | 6649.3 | 126.5 | 602.7 | 66.3 |
| Panel 11 | 3 | 28.3 | 0.1 | 51232.7 | 514.8 | 6894.0 | 246.3 | 707.3 | 22.7 |

TABLE 8-5

Results, Quasar 705 channel.

| Sample ID | Ct Count | Avg Ct | SD Ct | Avg RFU | SD RFU | Avg Estimated Background | SD Estimated Background | Avg T Slope | SD T Slope |
|---|---|---|---|---|---|---|---|---|---|
| Pos Ctrl | 1 | 26.4 | | 11451.0 | | 3905.0 | | 339.0 | |
| Neg Ctrl | 1 | 26.3 | | 10706.0 | | 3836.0 | | 345.0 | |
| Panel 1 | 20 | 26.6 | 0.1 | 10585.7 | 593.9 | 3518.8 | 211.2 | 305.3 | 18.2 |
| Panel 2 | 20 | 26.5 | 0.1 | 10307.4 | 779.4 | 3323.4 | 302.6 | 311.8 | 17.3 |
| Panel 3 | 20 | 26.5 | 0.1 | 10261.5 | 566.0 | 3518.8 | 194.7 | 322.7 | 17.8 |
| Panel 4 | 3 | 26.4 | 0.1 | 11173.7 | 429.1 | 3822.0 | 153.6 | 346.7 | 16.0 |
| Panel 5 | 3 | 26.4 | 0.1 | 10706.7 | 1037.8 | 3611.7 | 359.4 | 336.0 | 27.5 |
| Panel 6 | 3 | 26.5 | 0.1 | 10721.7 | 628.6 | 3543.7 | 264.9 | 327.0 | 15.9 |
| Panel 7 | 3 | 26.8 | 0.1 | 10099.7 | 458.9 | 3315.3 | 179.3 | 273.3 | 14.6 |
| Panel 8 | 3 | 26.7 | 0.1 | 9904.7 | 486.6 | 3354.0 | 152.9 | 296.0 | 14.7 |
| Panel 9 | 3 | 26.8 | 0.1 | 9783.7 | 619.3 | 3298.3 | 186.7 | 277.3 | 11.6 |
| Panel 10 | 3 | 26.6 | 0.1 | 9550.0 | 182.2 | 3099.7 | 38.6 | 302.0 | 15.1 |
| Panel 11 | 3 | 26.4 | 0.1 | 10237.7 | 81.5 | 3292.7 | 81.1 | 333.7 | 16.7 |

Conclusion: The VZV-specific oligomers are capable of detecting VZV plasmid DNA below 50 cp/rxn and VZV genomic DNA (VZV isolates and/or strains) at 500 cp/rxn. Detection rate was ≥95%. The VZV-specific oligomers in a multiplex reaction with the Control primers and probe are able to amplify and detect both VZV DNA and the control plasmid, even with high VZV positive samples.

Example 9. VZV-Specific Oligomer Specificity and Interference Testing

Specificity of the VZV-specific oligomers was evaluated against 35 organisms commonly found in plasma and serum (specificity analysis. The ability of the VZV-specific oligomers to amplify and detect VZV in the presence of the cross reactants was also evaluated (interference analysis). 37.5 µM VZV primers (SEQ ID NOs:4 and 19) and 25 µM VZV probe (SEQ ID NO:11; 5'-Fluorescein, 3' BHQ1, All C modified with 5-me-dC) were used in the reactions (PPR Mix 8).

Samples were processed using the cycles described in Table 9-1 and PPR mix described in Table 9-2.

TABLE 9-1

Cycles.

| Stage | Cycles | Step | Temp (° C.) | Time |
|---|---|---|---|---|
| 1 | 1 | 1 | 95 | 2 min |
| 2 | 45 | 1 | 95 | 8 sec |
| | | 2 | 60 | 25 sec |

TABLE 9-2

PPR Mix.

| Oligo | Units | Stock Conc. | Final Conc. | ×1.25 | µL |
|---|---|---|---|---|---|
| VZV Primers | µM | 37.50 | 0.60 | 0.75 | 58.0 |
| VZV Probe | µM | 25.00 | 0.40 | 0.50 | 58.0 |
| DNA control primers (Table 3) | µM | 37.50 | 0.60 | 0.75 | 58.0 |

TABLE 9-2-continued

| PPR Mix. | | | | | |
|---|---|---|---|---|---|
| Oligo | Units | Stock Conc. | Final Conc. | ×1.25 | μL |
| DNA control probe (Table 3) | μM | 25.00 | 0.40 | 0.50 | 58.0 |
| Tris | mM | 1000.00 | 4.00 | 5.00 | 14.5 |
| MgCl$_2$ | mM | 1000.00 | 4.00 | 5.00 | 14.5 |
| KC1 | mM | 2000.00 | 65.00 | 81.25 | 117.8 |
| | | | | Water | 2521.2 |
| | | | | Total: | 2900.0 |

TABLE 9-3

Panel Preparation. Panels are prepared at 10× concentration.

| Panel | Organism | Stock Concentration | (10×) Panel Concentration |
|---|---|---|---|
| 1 | BK Virus Culture Fluid | $1.57 \times 10^{10}$ cp/ml | $1.00 \times 10^7$ |
| | Cytomegalovirus AD-169 Cell culture | $4.17 \times 10^5$ TCID50/ml | $1.00 \times 10^5$ |
| | Epstein-Barr Virus (EBV) | $7.70 \times 10^7$ cp/ml | $1.00 \times 10^7$ |
| 2 | Candida albicans (CBS 562) | $1.00 \times 10^8$ CFU/ml | $1.00 \times 10^7$ |
| | Chlamydia trachomatis (BOUR) | $1.38 \times 10^8$ IFU/ml | $1.00 \times 10^7$ |
| | HIV Type 1 (HIV-1) (B) | $5.42 \times 10^9$ cp/ml | $1.00 \times 10^7$ |
| 3 | Dengue Virus Type 1 (Hawaii) | $1.70 \times 10^5$ TCID50/ml | $5.00 \times 10^4$ |
| | Dengue Virus Type 2 (New Guinea C) | $3.55 \times 10^5$ TCID50/ml | $5.00 \times 10^4$ |
| | Dengue Virus Type 3 (H87) | $1.15 \times 10^7$ TCID50/ml | $1.43 \times 10^6$ |
| 4 | Herpes Simplex Virus Type 2 (HSV-2) (MS) | $1.10 \times 10^6$ TCID50/ml | $1.43 \times 10^5$ |
| | HIV Type 2 (HIV-2) (NIH-Z) | $1.86 \times 10^4$ TCID50/ml | $1.00 \times 10^4$ |
| | HPV purified plasmid DNA (18) | $1.00 \times 10^{12}$ cp/ml | $1.00 \times 10^7$ |
| 5 | Human Herpes Virus Type 6A (HHV-6A) (GS) | $1.06 \times 10^{10}$ cp/ml | $1.00 \times 10^7$ |
| | Human Herpes Virus Type 6B (HHV-6B) (Z29) | $4.22 \times 10^8$ cp/ml | $1.00 \times 10^7$ |
| | Human Herpes Virus Type 7 (HHV-7) (SB) | $1.15 \times 10^7$ TCID50/ml | $1.00 \times 10^6$ |
| 6 | Human T-Lymphotropic Virus Type I (HTLV-I) | $4.79 \times 10^8$ vp/ml | $1.00 \times 10^7$ |
| | Human T-Lymphotropic Virus Type II (HTLV-II) | $1.02 \times 10^9$ vp/ml | $1.00 \times 10^7$ |
| | Human Hepatitis B Virus (HBV) | $2.80 \times 10^5$ cp/ml | $1.00 \times 10^5$ |
| 7 | Mycobacterium smegmatis (W-113) | $1.00 \times 10^8$ CFU/ml | $1.00 \times 10^7$ |
| | Neisseria gonorrhoeae (NCTC 8375) | $1.00 \times 10^8$ CFU/ml | $1.00 \times 10^7$ |
| | Propionibacterium acnes (NCTC 737) | $1.00 \times 10^8$ CFU/ml | $1.00 \times 10^7$ |
| 8 | West Nile Virus (WNV) (NY 2001-6263) | $5.00 \times 10^4$ cp/ml | $1.00 \times 10^4$ |
| | Vaccinia Virus Culture Fluid | $5.37 \times 10^8$ TCID50/ml | $1.00 \times 10^7$ |
| | Trichomonas vaginalis (JH 31A #4) | $3.00 \times 10^6$ cells/ml | $1.00 \times 10^6$ |
| 9 | Staphylococcus epidermidis (RP62A) | $1.00 \times 10^8$ CFU/ml | $1.00 \times 10^7$ |
| | Human Parvovirus (B19) | $2.00 \times 10^9$ cp/ml | $1.00 \times 10^7$ |
| 10 | Hepatitis A virus (HM175) | $3.78 \times 10^9$ cp/ml | $1.00 \times 10^7$ |
| | Dengue Virus Type 4 (H241) | $1.15 \times 10^7$ TCID50/ml | $5.00 \times 10^6$ |
| | HPV synthetic DNA (16) | $5.45 \times 10^5$ cp/ml | $1.00 \times 10^4$ |
| 11 | Human Herpes Virus Type 8 (HHV-8) | $1.81 \times 10^9$ cp/ml | $1.00 \times 10^7$ |
| | Human Hepatitis C Virus (HCV) | $3.80 \times 10^5$ cp/ml | $1.00 \times 10^5$ |
| | Staphylococcus aureus (NCTC 8532) | $1.00 \times 10^8$ CFU/ml | $1.00 \times 10^7$ |
| 12 | HSV-1 Strain (MacIntryre) | $6.80 \times 10^6$ TCID50/ml | $1.00 \times 10^6$ |
| | Mycobacterium gordonae (L. Wayne W-1609) | $2.10 \times 10^{11}$ cp/ml | $1.00 \times 10^7$ |
| 13 | Measles Virus | $1.26 \times 10^6$ TCID50/ml | $1.00 \times 10^5$ |
| | Mumps Virus | $1.95 \times 10^7$ TCID50/ml | $1.00 \times 10^6$ |
| 14 | Adenovirus 7 | $6.61 \times 10^6$ TCID50/ml | $1.00 \times 10^6$ |
| | Adenovirus 4 | $1.70 \times 10^5$ TCID50/ml | $1.00 \times 10^5$ |

Specificity Reactions contained 60 μL Panel stock and 540 μL diluent.

Interference Reactions contained 60 μL Panel stock, 60 μL VZV and 480 μL diluent.

TABLE 9-4

Results of the Specificity Panel, FAM channel.

| Panel | Count of Ct | Avg Ct | SD Ct | Avg RFU | SD RFU | Avg T Slope | SD T Slope | Avg EB | SD EB |
|---|---|---|---|---|---|---|---|---|---|
| 1 | N/A | N/A | N/A | 49 | | N/A | | 6764.67 | 162.65 |
| 2 | N/A | N/A | N/A | 59 | | N/A | N/A | 7060.67 | 392.89 |
| 3 | N/A | N/A | N/A | N/A | N/A | N/A | N/A | 7221.33 | 58.69 |
| 4 | N/A | N/A | N/A | N/A | N/A | N/A | N/A | 6643 | 204.21 |
| 5 | N/A | N/A | N/A | N/A | N/A | N/A | N/A | 6680 | 164.65 |
| 6 | N/A | N/A | N/A | 67 | | N/A | N/A | 6883 | 265.99 |

TABLE 9-4-continued

Results of the Specificity Panel, FAM channel.

| Panel | Count of Ct | Avg Ct | SD Ct | Avg RFU | SD RFU | Avg T Slope | SD T Slope | Avg EB | SD EB |
|---|---|---|---|---|---|---|---|---|---|
| 7 | N/A | N/A | N/A | N/A | N/A | N/A | N/A | 6721.33 | 94.87 |
| 8 | N/A | N/A | N/A | 70.5 | 4.95 | N/A | N/A | 6568.67 | 158.75 |
| 9 | N/A | N/A | N/A | 43 | | N/A | N/A | 6645.33 | 421.99 |
| 10 | N/A | N/A | N/A | N/A | N/A | N/A | N/A | 6560.33 | 366.53 |
| 11 | N/A | N/A | N/A | 67 | | N/A | N/A | 7374.67 | 407.24 |
| 12 | N/A | N/A | N/A | N/A | N/A | N/A | N/A | 7375 | 229.66 |
| 13 | N/A | N/A | N/A | N/A | N/A | N/A | N/A | 6923 | 133.37 |
| 14 | N/A | N/A | N/A | 83 | | N/A | N/A | 6783 | 237.42 |

EB = Estimated Background

TABLE 9-5

Results of the Specificity Panel, Quasar 705 channel.

| Panel | Count of Ct | Avg Ct | SD Ct | Avg RFU | SD RFU | Avg T Slope | SD T Slope | Avg EB | SD EB |
|---|---|---|---|---|---|---|---|---|---|
| 1 | 3 | 27.13 | 0.032 | 8117.00 | 114.69 | 395.67 | 10.41 | 2670.33 | 35.53 |
| 2 | 3 | 26.83 | 0.067 | 8779.00 | 727.46 | 265.67 | 7.57 | 2914.67 | 281.55 |
| 3 | 3 | 27.27 | 0.050 | 9820.33 | 251.08 | 363 | 12.49 | 3257.67 | 53.90 |
| 4 | 3 | 26.84 | 0.097 | 10553.33 | 774.02 | 262 | 8.54 | 3500.33 | 338.91 |
| 5 | 3 | 26.39 | 0.061 | 11330.67 | 159.06 | 328.67 | 11.59 | 3870.33 | 34.53 |
| 6 | 3 | 26.42 | 0.096 | 10962.33 | 508.26 | 330.33 | 17.01 | 3706.33 | 167.02 |
| 7 | 3 | 26.72 | 0.12 | 9962.33 | 490.39 | 277 | 15.52 | 3456.33 | 161.50 |
| 8 | 3 | 26.93 | 0.098 | 9923.33 | 380.34 | 250.67 | 10.02 | 3324 | 123.36 |
| 9 | 3 | 26.49 | 0.012 | 10244.67 | 376.50 | 314.67 | 1.15 | 3457.67 | 157.89 |
| 10 | 3 | 27.35 | 0.087 | 9284.33 | 656.44 | 342.33 | 19.35 | 3144.67 | 177.72 |
| 11 | 3 | 26.43 | 0.046 | 10900 | 415.79 | 328 | 6.08 | 3650.33 | 141.75 |
| 12 | 3 | 26.47 | 0.064 | 10114 | 555.33 | 319.67 | 14.50 | 3455.67 | 166.37 |
| 13 | 3 | 26.53 | 0.047 | 9730.67 | 83.19 | 310 | 9.64 | 3284.67 | 7.09 |
| 14 | 3 | 30.54 | 0.11 | 8513 | 292.50 | 309 | 17.06 | 3234.67 | 45.79 |

EB = Estimated Background

TABLE 9-6

Results of the Interference Panel, FAM channel.

| Panel | Count of Ct | Avg Ct | SD Ct | Avg RFU | SD RFU | Avg T Slope | SD T Slope | Avg EB | SD EB |
|---|---|---|---|---|---|---|---|---|---|
| 1 | 3 | 25.98 | 0.051 | 48151.67 | 1904.13 | 623.33 | 223.17 | 6599.33 | 274.74 |
| 2 | 3 | 26.48 | 0.040 | 50025.33 | 745.60 | 646.67 | 16.56 | 7447.67 | 231.39 |
| 3 | 3 | 26.78 | 0.049 | 46483.33 | 2849.48 | 537 | 8.89 | 6861.33 | 442.66 |
| 4 | 3 | 26.59 | 0.058 | 47948 | 1602.99 | 606 | 27.07 | 6996.33 | 213.12 |
| 5 | 3 | 27.10 | 0.060 | 50583.33 | 1478.14 | 828.33 | 27.54 | 7387.33 | 113.18 |
| 6 | 3 | 26.32 | 0.087 | 51750 | 3581.09 | 727.33 | 40.50 | 7372.67 | 206.10 |
| 7 | 3 | 26.49 | 0.026 | 49098 | 409.94 | 638 | 10.82 | 7228 | 38.16 |
| 8 | 3 | 26.37 | 0.061 | 49644.67 | 3231.01 | 694.67 | 22.28 | 6846 | 833.94 |
| 9 | 3 | 26.59 | 0.026 | 48667.67 | 1275.89 | 595.67 | 11.37 | 6855 | 261.57 |
| 10 | 3 | 26.58 | 0.056 | 47097 | 463.97 | 554.33 | 15.63 | 6557.33 | 187.79 |
| 11 | 3 | 26.27 | 0.16 | 46546.67 | 3282.16 | 712.33 | 104.01 | 6124.67 | 459.74 |
| 12 | 3 | 25.98 | 0.071 | 47984.67 | 1545.70 | 630.67 | 212.50 | 6650.33 | 159.38 |
| 13 | 3 | 26.19 | 0.11 | 47457 | 621.72 | 800.67 | 73.00 | 6207.33 | 351.03 |
| 14 | 3 | 27.07 | 0.021 | 42420.67 | 351.80 | 876 | 13.86 | 6190.33 | 28.59 |

EB = Estimated Background

TABLE 9-7

| Panel | Count of Ct | Avg Ct | SD Ct | Avg RFU | SD RFU | Avg T Slope | SD T Slope | Avg EB | SD EB |
|---|---|---|---|---|---|---|---|---|---|
| 1 | 3 | 26.97 | 0.065 | 9304.67 | 325.21 | 309.67 | 96.50 | 3000.67 | 106.40 |
| 2 | 3 | 26.85 | 0.050 | 9685.67 | 85.76 | 266.67 | 3.79 | 3339.67 | 38.14 |
| 3 | 3 | 27.15 | 0.055 | 9703 | 799.51 | 395.67 | 13.32 | 3266.33 | 245.65 |
| 4 | 3 | 26.96 | 0.099 | 9544.33 | 589.19 | 313.33 | 91.51 | 3211.33 | 183.88 |
| 5 | 3 | 26.61 | 0.080 | 10240.67 | 263.21 | 299 | 12.53 | 3457 | 59.63 |
| 6 | 3 | 26.54 | 0.17 | 10456.67 | 840.16 | 313 | 25.24 | 3515.33 | 269.97 |
| 7 | 3 | 26.78 | 0.021 | 9335 | 180.41 | 273 | 3.46 | 3206.33 | 90.01 |
| 8 | 3 | 27.02 | 0.12 | 9412.33 | 897.83 | 361.67 | 90.92 | 3020 | 463.43 |
| 9 | 3 | 26.62 | 0.015 | 9441 | 231.66 | 299.33 | 3.79 | 3118.67 | 83.53 |
| 10 | 3 | 27.20 | 0.038 | 10840.33 | 94.21 | 374.67 | 8.33 | 3699.67 | 49.52 |
| 11 | 3 | 26.45 | 0.13 | 9913.67 | 476.94 | 334.67 | 27.61 | 3247.67 | 249.28 |
| 12 | 3 | 26.46 | 0.061 | 9641.33 | 523.33 | 323 | 10.58 | 3295 | 193.78 |
| 13 | 3 | 26.49 | 0.11 | 9831 | 617.31 | 327.67 | 17.93 | 3234.33 | 312.52 |
| 14 | 3 | 30.56 | 0.23 | 8202.67 | 383.47 | 305 | 37.32 | 3070.33 | 96.62 |

EB = Estimated Background

Conclusion: The VZV-specific primers and probe had 100% specificity when tested with panels of microorganisms commonly found in plasma, serum, and lesion swabs. The VZV-specific primers and probe also had a 100% detection rate of VZV when VZV was present at a concentration of less than or equal to $1.5 \times 10^3$ copies/mL is the presence of microorganisms commonly found in plasma, serum, and lesion swabs. The VZV-specific primers and probe are robust and specific to VZV EBNA1. The VZV-specific Primers and Probe are able to detect VZV in the presence of potential interfering organisms at 1500 cp/rxn without significantly affecting Ct or RFU.

SEQUENCES

In the following table, IUPAC nucleotide codes are used to identify degenerate (mixed) positions (Y=C or T, R=A or G, W=A or T, S=G or C, K=G or T, M=A or C, etc.) in which individual molecules in a composition or kit may have any of the nucleotides corresponding to the IUPAC code.

| SEQ ID NO: | type | SEQ (5' → 3') |
|---|---|---|
| 1 | Forward | TTGCTTCCCCACACCGTTTA |
| 2 | Forward | GCGGTATTCTGTAAAGGATCTCC |
| 3 | Forward | CTACTTTTATCGCGGCTTGTTG |
| 4 | Forward | CCAAAACTAACAAAGCCGGGA |
| 5 | Forward | CTTGCTTCGTCGCTGAAATCC |
| 6 | Forward | GTAAAACGCACATGGCTGTGT |
| 7 | Forward | GGGCCTGAATTATACTTGGA |
| 8 | Probe | GGATCTCCACGTAGCAAAGCTACAC |
| 9 | Probe | GCTACACTTTTGCATCAGCCTCCAC |
| 10 | Probe | GCGCGCATACCCGGAAGTTCTTC |
| 11 | Probe | CGAGTGGTAGCGTCTACCCGACC |
| 12 | Probe | GGTCGGGTAGACGCTACCACTCG |
| 13 | Probe | GCCAACATCCCATATCTTAAACAGACC |
| 14 | Probe | CATCTGTGCGCTCAATAACCTCAACG |
| 15 | Probe | TGCAAAATCCAATACGACCACCGG |
| 16 | Reverse | CGTTCGAGAACGCATCCCTT |
| 17 | Reverse | CGAGAACGCATCCCTTATGTTA |
| 18 | Reverse | CTATGCGCAAGGCTATTAG |
| 19 | Reverse | GTGATAACTTTCACCCGGAGTTG |
| 20 | Reverse | GGGCGTTTATTATGGAGAAAC |

| SEQ ID NO: | type | SEQ (5' → 3') |
|---|---|---|
| 21 | Reverse | GGAGACAAGAACGCTTTTC |
| 22 | Reverse | GGATATAAAGGAGCCAGGGTT |
| 23 | Forward | TCCAAAGCATGGCATACTAC |
| 24 | Forward | GGCATACTACCAATGACACG |
| 25 | Forward | GAAAACACTAATCATTCACCAC |
| 26 | Forward | CAATAGTTAGTTTAAATGGGTCC |
| 27 | Forward | CTAGACTACAGTGAAATTCAACG |
| 28 | Probe | ATGATGCAATTCACCGACGTGCC |
| 29 | Probe | AGATCCCGACGAAGCGTGCCAG |
| 30 | Probe | CTGGCACGCTTCGTCGGGATCT |
| 31 | Probe | CCATGCGTGGCTAATCACAAGCGA |
| 32 | Probe | GGTTGTGCAATATGATAGCGGAACGGC |
| 33 | Probe | GCCGTTCCGCTATCATATTGCACAACC |
| 34 | Reverse | GATCTGGCTTCAACTTCCTC |
| 35 | Reverse | TGTTCTATTGGCACGCAACTC |
| 36 | Reverse | CATAATATACGTAGTGATGCCC |
| 37 | Reverse | GTCCCTGGAAAAACTGAGCC |
| 38 | ORF28 | TTTACTGTAAAATGTGTGACCTTAACTTTGATGGAGAATTGCTTTTGGAATACAAAAGACTCT ACGCATTATTTGATGACTTTGTTCCTCCTCGGTGATTTCAGCTTCAGTGTTCATTTTATTATCCC AGCACGGGCGTGTATACAAACAAAGCCTGCCGCCTGCAAGCGGTTTAGCATTTTAACGTTA ACAACTCGTGTCTCTGGAATAAAACGTTTTAAAAGCCGTTCTGTGAGTTTAGTGTCGTTTCCA AATAACGCCTTAAAAGTTACACTCGCCGTCCCAATGAGATGAGAAAAATAATAGTCAATGTTT AAAGACAGCCCGTGTGATGTTACGTGAATGGGATCTTCCGCTAAGTCAGATATTATTAACTTA CGCTTTGCTTCCCCACACCGTTTACCTGCGGTATTCTGTAAAGGATCTCCACGTAGCAAAGCT ACACTTTTTGCATCAGCCTCCACTTCGTCTGTGGGGGCCACAATAACATAAGGGATGCGTTCT CGAACGTTTGGGATTTGACCCTGTCTCATTACTAATTTATAATATACTGTTAAGTGAGCCAAG CGACGGTTTATGTAGGCGGATGGTGGACGACTAAGCTCGGCCGTCATAACAAACTTATTAAT ATCCAATTTGGGTGATGTAATCTGGCGATGTGCATCTGCAATTATGCGTCCAAACCCGGCCAT CCCAGACGGCATGGCCCGTCTATTCCATTCAGCAATGGAAACACACGACGCCTCCGCCGCAG CACGCGAGACGGTGTCGTCTATATAACAACAGTTCTACAAGTTTGCGGGCATAATCGTTAATA AATTGACAGTTGTTTTTTCTAACCAAGTCGACTCCCTTCATTAAAACCTTTCCGCCGTAAATTA CCCCAATGTACTTTTTCTTTGTTATAAGCAAAAGTTTTATAAAAGTTTTTTCACACTCCAACTTT ATAGGAGGACAAAACAGAGCCGTTGAAATTATATGTGCCATTTCTCGCCGATTTTAGCTATC CCCTCAACACTAACACCCTTGAATCGGATAAACACAGAATCCGTATCTCCATATATAACCTTTA CCTCGTACGCTTTTTGGGAGAGAACGCTACTTTCAATGTCTGGAAACGCTGTAATAAAACGTT CAAATGCGGCCCAGTTATTATGAATATAATCTCTGGTACTTAATAACATTTGACGGCCAATTG TAGTGACAGTGGCCGCTACGTATAAACATGGCAGAAATCCCTGCGCAACTCCAGTAAAACCG TACACGGAATTACAAACTACTTTTATCGCGGCTTGTTGTTTGTCTAATAACACTGCTTCATCTG AAGAACTTCCGGGTATGCGCGCTCTAATAGCCTTGCGCATAGCCAACCAGTCTTTTAAAGA ACACCCAGCAGACTTTCTCGAACGTTAGAGCGCACAAAAAAAGACGTTTTCCTCCAACTGTA AAGGTGGCATAATCGGATGGATTCAAACGTTTAACCGTCTCAAAATTTAACGTTAGCGTGGT AAAACATAAGTTATGGGCCTGAATTATACTTGGATATAAACTTGCAAAATCCAATACGACCAC CGGATCGATATAAAATCCCGTATCAGGGTCAAAAACCCTGGCTCCTTTATATCCTACATTTCG CCCACTTGACGTACCAGTGGGAGAAACGCTCTCGTCTTCATCCATCTCTTCCTCAACATCCCCG ACATCGGGAATAACATCCTTATATTCAAAAGTAGCTGGGTATCCCCATCGGGTAAAATAAAT CCTCGAGACGAAGCCAGTCCTAATAAACAGGTGTAAATCCTAACCTGCTGTCCGTCGTAAAT AGCCTTGGTTAAAGTAATTCTAGCTAGCCTTGCAACCGCGGATAACTCAAGGTGTGGTAAAT ATTTAAAAAACAGTTTCCCCACAAGAGCCGAGTCTTGTATACAATATTCACCAATAATTCCTC GTGTATTCGGTCCACTAGCGTAATATCCCGGAATGTCTTTGTAGGGCAAATCTCTCTTGGACT CATTTAGAGCTTCACGTGCAACCGAATCTAATTTATAACTCGAGAGTTTTAATTTTTCAGTTGC AATTGCATACATATCCAGAGATATGAGACCGTTGATCTTTACCTTGCTTCGTCGCTGAAATCC GGATTTGCCAACATCCCATATCTTAAACAGACCCCCACGGTTTATACTGCCATAACCATCAAG CTTGAGACTGTATATAGAATTAAGTTTCTCCATAATAAACGCCCAATCAAAATTAACAATGTT ATAACCTGTGGCAAACTCGGAGCGTACTGTTTTACGAGGGTCATAAATGCAATTAATAGCT CGAATTCACTATCAAACTCCAGCACAGTCGGCTCCGGTAACCCCGCGTCCTTCATTTCTTGTAC ATACCTTTGTGGTAAGTCACAAGAGCCAAGGGAAAACAGTAAAATGTGTTCTAAAGACTGTC GAGGGATTGAATATAATAGACAAGAATTTG GATTACAAGATCCTCCAGATGTGTTGCATCG GGAAACGCCAGCTCATTAGATCCTCCTGATTTACATTCAATATCGAAACATAACAACTTGTAG |

| SEQ ID NO: | type | SEQ (5' → 3') |
|---|---|---|
| | | TCAGGCCATGAGTCATCGTTTGGTATAGCCTGCAGATTATCCGACATGCAGTCAATTTCAACG<br>TCGCTTAACGTTAATTGGCGACTTGCCGGTCGAACTCGAACACGTTCCCCATCAACTCCAGGT<br>TTTAGTTGATACCAACCAAAACTAACAAAGCCGGGATTATCCATTAGAAAACGAGTGGTAGC<br>GTCTACCCGACCTTCATACTTTTTCAACTCCGGGTGAAAGTTATCACAAAGATAATTTGTAAAT<br>TTAGATG AGGGAGAATACACCCTGTAAAACGCACATGGCTGTGTATCGTAGTAATAAACATC<br>TGTGCGCTCAATAACCTCAACGCGAAAGCTTTCTGGAGATGCGCTTTTAAACGAGGTACCAT<br>GAAAAGCGTTCTTGTCTCCATTTAACGTTGCATCATTTTGTGTTATCATAGAACTGCGTAAACA<br>CTCGGCAAGTAATACAGATAACTCGCTACCGGAACGTATGCCACAAGCGGTATCCACCTCGG<br>CTTTGTTTATATAAAAATATTGACAGATGCCGTATACATGAACTGCCACCCTTTTTCCACATCG<br>GGACATGCCAAGTAAAGTAATAACGGTACCAAGCGGTCGTGTTGCAGTTGCAAACCGGGAT<br>ACATCTCCATTAGACGCGGCTTCTGTTGTTTCGACAATATCATATACATGGAATGTGTTAAAG<br>CGGGGGTCAAACTTATCCCCACGAAAGTCGATTTCCCCCAAATATTCACGCGTCTAGGCCA<br>GGGGCTGGAACAACGAAAATCCAGAATCGGAACTTCTTTTCCATTACAGTAAACTTTAGGCG<br>GTCGACTAAGTGTACCGACGTGAACCCCCTTTCGTTCTTCCATGGGCACATCTTCATCTAAAC<br>ATTTAGGGGCCAAAAATTGAAACGATGACATGGTAGTTTTGTAACTATGAAGAAATTCTCTG<br>TTACTACCGCGCCCGGTTCTTGGGTTATATTTAATCCCTGATGCTTGGGTTAAAAAGGGATTA<br>CAAAACCCCGTTCTGATCGCCATTTTA |
| 39 | ORF31 | ATGTCCCCTTGTGGCTATTATTCAAAGTGGAGAAACAGGGATCGACCAGAATACCGTCGTAA<br>TCTACGATTCAGACGTTTTTTCTCTTCTATACACCCTAATGCAGCGGCTGGCTCCGGATTCAAC<br>GGACCCGGCGTTTTCATAACCTCCGTTACGGGGGTGTGGTTATGCTTTTTATGCATATTTTCT<br>ATGTTTGTTACGGCGGTTGTGTCGGTCTCTCCAAGCTCGTTTTATGAGAGTTTACAAGTAGAG<br>CCCACACAATCAGAAGATATAACCCGGTCTGCTCATCTGGGCGATGGTGATGAAATCAGAGA<br>AGCTATACACAAGTCCCAGGACGCCGAAACAAAACCCACGTTTTACGTCTGCCCACCGCCAA<br>CAGGCTCCACAATCGTACGATTAGAACCAACTCGGACATGTCCGGATTATCACCTTGGTAAA<br>AACTTTACAGAGGGTATTGCTGTTGTTTATAAAGAAAACATTGCAGCGTACAAGTTTAAGGC<br>GACGGTATATTACAAAGATGTTATCGTTAGCACGGCGTGGGCCGGAAGTTCTTATACGCAAA<br>TTACTAATAGATATGCGGATAGGGTACCAATTCCCGTTTCAGAGATCACGGACACCATTGATA<br>AGTTTGGCAAGTGTTCTTCTAAAGCAACGTACGTACGAAATAACCACAAAGTTGAAGCCTTTA<br>ATGAGGATAAAAATCCACAGGATATGCCTCTAATCGCATCAAAATATAATTCTGTGGGATCC<br>AAAGCATGGCATACTACCAATGACACGTACATGGTTGCCGGAACCCCCGGAACATATAGGAC<br>GGGCACGTCGGTGAATTGCATCATTGAGGAAGTTGAAGCCAGATCAATATTCCCTTATGATA<br>GTTTTGGACTTTCCACGGGAGATATAATATACATGTCCCGTTTTTTGGCCTACGGGATGGTG<br>CATACAGAGAACATTCCAATTATGCAATGGATCGTTTTCACCAGTTTGAGGGTTATAGACAAA<br>GGGATCTTGACACTAGAGCATTACTGGAACTGCCAGCGCGGAACTTTTTAGTCACGCCTCATT<br>TAACGGTTGGTTGGAACTGGAAGCCAAAACGAACGGAAGTTTGTTCGCTTGTCAAGTGGCG<br>TGAGGTTGAAGCGTAGTTCGCGATGAGTATGCACACAATTTTCGCTTTACAATGAAAACAC<br>TTTCTACCACGTTTATAAGTGAAACAAACGAGTTTAATCTTAACCAAATCCATCTCAGTCAATG<br>TGTAAAGGAGGAAGCCCGGGCTATTATTAACCGGATCTATACAACCAGATACAACTCATCTC<br>ATGTTAGAACCGGGGATATCCAGACCTACCTTGCCAGAGGGGGGTTTGTTGTGGTGTTTCAA<br>CCCCTGCTGAGCAATTCCCTCGCCCGTCTCTATCTCCAAGAATTGGTCCGTGAAAACACTAAT<br>CATTCACCACAAAACACCCGACTCGAAATACCAGATCCCGACGAAGCGTGCCAGTTGAGTT<br>GCGTGCCAATAGAACAATAACAACCACCTCATCGGTGGAATTTGCTATGCTCCAGTTTACATA<br>TGACCACATTCAAGAGCATGTTAATGAAATGTTGGCACGTATCTCCTCGTCGTGGTGCCAGCT<br>ACAAAATCGCGAACGCGCCCTTTGGAGCGGACTATTTCCAATTAACCCAAGTGCTTTAGCGA<br>GCACCATTTTGGATCAACGTGTTAAAGCTCGTATTCTCGGCGACGTTATCTCCGTTTCTAATTG<br>TCCAGAACTGGGATCAGATACACGCATTATACTTCAAAACTCTATGAGGGTATCTGGTAGTAC<br>TACGCGTTGTTATAGCCGTCCTTTAATTTCAATAGTTAGTTTAAATGGGTCCGGGACGGTGGA<br>GGGCCAGCTTGAACAGATAACGAGTTAATTATGTCCAGAGATCTGTTAGAACCATGCGTGG<br>CTAATCACAAGCGATATTTTCTATTTGGGCATCACTACGTATATTATGAGGATTATCGTTACGT<br>CCGTGAAATCGCAGTCCATGATGTGGGAATGATTAGCACTTACGTAGATTTAAACTTAACACT<br>TCTTAAAGATAGAGAGTTTATGCCGCTGCAAGTATATACAAGAGACGAGCTGCGGGATACA<br>GGATTACTAGACTACAGTGAAATTCAACGCCGAAATCAAATGCATTCGCTGCGTTTTTATGAC<br>ATAGACAAGGTTGTGCAATATGATAGCGGAACGGCCATTATGCAGGGCATGGCTCAGTTTTT<br>CCAGGGACTTGGGACCGCGGGCCAGGCCGTTGGACATGTGGTTCTTGGGGCCACGGGAGC<br>GCTGCTTTCCACCGTACACGGATTTACCACGTTTTTATCTAACCCATTTGGGGCATTGGCCGT<br>GGGATTATTGGTTTTGGCGGGACTGGTAGCGGCCTTTTTTGCGTACCGGTACGTGCTTAAAC<br>TTAAAACAAGCCCGATGAAGGCATTATATCCACTCACAACCAAGGGGTTAAAACAGTTACCG<br>GAAGGAATGGATCCCTTTGCCGAGAAACCCAACGCTACTGATACCCCAATAGAAGAAATTGG<br>CGACTCACAAAACACTGAACCGTCGGTAAATAGCGGGTTTGATCCCGATAAATTTCGAGAAG<br>CCCAGGAAATGATTAAATATATGACGTTAGTATCTGCGGCTGAGCGCCAAGAATCTAAAGCC<br>CGCAAAAAAATAAGACTAGCGCCCTTTTAACTTCACGTCTTACCGGCCTTGCTTTACGAAAT<br>CGCCGAGGATACTCCCGTGTTCGCACCGAGAATGTAACGGGGGTGTAAATAGCCAGGGGGT<br>TTGTTTTAATTTATTAATAAA |

The invention claimed is:

1. A composition for amplifying a Varicella-Zoster Virus (VZV) target nucleic acid sequence and detecting an amplified VZV target nucleic acid sequence comprising:
 (a) a forward amplification primer 19-50 nucleobases in length and comprising the nucleobase sequence of SEQ ID NO: 1, 2, 3, 4, 5, 6, or 7; and
 (b) a reverse amplification primer 19-50 nucleobases in length and comprising the nucleobase sequence of SEQ ID NO: 16, 17, 18, 19, 20, 21, or 22, wherein:
  (i) (a) comprises SEQ ID NO: 1 and (b) comprises SEQ ID NO: 16 or 17;
  (ii) (a) comprises SEQ ID NO: 2 and (b) comprises SEQ ID NO: 17;
  (iii) (a) comprises SEQ ID NO: 3 and (b) comprises SEQ ID NO: 18;
  (iv) (a) comprises SEQ ID NO: 4 and (b) comprises SEQ ID NO: 19;
  (v) (a) comprises SEQ ID NO: 5 and (b) comprises SEQ ID NO: 20;
  (vi) (a) comprises SEQ ID NO: 6 and (b) comprises SEQ ID NO: 21; or
  (vii) (a) comprises SEQ ID NO: 7 and (b) comprises SEQ ID NO: 22; and
 (c) a detection probe comprising a detectable label.

2. The composition of claim 1, wherein the detection probe is 20-50 nucleobases in length and comprises the nucleobase sequence of SEQ ID NO: 8, 9, 10, 11, 12, 13, 14, or 15.

3. The composition of claim 2, wherein the forward amplification primer, the reverse amplification primer, and/or the detection probe comprises at least one modified nucleotide.

4. The composition of claim 3, wherein the at least one modified nucleotide comprises: a 2'-O-methyl modified nucleotide, a 2'-fluoro modified nucleotide, or a 5-methylcytosine.

5. The composition of claim 2, wherein the detectable label is selected from the group consisting of:
 (a) a chemiluminescent label;
 (b) a fluorescent label;
 (c) a quencher;
 (d) a combination of two or more of (a), (b), and (c); or
 (e) a combination of (b) and (c).

6. The composition of claim 2, wherein the detection probe comprises a 5' non-target-hybridizing sequence that base pairs with the 3' end of the detection probe or a 3' non-target-hybridizing sequence that base pairs with the 5' end of the detection probe.

7. The composition of claim 6, wherein the detection probe comprises a molecular beacon or a molecular torch.

8. The composition of claim 1, further comprising one or more of: buffer, salt, dNTPs, detergent, and enzyme.

9. The composition of claim 8, wherein the enzyme comprises: a thermostable DNA polymerase, a reverse transcriptase, an RNA polymerase, or a combination of any two or more of a thermostable DNA polymerase, a reverse transcriptase, and an RNA polymerase.

10. The composition of claim 1, wherein the forward amplification primer and the reverse amplification primer are in aqueous solution, frozen, or lyophilized.

11. The composition of claim 1, wherein the composition comprises two or more pairs of amplification primers and/or two or more detection probes, wherein each pair of amplification primers consists of a forward amplification primer and a reverse amplification primer.

12. The composition of claim 11, wherein the two or more pairs of amplification primers and/or two or more detection probes amplify target nucleic acid sequences in the same or different organisms.

13. The composition of claim 1, further comprising an internal control target nucleic acid sequence, oligomers for amplifying and/or detecting an internal control target nucleic acid sequence, or a combination thereof.

14. A method for amplifying a VZV target nucleic acid sequence and detecting an amplified VZV target nucleic acid sequence comprising:
 (a) obtaining a sample containing or suspected of containing the VZV target nucleic acid sequence;
 (b) contacting the sample with the composition of claim 1; and
 (c) providing conditions sufficient to amplify the target nucleic acid sequence, thereby producing an amplification product of the VZV target nucleic acid sequence if the VZV target nucleic acid sequence is present in the sample.

15. The method of claim 14, wherein the detection probe comprises an oligonucleotide comprising the nucleobase sequence of SEQ ID NO: 8, 9, 10, 11, 12, 13, 14, 15, 28, 29, 30, 31, 32, or 33.

\* \* \* \* \*